(12) United States Patent
Helliwell et al.

(10) Patent No.: US 7,627,627 B2
(45) Date of Patent: Dec. 1, 2009

(54) CONTROLLING COMMAND MESSAGE FLOW IN A NETWORK

(75) Inventors: Richard Perham Helliwell, Colorado Springs, CO (US); Richard Fitzhugh Wrenn, Colorado Springs, CO (US); Edward A. Gardner, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 10/837,115

(22) Filed: Apr. 30, 2004

(65) Prior Publication Data

US 2006/0031519 A1 Feb. 9, 2006

(51) Int. Cl.
*G06F 15/16* (2006.01)

(52) U.S. Cl. .......... 709/203; 209/201; 209/202; 209/208; 209/209; 209/210; 209/211

(58) Field of Classification Search .......... 709/203
See application file for complete search history.

(56) References Cited

U.S. PATENT DOCUMENTS

| | | | |
|---|---|---|---|
| 5,748,892 A * | 5/1998 | Richardson | 709/200 |
| 6,446,144 B1 * | 9/2002 | Habusha et al. | 710/29 |
| 6,952,718 B2 * | 10/2005 | Nakamura et al. | 709/205 |
| 7,002,917 B1 | 2/2006 | Saleh | |
| 7,042,837 B1 | 5/2006 | Cassiday et al. | |
| 2001/0049742 A1 * | 12/2001 | Steely et al. | 709/232 |
| 2002/0152299 A1 * | 10/2002 | Traversat et al. | 709/223 |
| 2002/0156910 A1 * | 10/2002 | Senda | 709/232 |
| 2003/0188035 A1 | 10/2003 | Lubbers et al. | |
| 2004/0025018 A1 | 2/2004 | Haas et al. | |
| 2004/0078462 A1 * | 4/2004 | Philbrick et al. | 709/224 |
| 2004/0177141 A1 * | 9/2004 | Foody et al. | 709/224 |
| 2005/0243725 A1 | 11/2005 | Wrenn et al. | |
| 2005/0243816 A1 | 11/2005 | Wrenn et al. | |
| 2005/0243817 A1 | 11/2005 | Wrenn et al. | |
| 2005/0243830 A1 | 11/2005 | Wrenn et al. | |

OTHER PUBLICATIONS

U.S. Appl. No. 10/836,881, Office Action mailed Jan. 11, 2008, pp. 1-7.

* cited by examiner

Primary Examiner—Jeffrey Pwu
Assistant Examiner—Abdelnabi O Musa

(57) ABSTRACT

A method for controlling command message flow in a network including a server and a client. A command window, comprising a maximum number of command messages that may be outstanding at the server, is included in messages sent from the server to the client. The value of the command window at the server is modified in accordance with available server resources for receiving command messages. When there are insufficient resources at the server to process one of the command messages delivered to the server, then a pause message is sent to the client indicating which said command message cannot be received; indicia is stored that indicates the command message initially discarded; and subsequent said command messages delivered to the server are discarded until an initially discarded said command message is again delivered to the server.

20 Claims, 28 Drawing Sheets

2200

|   | 0 | 15 | 16 | 23 | 24 | 31 |
|---|---|---|---|---|---|---|
| 0 | apid 2201 | | opcode 2202 | | cmd_win 2203 | |
| 1 | struct flags 2204 | | | | | |
| 2 | request_id 2205 | | reserved | | | |
| 3 | rel_id_a 2206 | | rel_id_b 2207 | | | |
| 4 | parameters 2208 | | | | | |
| 5 | | | | | | |
| 6 | | | | | | |

FIG. 22

CONTROLLING COMMAND MESSAGE FLOW IN A NETWORK

RELATED APPLICATIONS

This application is related to the following U.S. patent applications, filed Apr. 30, 2004 and incorporated herein by reference: U.S. Publication No. 2005/0243816, entitled "System For Addressing Network End-Points Using Route Handles," now U.S. Pat. No. 7,466,699; U.S. Publication No. 2005/0243830, entitled "System For Determining Network Route Quality Using Sequence Numbers," now U.S. Pat. No. 7,440,458; U.S. Publication No. 2005/0243725, entitled, "System For Selecting Routes For Retransmission In A Network"; and U.S. Publication No. 2005/0243817, entitled "System And Method For Message Routing In A Network".

BACKGROUND

In a network that employs remote procedure call (RPC) mechanisms, these mechanisms typically use a sequenced message delivery transport (e.g., TCP/IP) to send command and response messages. When a command message is sent to an application by a client, the message arrives at the server and pends in the transport receive queue until the application can receive it. At that point, if the application does not have the necessary resources to complete the requested operation, the command message will languish in the application, consuming receive resources until the remaining resources become available. If no additional receive resources are available that are needed to complete operations already in progress, and the operations already in progress are using all the remaining resources necessary to start the new operation, a deadlock condition exists and no more operations are ever completed.

Existing implementations must insure that sufficient resources are available that this resource starvation situation never occurs. This is typically done by dividing the server resources needed to complete commands equally among the connected clients and extending that number of command credits to each client. Clients then limit their number of outstanding commands to their number of command credits. This method is often called pessimistic flow control.

Pessimistic flow control works well when a server has a small number of clients or when the rate of command arrival is similar among all clients. However, when a server has a large number of clients and the rate of command arrival varies greatly among clients, then server resource limitations lead to poor network performance because no client is able to keep as many commands outstanding as it needs.

SUMMARY

A system and method are disclosed for controlling command message flow in a network including a server and a client. A command window, comprising a maximum number of command messages that may be outstanding at the server, is included in messages sent from the server to the client. The value of the command window at the server is modified in accordance with available server resources for receiving command messages. When there are insufficient resources at the server to process one of the command messages delivered to the server, then a pause message is sent to the client indicating which command message cannot be received; indicia is stored that indicates the command message initially discarded; and subsequent command messages delivered to the server are discarded until an initially discarded command message is again delivered to the server.

The sending of command messages from the client is ceased when the number of outstanding command messages is equal to or greater than the maximum number of messages indicated by the command window. When the number of outstanding command messages is less than the maximum number indicated by the command window, then the sending command messages from the client to the server is resumed, starting with the command message initially discarded by the server.

BRIEF DESCRIPTION OF THE DRAWINGS

FIG. 22 is a diagram showing an exemplary request header;

DETAILED DESCRIPTION

Definitions

Figure 1:
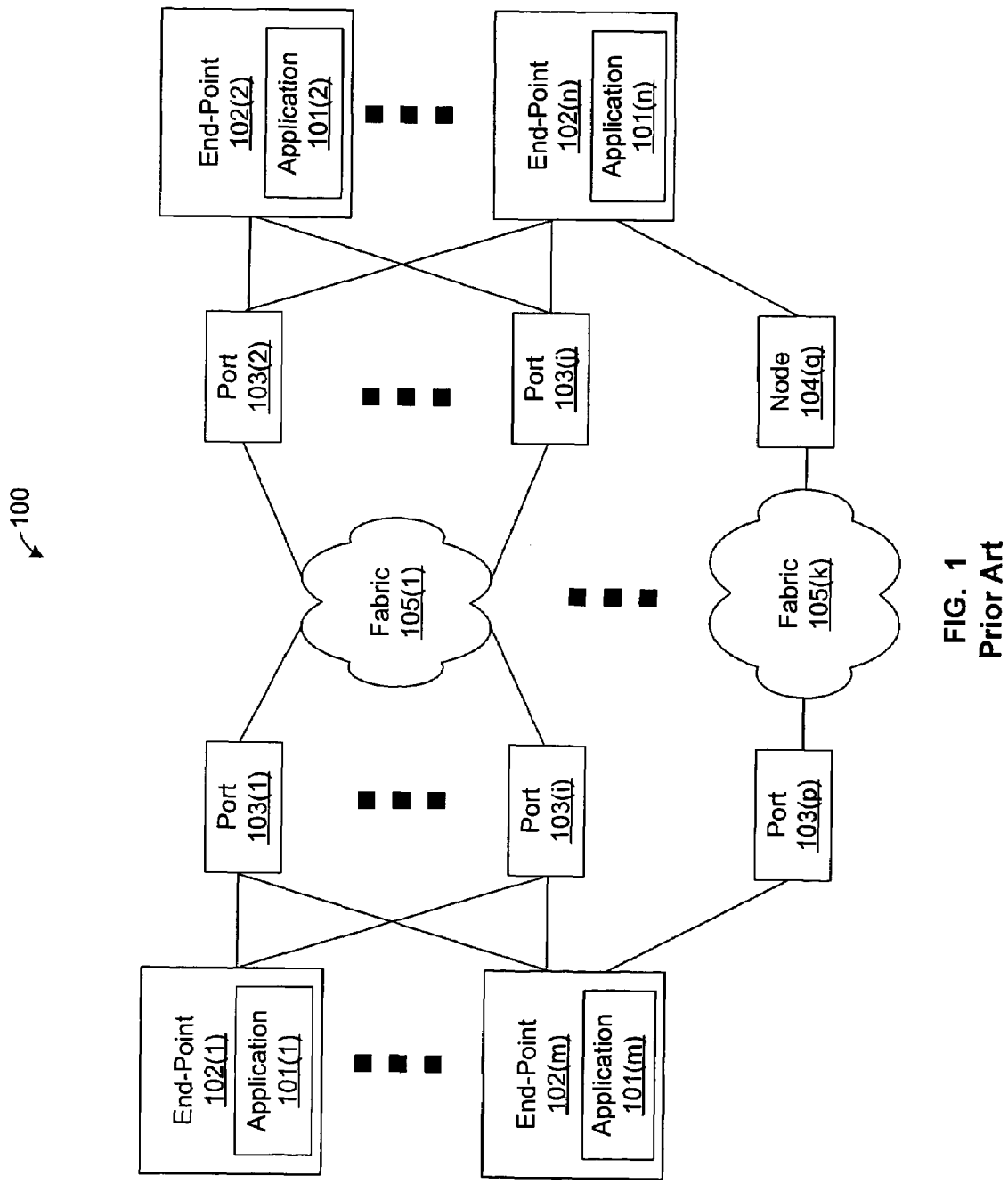
FIG. 1 is a block diagram showing applications, running on end-points, communicating with peer applications via respective ports and Fibre Channel fabrics over a prior art network.

The following definitions are applicable to the present document:

End-point—a locus for execution of applications on a network.

End-point Incarnation—the sustained, continuous operation of an end-point without loss of context.

Connection—a relationship between two communicating program incarnations, or processes, that is maintained where those processes are running. While the connection is established, the processes may use it to communicate. If either of the communicating processes stops (i.e., fails, exits, etc.) then the connection fails, and if restarted, the programs cannot continue to use the previously existing connection. Within this document, the following examples of connections are described:

- An application connection is a relationship between two incarnations of an application that is maintained by the end-points where those applications are running and that allows them to communicate reliably.
- A route set management connection is a relationship between routing layer programs on two end-point incarnations that allows them to communicate route set management information reliably.
- A route management connection is a relationship between two port layer programs on two port incarnations that allows the reliable communication of route management information.

Port—a port comprises all network-specific functionality associated with a specific, single Nx_port (Fibre Channel N_port or NL_port). Also denotes a specific communications protocol layer.

Message—A logically contiguous array of bytes sent reliably by the sequenced message transport. A message is sent using one or more transmissions.

Transmission—A single-frame Fibre Channel sequence having, at least, a Fibre Channel header, network header, and a routing header. Transmissions are sent on a best-effort basis.

Outbound Message—an object that is used to describe a message to be sent. Acronym is OBM.

Outbound Sequence—an object that is used to describe a transmission to be sent. Acronym is OBS.

Path—a relationship between two port incarnations established by the standard Fibre Channel PLOGI extended link service.

Process—an incarnation of the code on a machine that is executing the code.

Route—a connection between the processes that represent the two end point incarnations that uses a specific path. A route relates two end-point incarnations and two port incarnations.

Half route—the portion of a route that delivers messages in one direction. With respect to an end-point, a half route is either outbound or inbound. A route consists of exactly two half routes.

Route set—a relationship between two end-point incarnations that associates the complete set of routes between those incarnations and that indicates the existence (currently, or at some previous time) of one or more routes between the end-points. A route is a member of exactly one route set. A route is established as a member of a specific route set and cannot migrate to any other route set. Termination of a route set terminates all routes belonging to the route set.

Introduction

Figure 2:
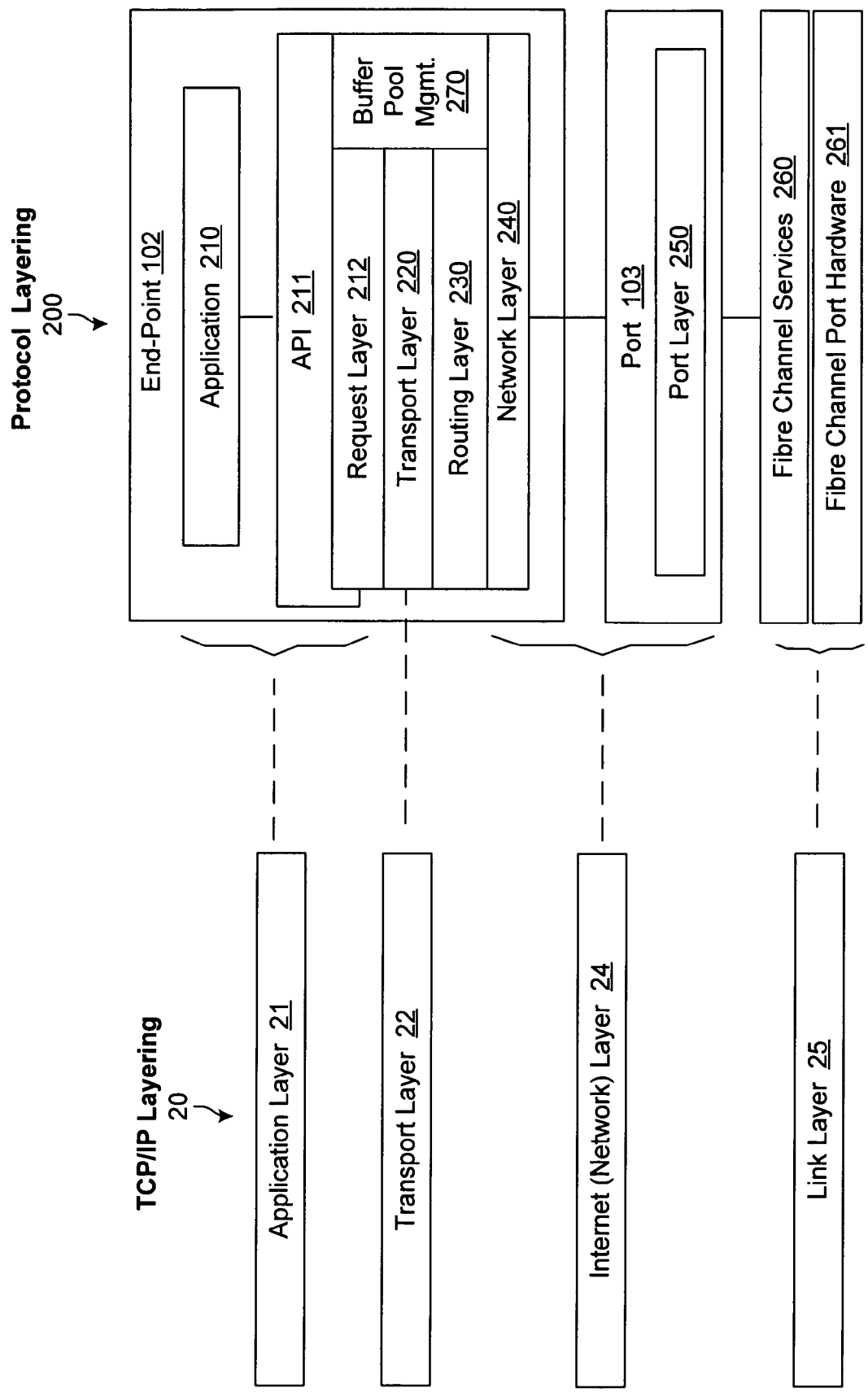
FIG. 2 is an exemplary diagram showing the relationship between TCP/IP protocol layering and protocol layering of the present system.

FIG. 2 is a diagram showing, as an example, the general correspondence between TCP/IP protocol layering 20 and the protocol layering 200 of the present system. As shown in FIG. 2, each end-point 102 in the present system includes network layer 240, routing layer 230, transport layer 220, request layer 212, and application layer 210 plus a buffer pool management component 270. An API (Application Program Interface) 211 makes network services available to applications 210. Network layer 240 encapsulates one or more ports 103(*) that are local to the network layer's end-point 102 and makes them available to that end-point. In so doing, the network layer 240 hides any physical interface (e.g., a PCI bus) between the end-point 102 and its local ports 103(*).

The present system uses a routing layer 230 to effectively glue together the network 240 and transport 220 layers of a networking protocol. Routing layer 230 may be implemented in conjunction with Hewlett-Packard's SCTP (Storage Cluster Transport Protocol), for example. The routing layer 230 provides a routing or steering mechanism to direct outgoing transmissions from a connection onto the proper route, and to direct incoming transmissions (on a particular route) to the proper connection. Transport layer 220 sends and receives messages on connections and provides a sequenced-message delivery service. Request layer 212 provides the command-response service, command flow-control, and the bulk data transfer service. A buffer pool management component 270 manages buffers (not shown) used to receive unsolicited messages directly into application memory. An API (applications programming interface) 211 makes network services available to applications 101 (*).

The functionality that is specific to a single port 103 is called the port layer 250. In the present exemplary embodiment, port layer 250 performs the discovery and maintenance of routes, in addition to providing mechanisms for sending and receiving transmissions as described herein. In the present embodiment, each port 103 comprises an 'Nx_port', which is a Fibre Channel N_port or NL_port. Each port 103 uses a driver ('Fibre Channel services') 260 to abstract the port hardware such that the peculiarities of the Fibre Channel port hardware 261 are hidden from the upper protocol layers. In an exemplary embodiment, an end-point 102 may use several ports 103(*) simultaneously. While the present description is cast in embodiments that are implemented using a Fibre Channel network, the system described herein may also be implemented using other network technologies, such as Ethernet, IP, or the Internet RDMA protocol.

As shown in FIG. 2, the application layer 21 in the TCP/IP protocol layering scheme 20 may be considered to correspond to the application and request layers 210/212 of the present system. In the present protocol layering scheme 200, the TCP/IP transport layer 22 is functionally similar to the present transport layer 220; the TCP/IP network layer 24 may be considered to correspond to the combination of the present network layer 240 and port layer 250; and the TCP/IP link layer 25 is effectively implemented within Fibre Channel Services and port hardware layers 260/261. While the TCP/IP protocol does routing within its network layer 24, it does not specifically provide for a distinct formal routing layer.

In the present exemplary embodiment, the protocol stack 200 provides a reliable one-way sequenced message delivery service for small messages, a reliable command-response service that uses the sequenced message delivery service to deliver commands and responses, and a reliable, high-performance bulk data transfer service that can be used in conjunction with the reliable command-response service.

The transport protocol used to implement transport layer 220 allows two application processes running on end-points 102(*) to establish a connection between them and to use that connection to send one-way sequenced messages. Barring major communication failures, messages sent via the connection are delivered in order and exactly once to the connected process. A command-response service implemented by the request layer 212 (using services provided by the transport layer 220) allows a client process, e.g., application 101(1), to send commands to a server process, e.g., application 101(2), for the server process to return a response to the client process, and for the client and server to perform high-performance bulk data transfers. Commands and responses are sent via a connection established between the client and the server processes, so they are presumed by the request layer to be delivered reliably.

As can be seen from FIG. 2, the present system adds a routing layer 230 to an end-point's protocol stack between the transport 220 and network 240 layers. This routing layer 230 is aware of multiple routes and networks to other end-points 102. As described herein, the routing layer 230 organizes the available routes to a given end-point 102(*), measures route quality, and selects the proper route for each outgoing transmission.

The present system's transport layer 230 uses different routing layer functions for sending initial transmissions and retry transmissions. This distinction allows the route selection for retry transmissions to differ from route selection for initial transmissions. In addition, transport layer 230 informs the routing layer when a previous transmission may not have arrived in a timely fashion so that the routing layer can avoid the route used by the previous transmission.

As an adjunct to the routing process, routing layer 230 monitors the quality of each route. The resulting route quality is used to select routes for outgoing transmissions to avoid routes that are unreliable, congested, or slow. The manner in which the routing layer determines route quality is described in related application; the routing layer's use of route quality measurements and other information to select routes is described herein.

Routing layer 230 automatically maintains the routes in a route set (described in detail below), adding newly discovered routes and removing those that have failed.

Route Components

Figure 3:
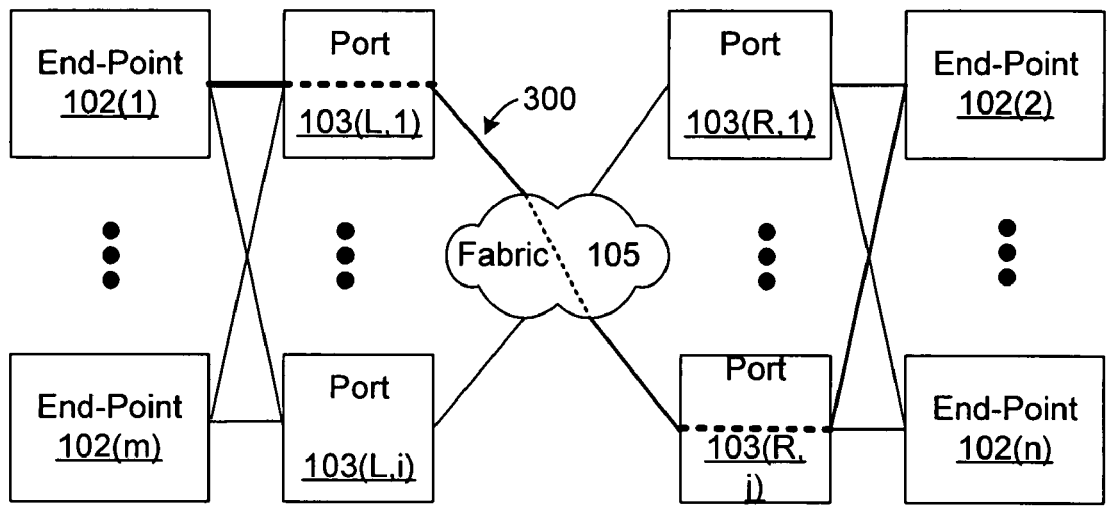
FIG. 3 is a diagram showing relationships between exemplary physical components in the present system.

Physical components governed by the present system include end-points 102(*), ports 103(*), and fabrics 105. Certain relationships between these component objects are summarized in FIG. 3. As shown in FIG. 3, a route 300 comprises a pair of ports, e.g., 103(L,1) and 103(R,j), connected via a fabric 105 through which two end-points, e.g., 102(1) and 102(2), can communicate. In the above figure, there are i*j potential routes 300 between end-point 102(1) and end-point 102(2), j through each port [103(L,1) through 103(L, i)] directly connected to end-point 102(1). One of these routes is shown by the bold line 300.

The protocols described herein govern the creation, modification, and deletion of logical objects (structures). These logical objects describe discovered physical ports 103 and end-points 102, and include local port, remote port, local end-point, and remote end-point objects, which are described in detail with reference to FIG. 4. Route, route set, discovered remote end-point, and route management connection objects are used to group and manage instances of these logical objects, as described below. The term 'local' is used herein to refer to logical objects that represent physical objects that can be accessed without using Fibre Channel messages. In contrast, the term 'remote' is used to refer to objects that are not local. Thus, a remote end-point describes an end-point that can only be accessed across a Fibre Channel, e.g., end-point 102(2) is remote to port 103(L,1), whereas end-point 102(1) is a local end-point relative thereto.

Figure 4:
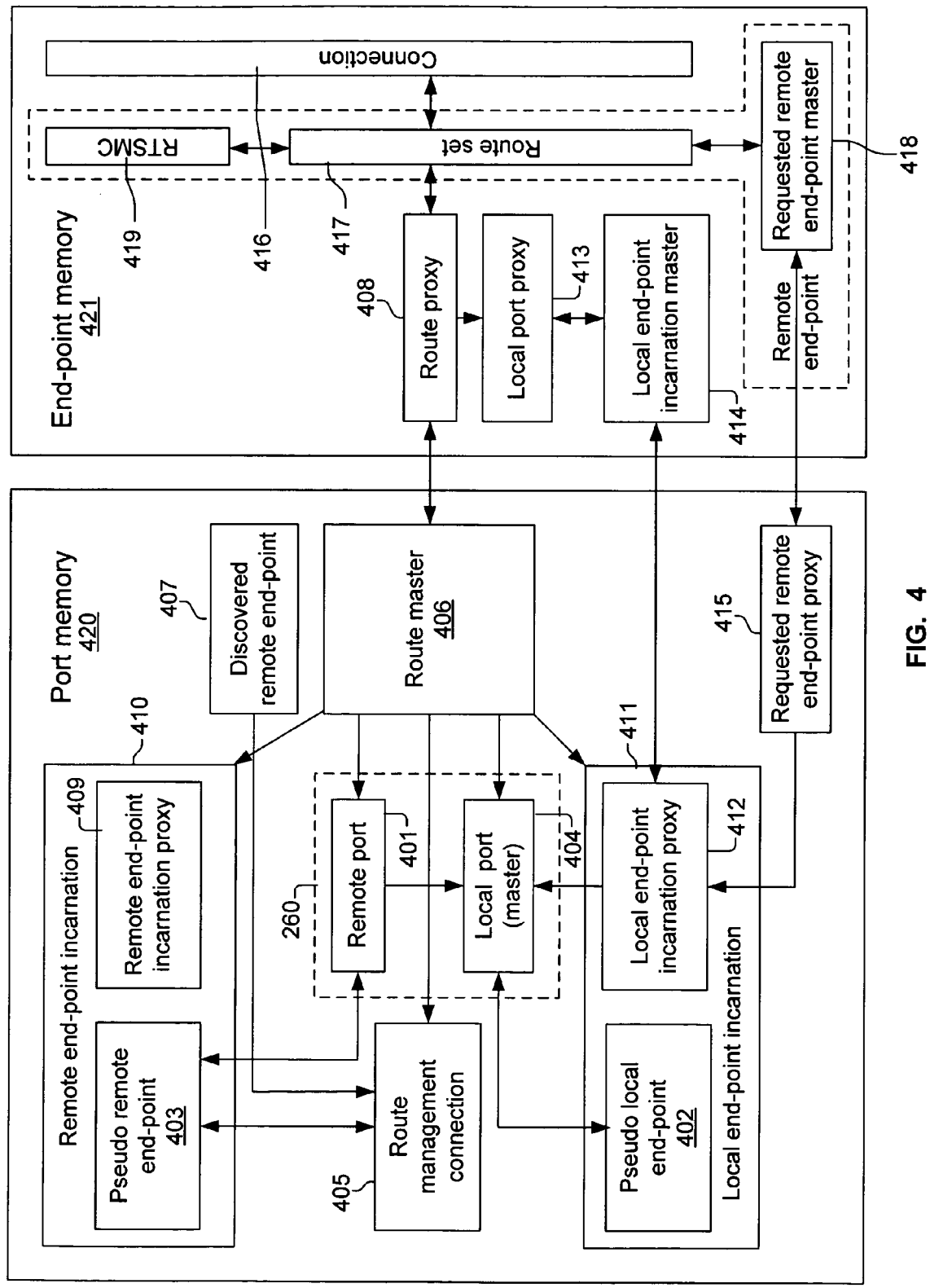
FIG. 4 is a diagram showing relationships between exemplary logical objects in the present system.

FIG. 4 is a diagram showing relationships between exemplary logical component objects (structures) and their location in port memory 420 and end-point memory 421, located in a physical port 103(*) and a physical end-point 102(*), respectively. In the present system, several objects (local port, route, local end-point, and requested remote end-point) are represented by the combination of a master and a proxy. This bifurcation into masters and corresponding proxies allows these objects to be distributed between the port memory/processor and the end-point memory/processor. By maintaining both the masters and proxies, the present system will support either a distributed implementation or a single memory/processor implementation. FIG. 4 is presented at this point to clarify subsequent references made to these system objects throughout this document. A brief description of certain objects shown in FIG. 4 is presented below.

Local port objects, comprising local port master 404 and local port proxy 413, describe the state of a directly accessible physical port. Local port objects 404/413 are created automatically at initialization based on physically detected port hardware. Attributes of a local port object describe the physical port hardware and its fabric login state.

Remote port object 401 describes the state of a local port's relationship with a physical port that is not directly accessible. Remote port objects 401 are created when they are discovered via Fibre Channel communication. Attributes of the remote port object 401 describe its port ID, port name, a local port through which it can be accessed, and port login state.

A local end-point object (e.g., local end-point incarnation master 414 and local end-point incarnation proxy 411) describes the state of a directly accessible end-point. Local end-point incarnation master object 414 is created when it is initialized on that end-point and the local end-point incarnation proxy is created when the local end-point discovers the port. Attributes of the local end-point object include the local end-point's UID (unique identifier) and IID (incarnation identifier).

Pseudo local end-point object 402 describes the local end-point for route management connections that is associated with a local port object 404. It is created as a side effect of creating the local port object 404. Likewise, a pseudo remote end-point object 403 is created as a side effect of creating a remote port object 401. Unlike real end-points, pseudo end-points are not addressed by their UIDs; rather, they are addressed by their associated ports during connection establishment and by route handles thereafter.

A remote end-point object describes the state of an end-point that is not directly accessible. Discovered remote end-point objects 407 are created when they are discovered through partial route registration, and requested remote end-point master objects 418 are created when a client makes a connect request to a new end-point 102. Requested remote end-point proxy objects 415 are created when either when a client makes a connect request or when a local port 103(L) is discovered.

Attributes of the remote end-point include the remote end-point's UID. Attributes of the discovered remote end-point object 407 include references to remote ports that can be used to access the remote end-point. Attributes of the requested remote end-point object (415/418) include references to local end-points that have requested that routes be established to the remote end-point.

An end-point incarnation 410/411 is the sustained, continuous operation of an end-point without loss of context. Attributes of an end-point incarnation include its incarnation identifier (IID). The incarnation identifier is assumed unique over all end-point incarnations. Each time an end-point reboots, its old incarnation is destroyed and a new one is created, including a new incarnation identifier.

Route management connection object 405 describes a connection that is used to communicate route management information between two pseudo end-points and their corresponding ports.

Routing layer connection object 416 is a base class from which a transport layer connection object is derived.

Route set object 417 associates the routes from a local end-point incarnation 411 to a remote end-point incarnation 410. Attributes of the route set include a list of routes, a list of clients (connections), and a remote end-point UID and incarnation identifier (IID) (the local end-point is implicit).

There are at least two viable route management configurations for the present system. In the first configuration, all local port and end-point objects are stored in a single memory and the processors that implement the local port and end-point methods have a method for synchronizing access to that memory. In the second configuration, the port and end-point objects may be distributed between memory and processors associated with ports 103(*) and end-points 102(*).

When the port and end-point objects are distributed, those objects are decomposed into a corresponding master object and its proxies. For example, local end-point incarnation 411 is decomposed into a local end-point incarnation master object 414 in the memory 421 of the end-point 102 and multiple local end-point incarnation proxy objects 412 in the memories 420 of the end-point's local ports 103(L). The local end-point incarnation master 414 is created automatically during the end-point initialization, and the local end-point incarnation proxy 412 is created as a result of end-point registration with a port 103. Similarly, the local port master object 404 is created automatically during port initialization, and the local port proxy object 413 is created during hardware discovery and modified as a result of end-point registration with the port 103.

Half Routes

Figure 5:
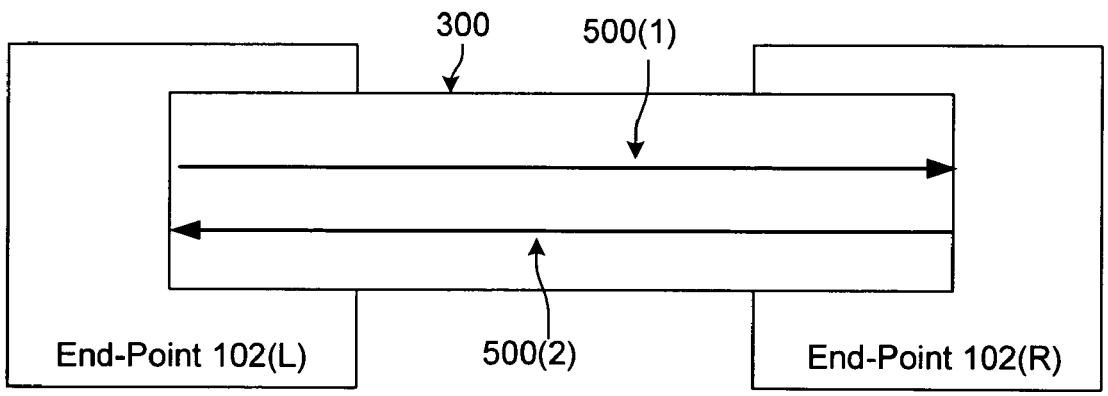
FIG. 5 is a diagram of a route showing half-routes.

Each route 300 comprises two independent, unidirectional, half routes. FIG. 5 is a diagram of a route 300 showing the two component half routes 500(1) and 500(2). From the perspective of an end-point 102(*), one of these components is the outbound half route and the other is the inbound half route. The local end-point's outbound half route is the remote end-point's inbound half route and vice versa. For example, if end-points 102(L) and 102(R) are considered to be the local end-point and remote end-points, respectively, half route 500(1) is the outbound half route for local endpoint 102(L), and half route 500(2) is the inbound half route for local endpoint 102(R).

Route Sets

Figure 6A:
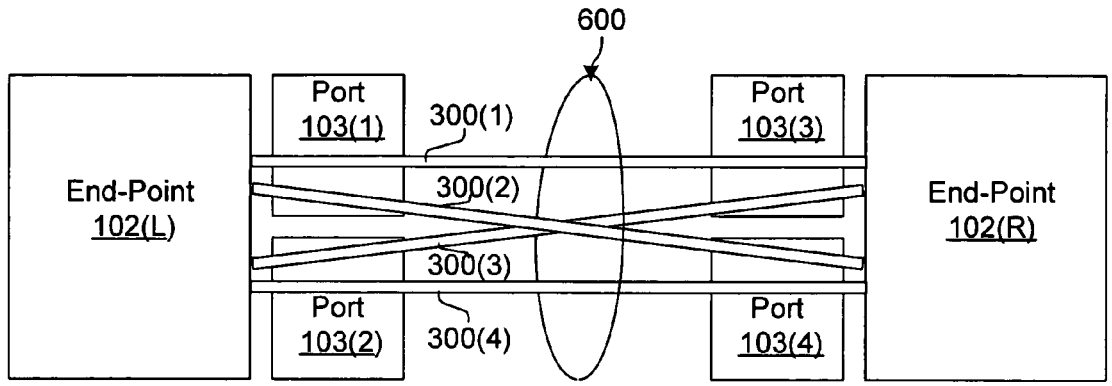
FIG. 6A is a diagram showing an exemplary relationship between routes and route sets.

FIG. 6A is a diagram showing the relationship between routes 300(*) and a route set 600. A route set 600 specifies the relationship between two end-points 102(*) and catalogs the routes 300(*) between the two end-points. A route set typically contains multiple distinct routes. As shown in FIG. 6A, route set 600 is the set of routes 300(1), 300(2), 300(3), and 300(4) between the two end-points 102(L) and 102(R). A route set 600 thus groups all routes 300 between a local end-point and a remote end-point. Routing layer 230 is responsible for creating, deleting, and maintaining route sets 600.

Before application processes on two end-points 102(*) can create a connection, the end-points must first establish a route set between them. A route set 600 may persist while routes are added to or removed from the route set, provided the end-point incarnations 410/411 continue to exist.

Route Set Management Connection

Figure 6B:
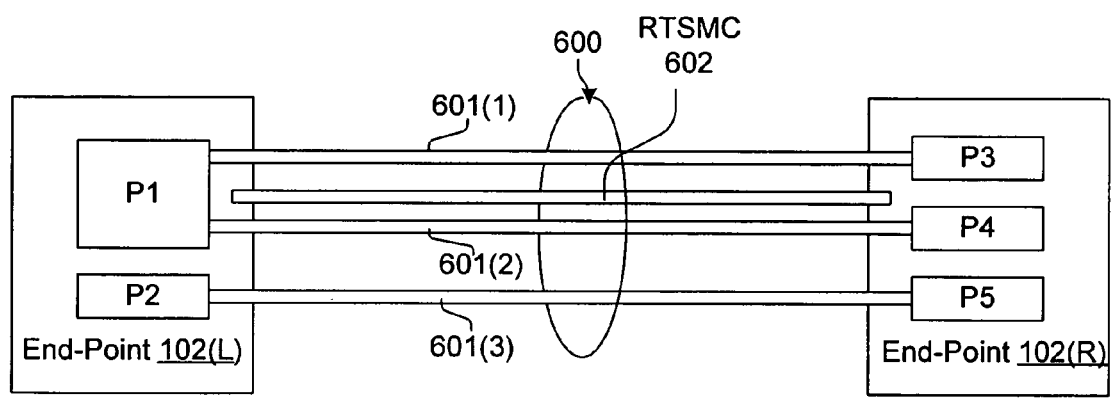
FIG. 6B is a diagram showing exemplary relationships between a route set management connection, a route set, and application connections.

FIG. 6B is a diagram showing exemplary relationships between a route set management connection (RTSMC) 602, a route set 600, and application connections 601 (1)-601 (3), with application processes P1-P5 running on end-points 102 (L) and 102(R) and communicating via application connections 601(1)-601(3) between the processes. A local end-point, e.g., 102(L), creates routes 300, a route set 600, and a route set management connection to a remote end-point, e.g., 102(R), when it finds it necessary to create a first application connection 601(1) with an application on the remote end-point.

Route Selection

In selecting a route 300 for an outgoing transmission, transport layer 220 implicitly constrains the selection to a route set 600 by specifying a connection on which to send a transmission. Routing layer 230 attempts to select a route 300 from that route set 600 that is reliable, not congested, and fast. When multiple routes 300 appear to be acceptable, then the routing layer 230 distributes traffic among those routes to balance their utilization.

Routing layer clients (i.e., transport layer entities) send and receive messages via connections established by the routing layer 230. These connections are base-class connections from which transport layer connections are derived. Routing layer 230 provides functions that clients can use to request and abort connections. A route set management connection 602, is used by the routing layer to manage the routing layer connections established on a route set. Route set management connections 602 are described below in detail with respect to FIGS. 10A, 10B and 10C. Once a routing layer connection is established, the routing layer connection's send and receive functions are available to routing layer clients.

Operational Overview

Figure 7:
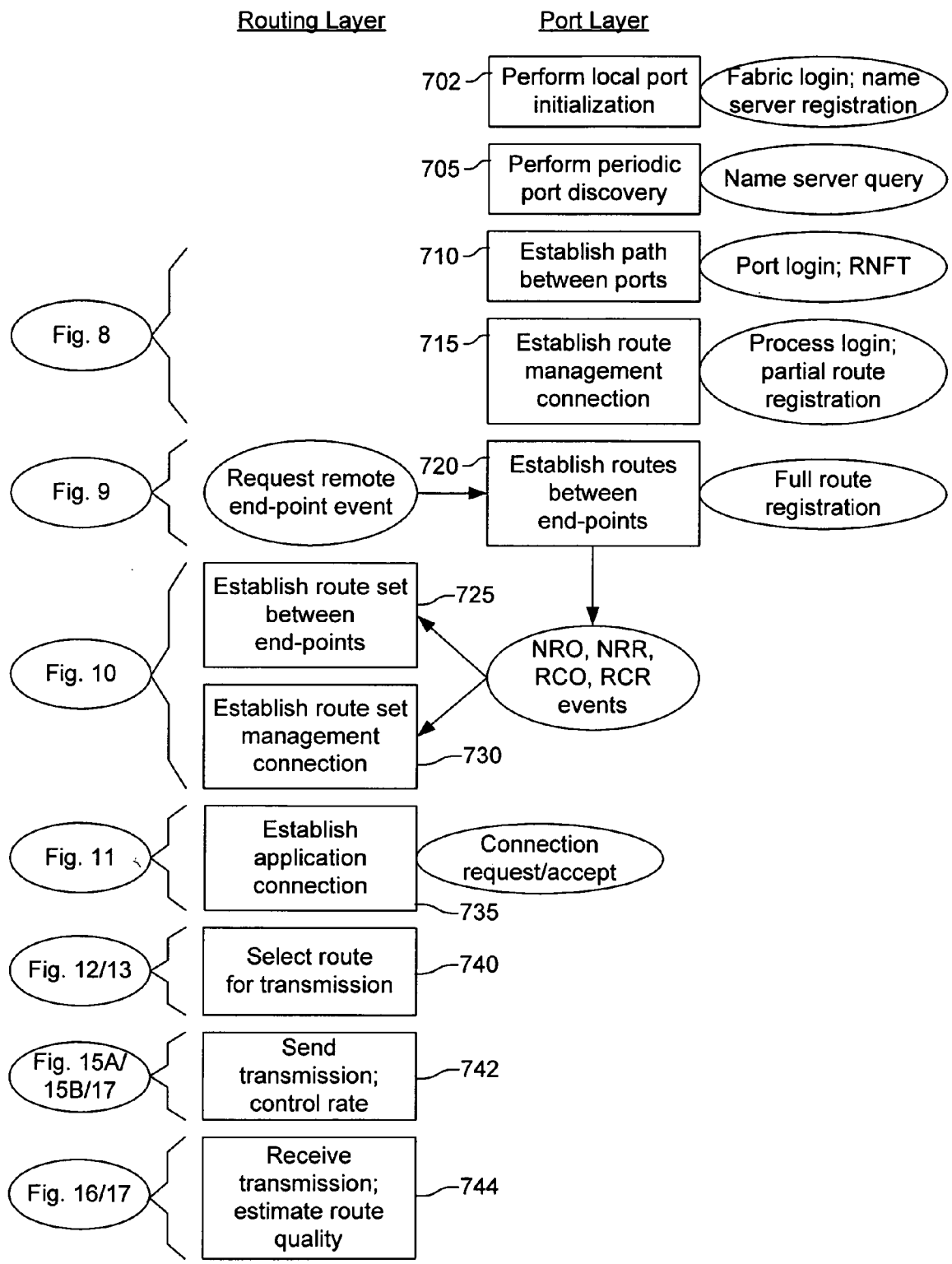
FIG. 7 is a diagram showing an overview of an exemplary set of steps performed in operation of the present system.

FIG. 7 is a diagram showing an exemplary set of high-level operations performed in operation of the present system. Much of the process shown in FIG. 7 is event-driven, and thus the execution of each functional block shown does not occur automatically in response to execution of a previous block in the figure.

Configuration Discovery

As show in FIG. 7, at step 702, port initialization begins with the fabric login and name server registration as described in the Fibre Channel specification. In order to provide better scaling for the discovery process, the subject protocols allow two classes of Fibre Channel ports 103(*), Class A and Class B. Class A ports register with the fabric name server as two FC4 types, while Class B ports register as only one of these two. In this way, Class A ports autonomously locate all of the Class A and Class B ports by querying the fabric name server for all ports that have registered the FC4 type used by all ports that support the subject protocols. In contrast Class B ports locate only Class A ports by querying only the FC4 type that Class B ports do not register. Class B ports can locate other Class B ports by querying a protocol-specific name server that is implemented by all Class A ports.

Once registration is complete, port configuration discovery is performed periodically, at step 705, with each local port **103(*)** querying the Fabric name server (logging in if necessary) to discover newly connected ports that have registered the FC4 types used by the ports that support the subject protocols. In the steady state, configuration discovery is performed every 100 seconds, in an exemplary embodiment. However, during startup and whenever there is evidence that the system configuration may have changed, this period is changed, for example, to 10 seconds for 10 periods and then back to 100 seconds. It should be noted that the present system does not require setting the configuration discovery period precisely to the foregoing values.

This autonomous configuration discovery must be repeated periodically because fabric name server registrations propagate slowly, configurations change, and state change notifications are not delivered reliably. When repeated periodically, only newly discovered ports **103(*)** are processed. This is true because ports that restart or whose IDs change will spontaneously execute portions of autonomous configuration discovery and thus update configuration changes.

Port Login

Port login is used to establish a shared context between two Fibre Channel ports **103(*). Prior to port login, the ports may only exchange port login transmissions (i.e., PLOGI/ PLOGI_ACC transmissions). Successful port login establishes a path between the ports 103(*). Port login is specified by the Fibre Channel specification. Each port maintains a set of remote port objects (structures) 401, each of which describes the relationship between it and another port that it can access via a fabric 105(*)**.

As shown in FIG. 7, at step 710, a port **103(*) creates a path between itself and each remote port 103(*) that it discovered from the Fabric name server. A route management connection 603 (shown in FIG. 6C) is then established between the pseudo end-points 402/403 associated with the ports of a path, at step 715. Route management connection 603 is a sequenced-message connection that provides a one-way sequenced message delivery service used to communicate route management information between two ports 103(*)**.

Figure 8:
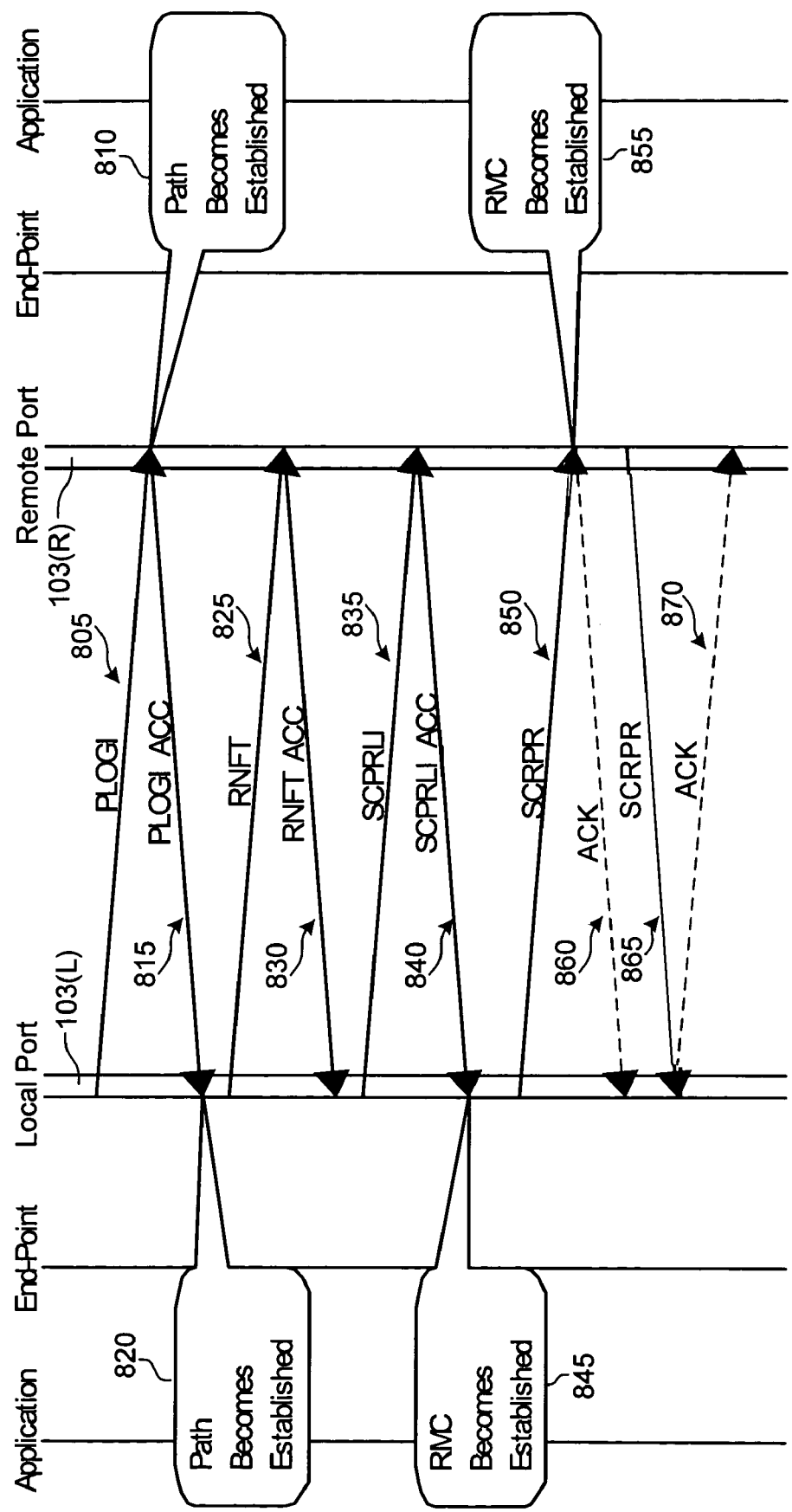
FIG. 8 is a diagram showing exemplary steps performed in establishing a path and a route management connection between two ports.

FIG. 8 is a diagram showing exemplary steps for establishing a path and a route management connection 603 between two ports **103(*), and also for performing a 'partial route registration' process. As shown in FIG. 8 (with reference also to FIG. 3), at step 805, local port 103(L) requests that Fibre Channel Services establish a path to remote port 103(R) using a PLOGI transmission. Upon receipt thereof, a path to the remote port 103(R) is established, at step 810, and the remote port responds by sending a PLOGI_ACC transmission to the local port 103(L), at step 815. After receipt of the PLOGI_ACC transmission at the local port, a path from the remote port 103(R) to the local port 103(L) is established, at step 820**.

At step 825, the local port then uses the Report Node FC-4 Types (RNFT) protocol to learn the set of FC-4 protocols supported by a particular remote port. Receipt of RNFT_ACC from the remote port 103(R) at step 830 indicates that the remote port supports the proper Fibre Channel FC-4 protocol, and causes the local port 103(L) to initiate process login.

Route Management Connection Establishment

Figure 6C:
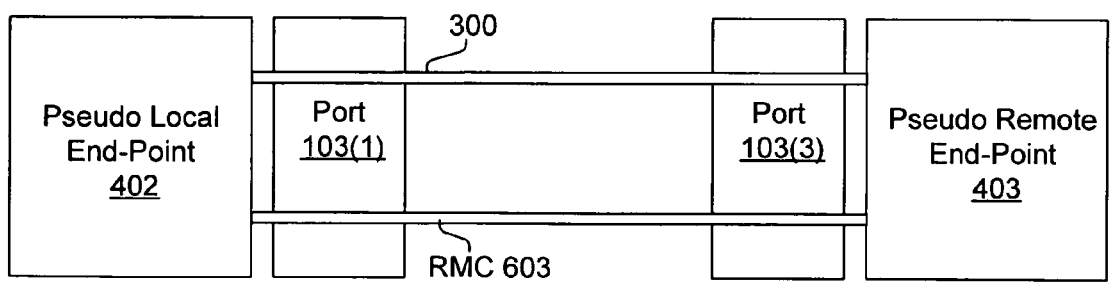
FIG. 6C is an exemplary diagram showing the relationship between a route management connection and pseudo end-points.

The present system extends every local and remote port object 404/401 by attaching to it a pseudo end-point object 402/403 to provide a terminus for route management connections. FIG. 6C is an exemplary diagram showing the relationship between pseudo end-points 402/403 and a route management connection (RMC) 603. The present process login protocol establishes a route management connection 603 and a route 300 between pseudo end-points 402/403 associated with the ports **103(*)** of a path.

The route management connection 603 is used to communicate:
 partial route registration messages,
 full route registration requests and their responses, and
 name service queries and their responses.

Route management connection 603 behaves slightly differently than other connections. Differences include the following:
 the two end-points of a route management connection 603 are pseudo-end-points that correspond to ports of a path.
 the route management connection 603 does not use a route set. Rather, the corresponding path constitutes the sole route used by the route management connection.
 when a remote Nx_port is implicitly or explicitly logged out, all corresponding route management connections 603 are terminated immediately.

The present process login protocol comprises an FC-4 Link Service request (SCPRLI) and an FC-4 Link Service reply (SCPRLI_ACC). The local and remote ports exchange process login protocol transmissions SCPRLI (step 835) and SCPRLI_ACC (step 840) to establish a route management connection 603 between the path's local and remote ports 103(L)/103(R), at step 845. SCPRLI and SCPRLI_ACC correspond to the first two phases of a three-way handshake. Information carried by the SCPRLI/SCPRLI_ACC FC-4 Link Service includes the route management connection's connection identifier (connection ID) and the route's full route handle, which is used to direct messages to a remote end-point **102(*) via a route 300, once established. The first message to be sent on the route management connection is a SCRPR command, at step 850, which completes the three-way handshake and completes establishment of the route management connection 603, at step 855, thus enabling the transmission of messages on the route management connection by the remote port 103(R)**.

More specifically, during process login, a local port 103(L) and a remote port 103(R) perform the steps below to establish a route management connection:

(1) On the local port, a route management connection object 405 and pseudo remote end-point object 403 are created that reference the remote port's remote port object 401.

(2) On the local port, a route master object 406 is created, and a SCPRLI command is sent to the remote port 103 (R), as indicated above. The SCPRLI message contains the inbound full route handle, a connection ID, an initial sequence number, and flags describing the local port 103(L).

(3) On the remote port, receipt of a SCPRLI message normally modifies the states of the existing route management connection and route master objects 405/406 to the pseudo remote end-point 403. In the case where SCPRLI is received and those objects do not exist, they are created. Successful completion is signaled by sending a SCPRLI_ACC message containing the remote port's inbound full route handle, a connection ID, an initial sequence number, and flags describing the remote port 103(R).

(4) On the local port, receipt of a SCPRLI_ACC message modifies the states of the route management connection and route master objects 405/406 to the pseudo remote end-point 403 and establishes the route management connection 603.

Partial Route Registration

Register Partial Routes (SCRPR) messages are sent any time there is a change in the set of end-points that are local to a port, to allow end-points 102(*) discover one another. Once process login is complete, a SCRPR message is sent as the first sequenced message on the route management connection 603. The message includes the remote port's inbound full route handle and the connection ID. Each port 103(R)/103(L) uses the route management connection's one-way sequenced message delivery service to supply a list of its local end-points' UIDs and IIDs to the corresponding remote port 103(L)/103(R) using the partial route registration protocol (SCRPR), at steps 850/865. In response, the receiving port creates or modifies a discovered remote end-point object 407 for each listed end-point and registers it in its name server database. Subsequently, an end-point 102(*) local to the receiving port can discover the set of remote end-points 102(*) to which it can communicate via yet-to-be established routes 300 and connections 601. As a side effect of using the route management connection's sequenced message delivery service, each SCRPR message is acknowledged (at steps 860/870); i.e., the route management connection 603 assures that every sequenced message is ACK'd.

As shown at step 720 in FIG. 7, one or more routes 300 are established between end-points 102(*) using a full route registration protocol. At step 725, a route set 600 is established between the end-points 102(*). Steps 720 and 725 are described in detail in the immediately following section.

Full Route Registration

A port 103 uses full route registration protocols to establish and maintain routes 300 between its local end-point incarnations 412 and those remote end-point incarnations 409 that correspond to the logical intersection of discovered remote end-points 407 and requested remote end-points 415. These full route registration protocols include protocols to establish (register) and destroy (deregister) routes 300. Each active route 300 provides a mechanism for delivering transmissions between its two end-points 102(*).

Full route registration and deregistration cause the creation and deletion of route objects (route masters 406, route proxies 408, route sets 417, and route set management connections 419). As a side effect, remote end-point incarnation proxy objects 409 may be created and deleted. A remote end-point incarnation proxy object 409 is used to represent the remote end-point incarnation of a full route 300.

A remote end-point incarnation may be represented as an attribute of a route master object 406 (described below in detail), but because route master objects are relatively large, it is desirable to share them. Thus, in an exemplary embodiment, a remote end-point incarnation proxy 409 is created whenever a route master's remote end-point incarnation 410 is set to a previously unknown value, and deleted whenever no route master 406 references it.

The full route registration protocol comprises sending a Register Full Route message (SCRFR) from a local port 103(L) to a remote port 103(R) and a Register Full Route Response message (SCRFR_RSP) that the remote port returns to the local port. Both the SCRFR and the SCRFR_RSP messages are sent on the route management connection 603 associated with the route's path.

Figure 9:
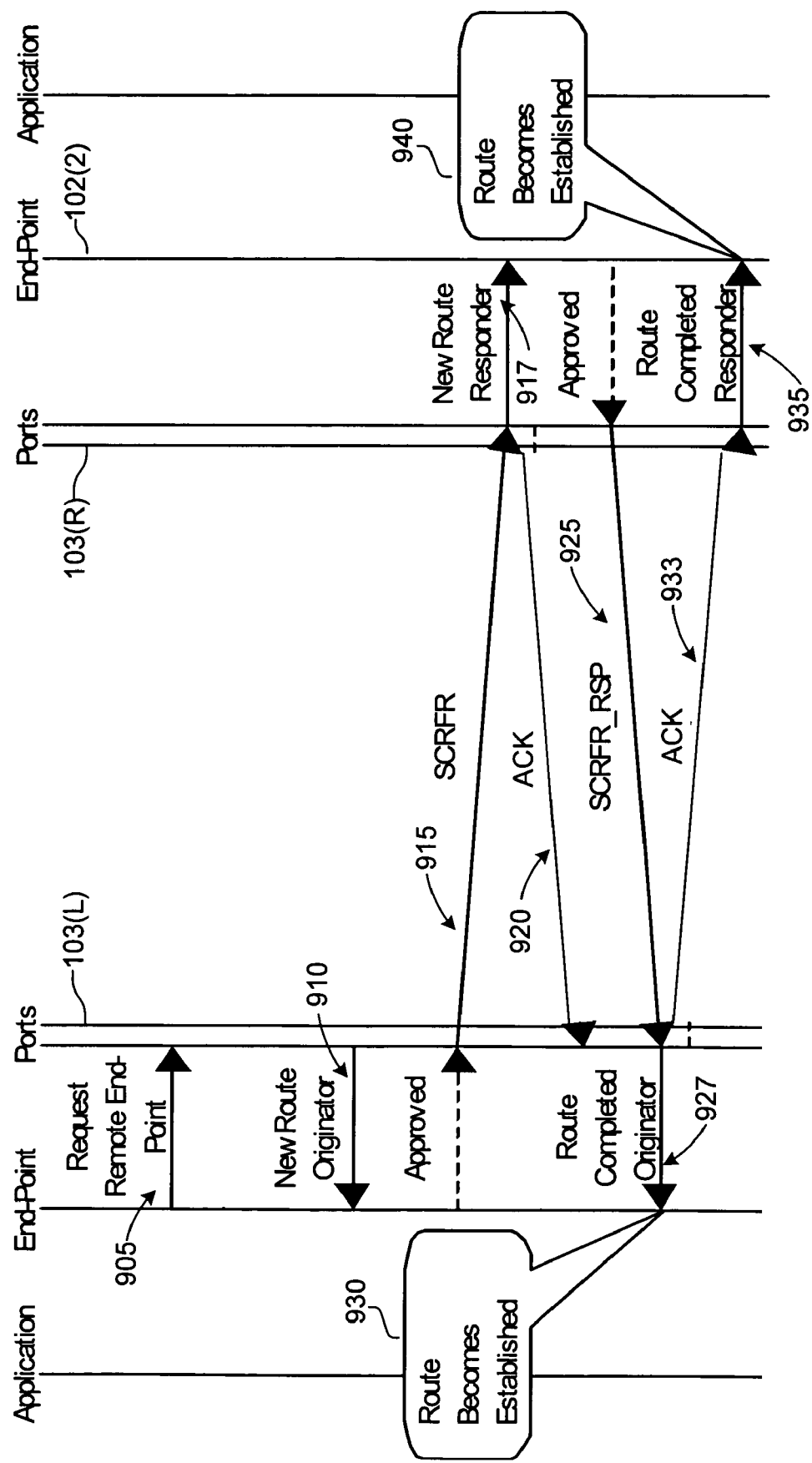
FIG. 9 is a diagram showing exemplary steps performed in a full route registration procedure.

FIG. 9 is a diagram showing exemplary steps performed in a full route registration process. As shown in FIG. 9, full route registration is initiated after an end-point 102(L) has expressed a demand for routes to a remote end-point 102(R), at step 905, by issuing a Request Remote End-Point command to a local port 103(*). More specifically, full route registration is triggered either by an end-point 102 issuing a Request Remote End-Point command for an end-point 102 to which a partial route has already been discovered, or by the discovery of a partial route to a remote end-point 102(R) that was previously requested. In the process of establishing a route 300, two ports 103(*) exchange full route handles to use to address messages to the end-points via the route.

After full route registration is triggered, the local port 103(L) first checks to see if a route master 406 already exists to the remote end-point incarnation 410 that represents either an established route or a route that is in the process of being established, and if one exists then no further action is taken. Otherwise, a route master 406 is created to track the progress of full route registration and it is linked with the remote end-point incarnation proxy 409 and the route management connection 405. Then, the local port 103(L) changes the route master state to NRO and notifies the local end-point 102(L) that requested the remote end-point 102(R) by sending a New Route Originator (NRO) event, at step 910. The local end-point 102(L) either refuses the new route 300 or approves it and provides the local port 103(L) with the originator's ep_info (end-point information) structure, containing end-point information for the local end-point, to transmit to the remote end-point 102(R). A New Route Originator (NRO) event is generated by the route master object on the port originating the SCRFR to inform the local end-point that a new route to the requested remote end-point 102(R) specified by a remote end-point UID has been discovered through the path specified by the remote port 103(R).

When a new route is approved, the local port 103(L) looks up the route master, copies the ep_info and route proxy handle into the route master, and updates the route master state to SCRFR_SENT. The local port then allocates an OBM and uses it to construct a SCRFR message which it sends to the remote port, at step 915 via the route management connection. The SCRFR message conveys the route's local and remote end-point UIDs and IIDs, the originator's ep_info structure generated by the local end-point, and a full route handle that can be used to direct messages from the remote end-point 102(R) to the local end-point 102(L) via the route 300. In the case where the new route is refused, the local port runs down the route master, and no further action is taken.

On receipt of the SCRFR message, the remote port 103(R) checks to make sure that the remote end-point 102(R) referenced in the SCRFR message has registered with the port, and if not, an OBM is allocated and prepared with a SCRFR_RSP with BADREP status. Otherwise, the remote port 103(R) creates a route master 406 to track the progress of the full route registration and links it to a remote end-point incarnation proxy 409. If it was not possible to create a route master, then an OBM is allocated and prepared with a SCRFR_RSP with INSRES status to indicate that the remote port has insufficient resources to process the SCRFR.

In the case where the route master was created, the remote port 103(R) copies the SCRFR originator's full route handle and ep_info from the SCRFR message into the new route master. In the case where the new route master is the only route master at the remote port that describes this route, the remote port changes the route master's state to NRR and then notifies the remote end-point 102(R) by sending a New Route Responder (NRR) event, at step 917. In the case where the new route master duplicates an existing route master the two ports may be attempting to perform the full route registration protocol concurrently. This will be true if the existing route master is in the SCRFR_SENT state, in which case the UIDs of the route's end-points are compared and the port local to the end-point with the larger UID takes charge by running down the old route master and continuing as before by generating a NRR event at step 917. If the end-point that originated the SCRFR that is being processed has the larger end-point UID, then an OBM is allocated and used to prepare a SCRFR_RSP with DUPLICATE status. Then, if a SCRFR_RSP message was prepared, it is sent on the route management connection and the new route master is run down.

The (NRR) event informs the end-point referenced in the SCRFR that a new route 300 to the remote end-point incarnation specified by the remote end-point UID and remote end-point IID (incarnation identifier) is partly established through the path specified by the remote port 103(R). The remote end-point 102(R) either refuses the new route 300, or approves it and provides the port 103(R) with a responder ep_info structure, containing end-point information for the remote end-point 102(R), to transmit to the local end-point 102(L). In either case, the remote port 103(R) sends a SCRFR_RSP message, at step 925, to the local port 102(L) via the route management connection. Refusal causes the SCRFR_RSP status field to be set to REFUSED to indicate that the remote end-point refused the route, and the route's resources are run down. Approval updates the state of the route master 406 to SCRFR_RSP_SENT, sets the SCRFR_RSP status field to SUCCESS, and causes the message to convey the route's local and remote end-point incarnations (UID and IID), the responder's ep_info structure generated by the remote end-point, and a full route handle that can be used to direct messages from the local end-point 102(L) to the remote end-point 102(R) via the route 300.

Also in response to receipt of the SCRFR message at step 915, the local port 102(L) sends an ACK 920, either explicitly or piggybacked on the SCRFR_RSP, as part of the route management connection's protocol.

Receipt of the SCRFR_RSP with status field SUCCESS sent at step 925 causes the local port 103(L) to record the responder's route handle in the route master 406, change the state of the route master 406 to ACTIVE, and generate a Route Completed Originator (RCO) event at step 927, thus establishing the route at both the local port 103(L) and the local end-point 102(L), at step 930. The Route Completed Originator event informs the end-point that had previously approved the route 300 that the route is now complete and supplies the ep_info provided by the remote end-point. Because full route registration origination is flow controlled on each route management connection, a pending full route registration can now be started. Receipt of the SCRFR_RSP with a status field indicating anything other than SUCCESS causes the local port to run down the route master.

In response to receipt of the SCRFR_RSP at step 925, local port 102(L) sends an ACK 933 to remote port 102(R), either explicitly or piggybacked on another available message, as part of the route management connection's protocol. Receipt of that ACK causes the remote port to change the state of the route master 406 from SCRFR_RSP_SENT to ACTIVE and generate a Route Completed Responder (RCR) event at step 935, thus establishing the full route at the remote end-point 102(R) at step 940. More specifically, receipt, by the remote port 103(R), of a SCRFR_RSP ACK (at step 933) or receipt of the first message on the route 300 establishes the route from the local end-point 102(L) to the remote end-point 102(R), at step 940.

End-points 102(*) can remove the demand for new routes to a remote end-point by issuing a Derequest Remote End-Point message. A Deregister Full Route protocol is used to terminate a route. The Deregister Full Route process is triggered either by a Delete Route request by one of the route's end-points 102(*) or the failure of one of the route's end-point incarnations 410/411.

Route Set and Route Set Management Connection Establishment

As shown in FIG. 7, a route set 600 and a route set management connection 602 are established between end-point incarnations 410/411 at steps 725 and 730. Details of these steps are described with respect to FIGS. 10A, 10B and 10C, which are flowcharts showing exemplary steps performed in establishing a route set 600 and a route set management connection 602. Attributes of a route set 600 include a list of connections 601 between processes on the local end-point 102(L) and processes on the remote end-point 102(R) and a list of routes 300 to the remote end-point. A routing layer program running on an end-point 102(*) provides grouping of routes 300 into route sets 600, and uses a route set 600 to find candidate routes 300 to use for transmissions to the routing layer program running on the corresponding remote end-point 1013(*).

Route set and route set management connection establishment are driven by the New Route Originator (NRO) 910, New Route Responder (NRR) 917, Route Completed Originator (RCO) 927, and Route Completed Responder (RCR) 935 events that are generated by the ports 103(*) to the end-points 102(*) during full route registration. Thus, route set and route set management connection establishment are done by the end-points 102(*). Ports 103(*) are only involved in that they generate the events and communicate the ep_info data opaquely.

Figure 10A:
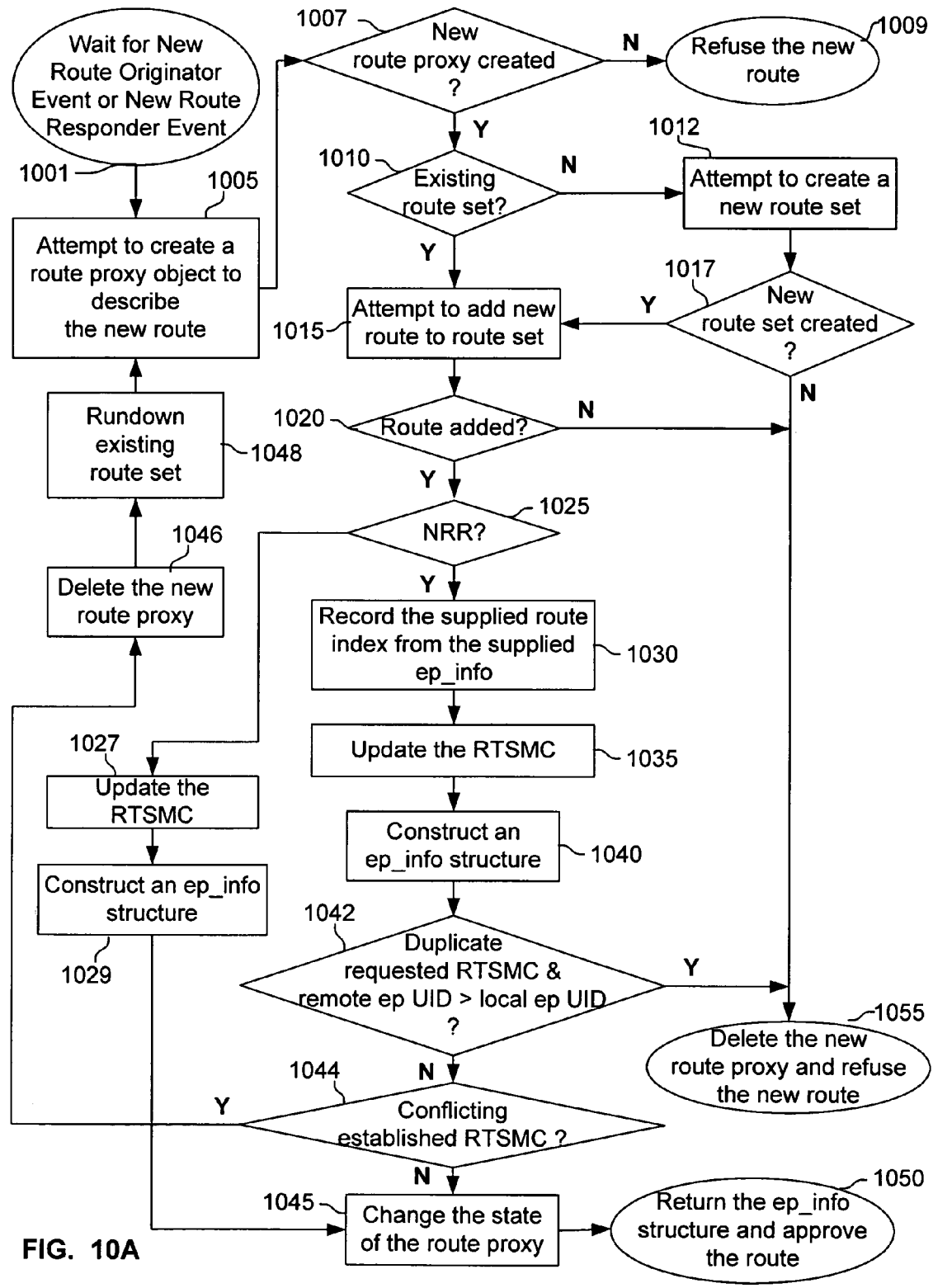
FIGS. 10A-10C are flowcharts showing exemplary steps performed in establishing a route set.

As shown in FIG. 10A, at step 1001, the routing layer 230 waits for a New Route Originator (NRO) or New Route Responder (NRR) event. When an NRO or NRR event is detected, a route proxy object 408 is created (at step 1005) that describes the new route 300. The route proxy 408 is described in detail below. If (at step 1007) a new route proxy 408 was not successfully created, then the new route 300 is refused. If a new route proxy 408 was created, then the UID and IID of the route proxy's remote end-point are used to find a corresponding route set among existing route sets 600(*) at step 1010. If a corresponding route set is found, then the new route proxy 408 is grouped with the other route proxies to the same end-point incarnation by attempting to add the route proxy to the found route set 600 at step 1015. If no corresponding route set 600 presently exists, then the local end-point routing layer 230 attempts to create a route set 600 to the remote end-point 102(R) described in the new route event, at step 1012. If (at step 1017) a new route set 600 was successfully created, then the new route proxy is added to that route set at step 1015 as its first member, otherwise the new route 300 is refused, at step 1055. If the attempt to add the new route to the route set 600 (step 1015) failed (test at step 1020) (e.g. the route set was full), the new route proxy 408 is deleted and the new route is refused, at step 1055.

If the new route 300 was added in response to an NRR event (at step 1025), then the supplied route index is copied from the supplied ep_info, and the route set management connection (RTSMC) 602 is updated accordingly, at steps 1030 and 1035, respectively. An ep_info structure is then created for the remote end-point 102(*) at step 1040, and processing continues at step 1042, described below. If the new route 300 was added in response to an NRO event, then the route set management connection is updated at step 1027, and an ep_info structure is created for the remote end-point 102(*) at step 1029.

When two end-point incarnations 410/411 attempt to establish a route set management connection 602 between them simultaneously, only one RTSMC 602 should be created. When attempted on a single route 300, the SCRFR protocol resolves this conflict and generates a NRR event at only one end-point 102(*). However, when route set management connection establishment is attempted on two separate routes, NRR events will occur at both end-points 102(L)/102(R). To avoid creating two route set management connections 602, end-point UIDs are compared, and only the end-point 102(*) with the higher UID approves the route 300. Note that this UID comparison must be done with the same sense as that done in the SCRFR protocol in order to avoid refusing both attempts to create a route. Thus, at step 1042, if a duplicate route set management connection 602 exists in the requested state and the remote end-point UID has a value which is not greater than the local end-point UID, then the new route proxy 408 is deleted and the new route is refused, at step 1055.

Certain event conditions constitute a conflicting route set management connection 602 and thus cause an existing RTSMC 602 to be run down. The corresponding event is then processed as if the existing RTSMC were unknown. Those conditions include the following:

A NRR event whose originator and responder end-point UIDs and IIDs match those of an existing route set 600, but whose conn_id_requester does not match the RTSMC's outbound connection_id (field 1408 in the routing header, described below). This implies that a stale RTSMC 602 exists at the responder.

A RCO event whose conn_id_acceptor does not match the RTSMCs outbound connection_id. This implies that a stale RTSMC 602 exists at the originator.

When one end-point incarnation 410/411 attempts to establish a route set management connection 602 via two routes simultaneously, no special action is needed because both NRR events will reference the same conn_id_requester.

An end-point 102 can come up, go down, and then come back up with a new incarnation 410/411 fast enough so that the NRO and NRR events can arrive from the second (new) incarnation before those of the first incarnation. Therefore, both route sets 600 are initially allowed to be established, after which the stale one will fail naturally because it will be unable to deliver messages. When an end-point 102 has a choice of more than one route set 600 to a given end-point destination, preference is given to the last route set to become established. In addition, to accelerate the demise of the stale route set, when an end-point successfully sends a message on a RTSMC 602 and receives a response to that message, then the RTSMC is known to be functioning and any other route sets that exist to other incarnations of that end-point are stale and can be run down.

At step 1044, if there is no conflicting established route set management connection 602, then the state of the route proxy 408 is changed to indicate that the corresponding route 300 is in the process of being established, at step 1045. At step 1050, the ep_info structure that was constructed at step 1040 or 1029 (and mentioned in the description of FIG. 9) is passed to the port for transmission to the remote end-point and the route 300 is approved. Included in the ep_info structure are the inbound half route's identifier and the route's local route index (local_route_index), which is the index of the corresponding route proxy 408 in the local route set's route_proxies array (an attribute of the route set object 417, described below). The local route index value is sent to the remote end-point 102(R) during full route registration, where it is used by the remote end-point's routing layer 230 to identify the described route in the routing headers of subsequent messages sent on a particular route set 600.

If (at step 1044) there is a conflicting established route set management connection 602, then the new route proxy 408 is deleted at step 1046, the existing route set 600 is run down at step 1048, and an attempt is made to create a route proxy object 408 to describe the new route 300, at step 1005, and the above-described process is repeated.

Figure 10B:
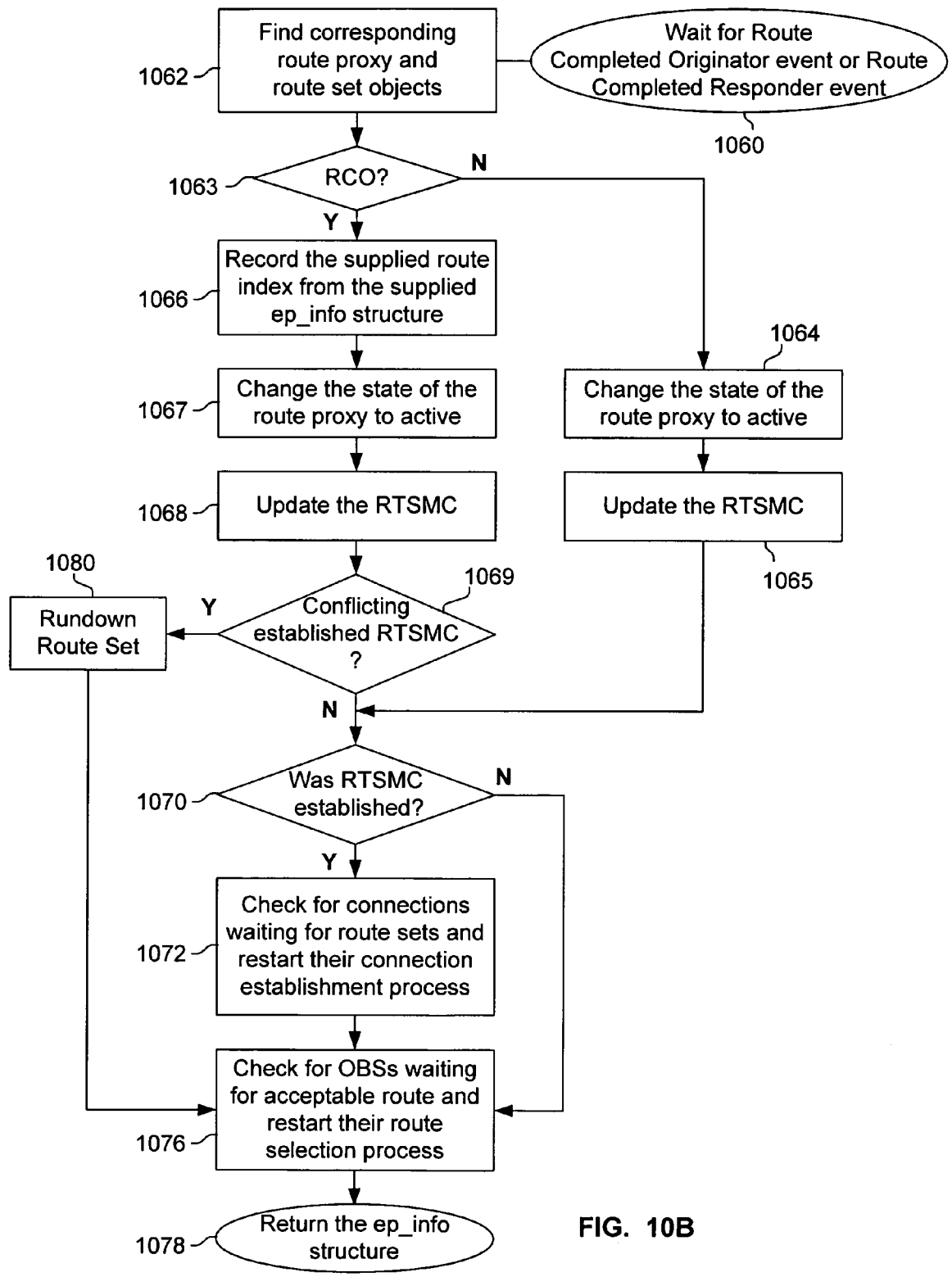

As shown in FIG. 10B, at step 1060, the routing layer 230 waits for a Route Completed Originator (RCO) event or Route Completed Responder (RCR) event. When either an RCO or RCR event is detected, then the corresponding route proxy and route set objects 408/417 are located, at step 1062 as the states of these objects will be changed in response to the RCO/RCR event. If (at step 1063) a Route Completed Originator event was detected, then the supplied route index is recorded from the supplied ep_info structure at step 1066, and the state of the route proxy 408 is changed to active, at step 1067. The route set management connection 602 is then updated accordingly, at step 1068. At this point, the state of the route set management connection 602 may change in response to receiving the RCO event. In the situation wherein the RTSMC 602 is in the 'requested' state, and an RCO event is received in conjunction with an unknown connection ID, the state of the RTSMC is changed to established.

At step 1069, if there is a conflicting established route set management connection, then the route set is run down, at step 1080, and processing continues at step 1076; otherwise, processing continues at step 1070.

If a Route Completed Responder event was detected at step 1063, then the state of the route proxy is changed to active, at step 1064, and the route set management connection is then updated accordingly, at step 1065. Here, the state of the route set management connection 602 may change in response to receiving various events. In the situation wherein the RTSMC 602 is in the 'accepted' state, and an RCR event is received, the state of the RTSMC is changed to established.

At step 1070, if the route set management connection 602 was successfully established, then a check is made for connections 601 waiting for route sets and their connection establishment process is restarted, at step 1072. If the route set management connection 602 was not successfully established, then step 1072 is skipped.

At step 1076, a check is made to see if there are any outbound sequences (OBSs) waiting for an acceptable route and, if so, their route selection process is restarted (see 1325). At step 1078, the ep_info structure is passed to the port for inclusion in the SCRFR_RSP message, as indicated above with respect to FIG. 9.

Figure 10C:
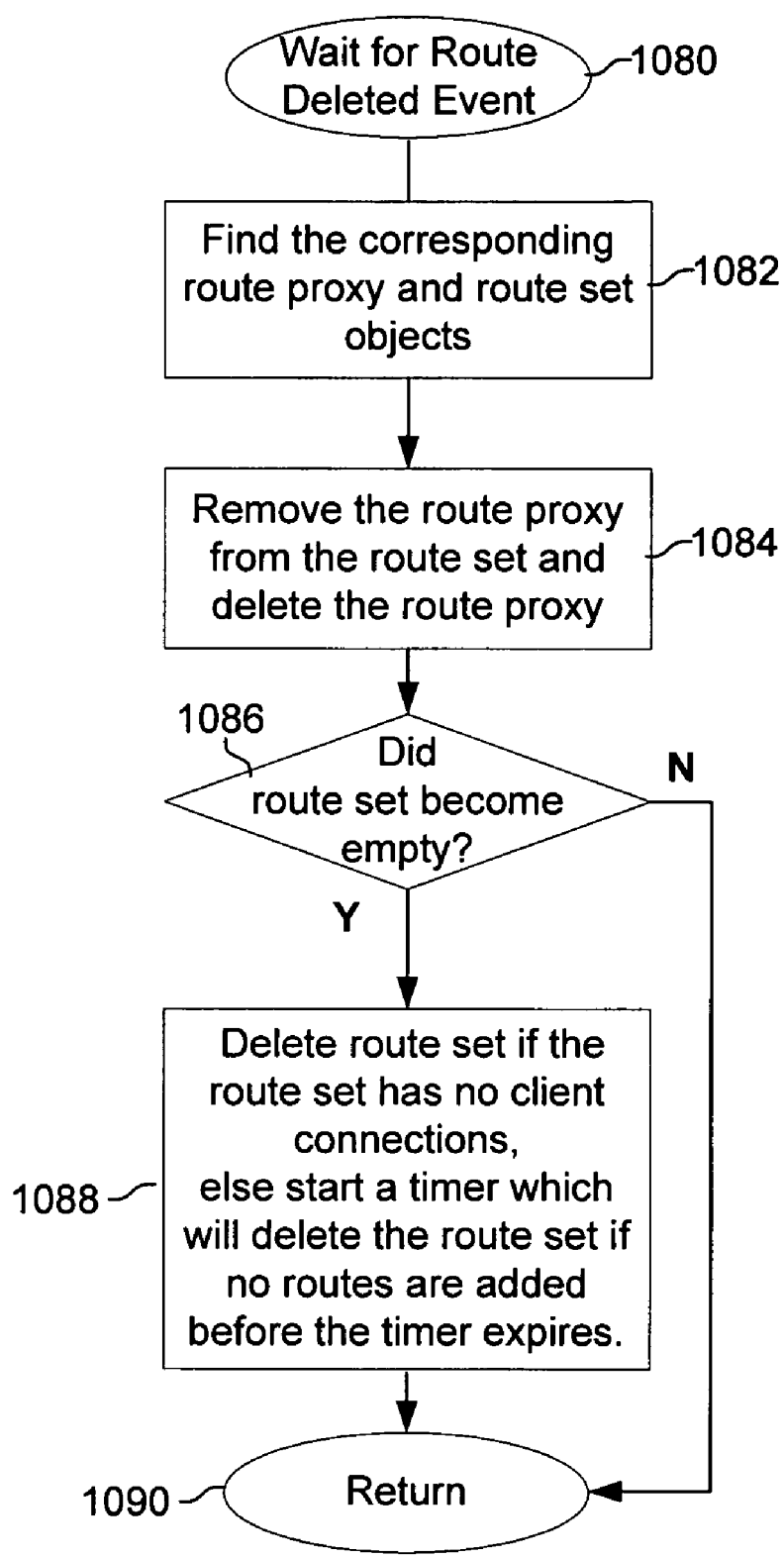

As shown in FIG. 10C, at step 1080, routing layer 230 waits for a Route Deleted event, which is generated to remove a failed route 300 from a route set 600. When the network layer 240 delivers a route deleted event to the routing layer 230, it removes a failed route 300 from a route set 600. In addition, a route set 600 is automatically deleted as a result of events including the following:

no connection has existed on the route set 600 for a substantial period, e.g., on the order of an hour. This indicates that there is no demand for the route set;

no route has existed within the route set 600 for a substantial period, e.g., on the order of an hour. This indicates the route set cannot be supplied; or no connection exists on the route set 600 and no route exists in the route set.

When a Route Deleted event is detected, at step 1082, the corresponding route proxy and route set objects 408/417 are located. At step 1084, the route proxy 408 is removed from the route set 600 and deleted.

At step 1086, if the route set 600 is now empty, then (at step 1088) if the route set has no client connections, the route set is deleted, otherwise a timer is started which will delete the route set if no routes 300 are added before the timer expires. If the route set 600 is not empty at step 1086, then Route Deleted event processing terminates, at step 1090.

Application Connection Establishment

As shown in FIG. 7, a connection 601 between local and remote end-point applications 101 (*) is established at step 735. These application connections are derived from a routing layer connection base class. The aspects of the application connection described in this section are actually those provided by the routing layer connection, and thus only the routing layer connection is described subsequently.

As explained above, route set 600 also provides a route set management connection 602 that is used to manage the routing layer connections 601 established on the route set. This includes the communication of Connect Request and Connect Accept messages used to establish the connections as well as the Connect Abort message used to destroy the connections.

During routing layer connection establishment, routing layer 230 assigns connection IDs. Once the connection is established, the request layer copies the connection ID into the routing header of each outbound message, and dispatches incoming messages to their proper client based on the connection ID in the received routing header. The routing header (1400) is described in detail with respect to FIG. 14, below. Each routing layer connection 601 is established on a route set 600. The route set 600 defines the set of available routes 300 that can be used by the connection 601.

Routing layer 230 relies on the transport layer 220 to send and receive messages on a route set management connection 602. In this role, the routing layer 230 is merely a client making use of transport layer functionality. Thus, the transport layer 220 must allow each connection 601 to have a different client.

Figure 11:
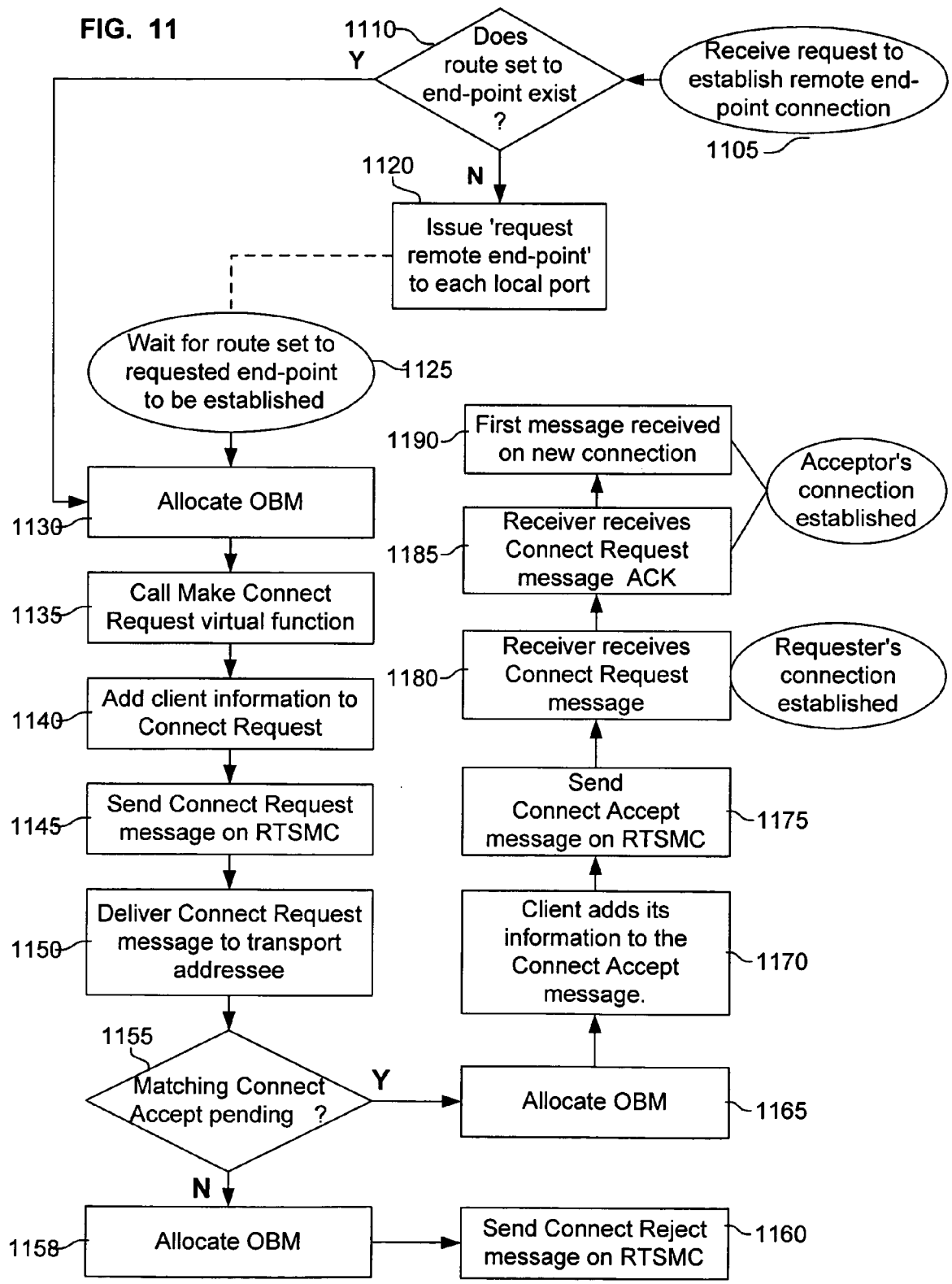
FIG. 11 is a flowchart illustrating exemplary steps performed in handling a request to establish a connection between end-point applications.

FIG. 11 is a flowchart illustrating exemplary steps performed in handling a request to establish a connection 601 between end-point applications 101 (*). As described in detail in the present section, the routing layer 230 establishes an application connection 601 with a three-way handshake beginning with a Connect Request message on the route set management connection 602. Receipt of a Connect Accept message completes the handshake at the requester and receipt of either the connect accept ACK or the first message on the routing layer connection 601 completes the handshake at the acceptor.

As shown in FIG. 11, at step 1105, when routing layer 230 receives a request to establish a connection 601 to a remote end-point 102(*), the routing layer must first find an established route set 600 to that remote end-point. This is accomplished by a standard software lookup procedure.

At step 1110, if no established route set 600 exists, the routing layer will attempt to create a route set 600 by issuing a request remote end-point message to each of the network layer's local ports at step 1120. This triggers an autonomous full route registration process in the network layer's local port, as described above with respect to FIG. 9. From this point on, route establishment and route set establishment are driven by events generated by the network layer 240.

At step 1125, a routing layer routine waits for a route set 600 to the requested remote end-point 418 to be established. After the route set 600 and a route set management connection 602 are established to the requested remote end-point 418, then an OBM is allocated by the client wanting to send the message, at step 1130.

At step 1110, if an established route set 600 exists to the remote end-point 102(R), then an OBM (outbound message object) is allocated by the client wanting to send the message, at step 1130, and processing continues as described below with respect to step 1135.

In the present case, routing layer 230 is the client. An OBM is an object that is shared between the routing layer and its client, and used by the routing layer's client to describe a message that is to be sent by the routing layer. The OBM is passed to the routing layer in various functions that select routes and send messages. In the present case, the routing layer allocates an OBM so that it can send a Connect Request message on a route set management connection. Once the OBM is allocated, the routing layer calls a Make Connect Request virtual function, at step 1135, to allow the routing layer's client to add its information to the Connect Request message being constructed within the OBM, at step 1140. The Connect Request message is then sent on the route set management connection 602 to the remote end-point 102(R), at step 1145.

When the Connect Request message is received by routing layer 230 at the remote end-point 102(R), the routing layer delivers it to the transport layer entity to which the message is addressed, at step 1150. The transport (or a higher layer) then determines whether or not a matching Connect Accept message is pending, at step 1155. If there is a pending Connect Accept, then an OBM is allocated by the routing layer, at step 1165, and the routing layer calls a MakeConnectRequest virtual function to allow the routing layer's client to add its information to the Connect Accept message, at step 1170. The Connect Accept message is then sent on the route set management connection 602, at step 1175.

If no matching Connect Accept is pending when the Connect Request message arrives at the receiver at the remote end-point 102(R), then the routing layer allocates a OBM and responds with a Connect Reject message, at step 1160.

When the Connect Accept message is received, at step 1180, the routing layer application connection 601 becomes established at the requestor, and the routing layer's client is notified with a ConnectRequestDone virtual function associated with the connection.

The routing layer application connection 601 becomes established at the acceptor when the ACK to the Connect Accept message is received (step 1185) or the first message is received on the new connection by the remote end-point 102(R) (step 1190). A ConnectAcceptDone virtual function then notifies the routing layer's client that the connection has been successfully established.

Route Selection

Once a connection, including an application connection 601 or a route set management connection 602, is established between end-points 102(*), the clients of that connection can use it to exchange messages reliably. Each message (e.g., a Connect Request message) is preferably sent via its initial transmission, and retry transmissions are used by the transport layer to assure that messages are delivered reliably in the same manner employed by TCP. In the present system, the transport layer 220 requests that the routing layer 230 send these transmissions and the routing layer selects a route 300 for each transmission and then sends the transmissions via the selected route.

The present route selection method is based on the notion of acceptable routes. An acceptable route is one that meets all of the following constraints:
- the outbound half route 500 is enabled and in the active state;
- the outbound half route's transmission rate is below its transmission rate limit; and
- the outbound half route's local port 103(L) has the resources required to send a transmission, including an available outbound sequence (OBS) object, which is the primary object describing a transmission to be sent.

As shown in FIG. 7, at step 740, a route 300 between two end-points 102(*) is selected in response to a route selection request. Route selection is done each time the routing layer 230 sends a transmission, which may be the initial transmission of a message, a retry transmission of a message, or an ACK. The route selection process is described in detail with respect to FIGS. 12A and 12B. Before making a route selection request, the routing layer client must first allocate and construct an OBM that describes the outbound message to send, and this OBM must be available for queueing in the case where not acceptable route is available.

Figure 12A:
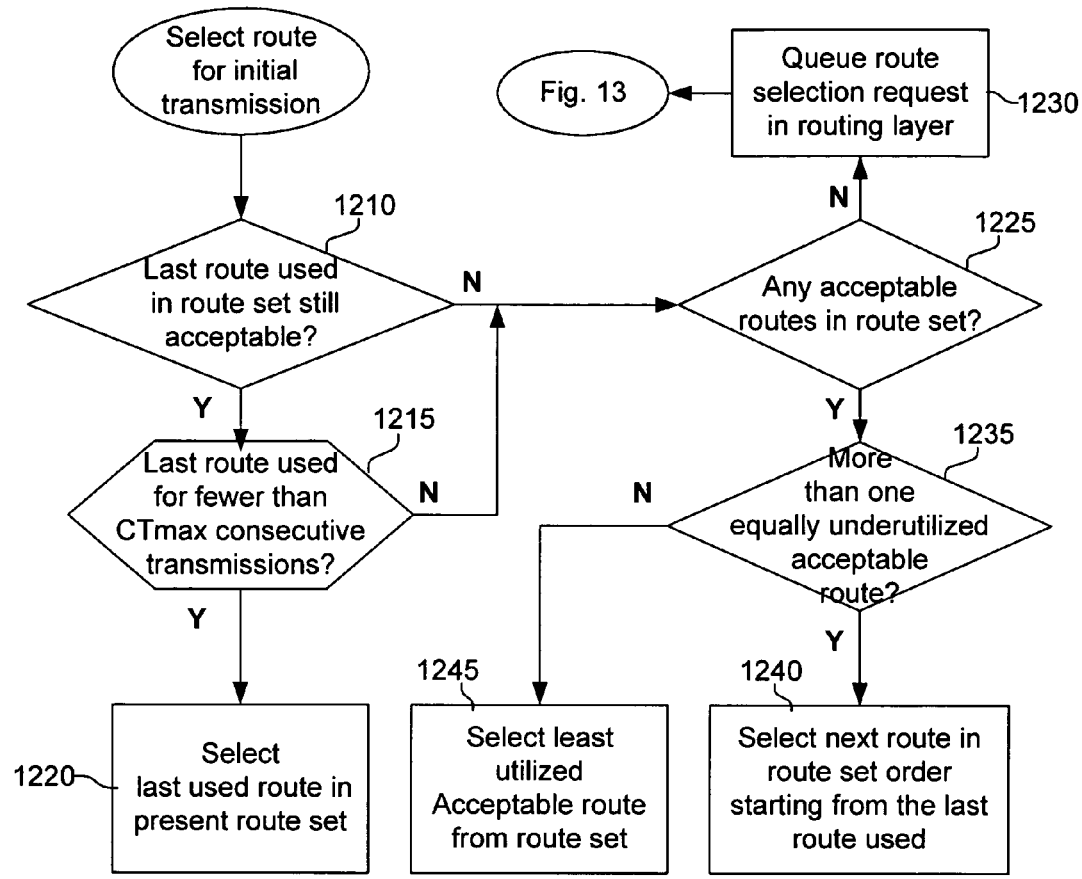
FIG. 12A is flowchart illustrating exemplary steps performed in selecting a route for initial transmission.

FIG. 12A is flowchart illustrating an algorithm comprising exemplary high-level steps performed in selecting a route 300 for an initial transmission. As shown in FIG. 12A, when selecting a route for an initial transmission, the last route 300 used within the route set 600 is selected if it is still acceptable (step 1110) and has been used for fewer than some small number of consecutive transmissions CTmax (step 1215). The value of CTmax is selected by the implementer, but is typically approximately 5, and tends to amortize the selection computation over that number of transmissions.

At step 1225, a determination is made as to whether there are any acceptable routes 300 in the route set 600. If no acceptable routes are found, then at step 1230, the OBM supplied in the route selection request is queued in the routing layer. If there are a plurality of acceptable routes 300 in the route set 600 that are equally underutilized (step 1235), then a route is selected from these equally underutilized acceptable routes at step 1240, that is next in route set order starting with the last route used; otherwise, the least utilized acceptable route from the route set 600 is selected at step 1245.

Figure 12B:
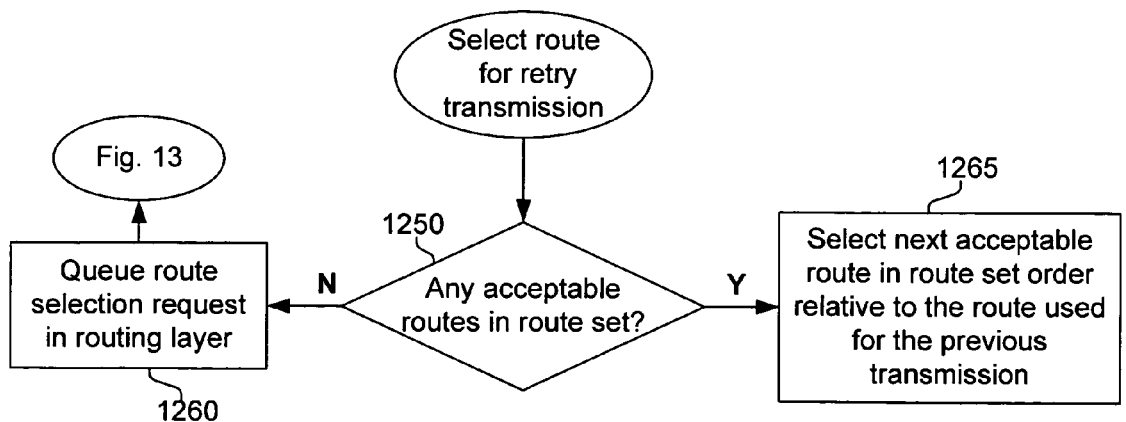
FIG. 12B is flowchart illustrating exemplary steps performed in selecting a route for a retry transmission.

FIG. 12B is flowchart illustrating exemplary high-level steps performed in selecting a route 300 for a retry transmission. As shown in FIG. 12B, at step 1250, a determination is made as to whether there are any acceptable routes 300 in the route set. If acceptable routes exist, then, at step 1265, the route 300 is selected which is the next acceptable route in route set route order relative to the route used for the previous transmission of the message being retried. This procedure assures that for any given message, all acceptable routes are tried before any are retried. If no acceptable routes 300 exist in the route set 600, then at step 1260, the OBM supplied in the route selection request is queued within the routing layer 230.

When a route's state changes such that it may now be acceptable, the route selection algorithm of FIG. 12A/B is executed, and queued route selection requests may complete asynchronously. The passing of time will automatically lower a route's transmission rate below its transmission rate limit and when the other constraints are met, then transmissions will be sent at the route's transmission rate limit. A method of controlling the transmission rate for a given half route 500 is described below with respect to FIG. 17.

Queuing

Figure 13:
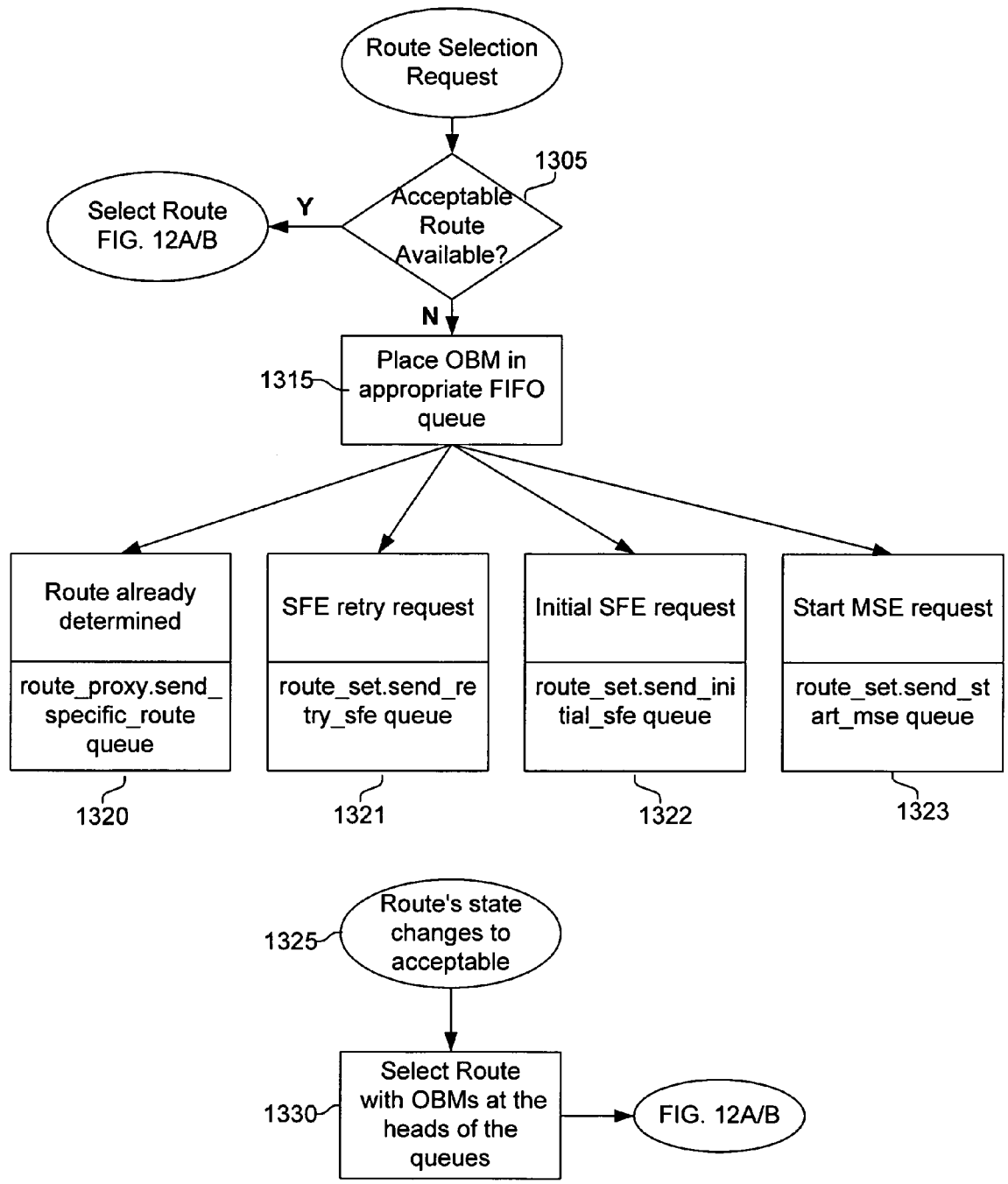
FIG. 13 is a diagram showing exemplary steps and queues used in queuing route selection requests.

FIG. 13 is a diagram showing exemplary steps and queues used in queuing route selection requests. As shown in FIG. 13, when a route selection request is received by the routing layer 230 (FIG. 12A, step 1230, or FIG. 12B, step 1260), a determination is made as to whether any acceptable routes 300 are presently available within the specified route set 600, at step 1305. If an acceptable route 300 exists, then route selection proceeds in accordance with the steps shown in either FIG. 12A or FIG. 12B. When no acceptable routes 300 are available within the specified route set 600, the OBMs supplied in the requests to select routes are queued within the routing layer 230, at step 1315. When a route's state changes such that it may now be acceptable, the route selection algorithm described with respect to FIG. 12A/11B is executed and queued route selection requests may complete asynchronously. Because an acceptable route must have a transmission rate that is below its transmission rate limit, the routing layer is able to control transmission rate using its queueing mechanism. This feature is used to back off transmission rate when a route becomes congested.

Each route selection request issued to the routing layer 230 is described by an outbound message (OBM) object that the routing layer may queue. When no acceptable route is available, the request's OBM is placed on one of the following prioritized FIFO queues:

1. A route_proxy.send_specific_route queue 1320 is used to queue requests for which the route has already been determined. Although no route selection is done in this case, route status must be acceptable and an outbound sequence (OBS) must be allocated; these are effectively route selection functions. These requests, for which the route has already been determined, are given highest priority because the delivery of an End_MSE (end multi-sequence exchange) frees resources and because the local resource allocation is constrained.
2. A route_set.send_retry_sfe queue 1321 is used to queue route selection requests for retry SFEs (single frame exchanges). These requests are given second highest priority because they indicate that connection message delivery is probably stalled at the remote end-point.
3. A route_set.send_initial_sfe queue 1322 is used to queue route selection requests for sends of initial SFEs. These requests are given third highest priority because they will stall the connection's message transmission unless satisfied.
4. A route_set.send_start_mse queue 1323 is used to queue route selection requests for Start_MSEs (start multi-sequence exchanges).

When a route's state changes such that it may now be acceptable (step 1325), the route selection algorithm of FIG. 11A/11B is executed with the OBMs at the heads of these queues for the corresponding route proxy 408 and route set 600 in the priority order listed above, at step 1330. If the route selection algorithm indicates that a route 300 is acceptable for an OBM, the OBM is dequeued. Then an OBS is allocated from the route's local port 103(L), and after the OBS is prepared it is transmitted via the local port 103(L).

When the route selection algorithm determines that a route 300 is unacceptable because no OBS is available on the route's local port 102(L), the corresponding route set 600 is queued to the local port. When an OBS becomes available on that local port, route sets 600(*) are dequeued and their route selection algorithm is run until one consumes the available OBS. Because a route set 600 may need to be queued to several local ports 103(*) simultaneously, the unacceptable route's route proxy 408, instead of the route set, is queued to the local port 103(L). Instead of dequeueing a route set 600, a route proxy 408 is dequeued along with all other route proxies in that route's route set 600 that use the same local port 103(L).

Route Order

The two end-points 102(*) of a route set 600 each determine an order for the routes 300 in the route set. There are several reasons for route ordering. First, when a route 300 becomes unacceptable, it is desirable to quickly select a next route from the same route set that is largely independent of the old route. Since route independence is relatively static, a next route can be predetermined for each route. In addition, when a series of two or more routes becomes unacceptable, it is desirable to quickly select a next route from the same route set that is largely independent of each route in the series of unacceptable routes. All routes of a route set may be placed in a circular queue to facilitate this route selection.

Each end-point 102(*) determines route order independently, using locally available information, and then communicates that order to the corresponding remote end-point. The remotely determined route order is used to select the next route for transmission because it may include information about route independence that is not available locally. When a new route 300 is added to a route set 600 or removed from a route set, the route set's route order changes and the new route order is communicated via a route set management connection message. While changes in route set order may cause transient anomalies in route selection, these anomalies do not cause incorrect network behavior and should disappear quickly.

Route Order Report (ROR) messages are sent on the route set management connection 602 to communicate a route set's locally determined route order to the remote end-point 102(R). The ROR is a one-way sequenced message that includes a count field indicating the number of routes 300 in a route set 600 and an array containing an ordered list of the sender's remote_route_index values of the routes in the sender's local route set route order. The remote_route_index comprises indicia of the remote route proxy 408 for a given route 300 in the remote route set object's route_proxies array.

Route order determination is not architecturally constrained, because it does not affect correctness of operation. However, route order can have a significant effect on performance. In general, successive routes 300 in a route set 600 should share as few common components or resources as possible. This is desirable in error recovery, to maximize chances of a retry succeeding. It is also desirable for load balancing, where the goal is to spread the load as uniformly as possible across the available components. The manner in which the route ordering is determined is described in a related application.

Routing Header

All routing layer transmissions include a routing header 1400. The routing layer 230 uses information in the routing header 1400 to monitor transmissions on each half route 500 to determine the half route's quality, by determining whether a half route is delivering transmissions promptly, has lost recent transmissions, or is experiencing delay. Inbound half route quality is computed at the receiving routing layer and converted to a transmission rate limit, which is communicated back to the transmitting routing layer in the routing header where it is used by a route selection algorithm (e.g., the algorithm of FIGS. 12A/B) to choose the best route 300 of a route set 600 for sending future transmissions. Finally, the routing header contains the routing layer connection's connection_id that was discussed in reference to FIG. 11.

In an alternative embodiment, the routing layer places information into the routing header of each transmission sent on a route set that describes multiple (or even all) routes of that route set. However, the result is expensive both in transmission header efficiency and processing time to send and receive the transmission. In an exemplary embodiment, the routing layer 230 places monitoring information that describes a single route of the route set in the routing header 1400 of each transmission sent on that route set 600, and in the steady state, the single route described is rotated among the routes of that route set in a round-robin fashion. Thus, the described route may differ from the route used to send the transmission.

For a given transmission, the route 300 described in the routing header 1400 is called the described route (DR). In contrast, the route 300 on which the transmission is sent and received is called the receive route (RR). Routing header 1400 includes the following information about the described route:

- the DR's index, which uniquely identifies the DR to the receiver;
- the RSN of the last transmission sent on the outbound half DR;
- the time since the last transmission was sent on the outbound half DR;
- information that signals that the transmission rate limit (TRL) should be reset on the receiver's inbound half DR; and
- the computed TRL for the transmitter's inbound half DR.

Figure 14:
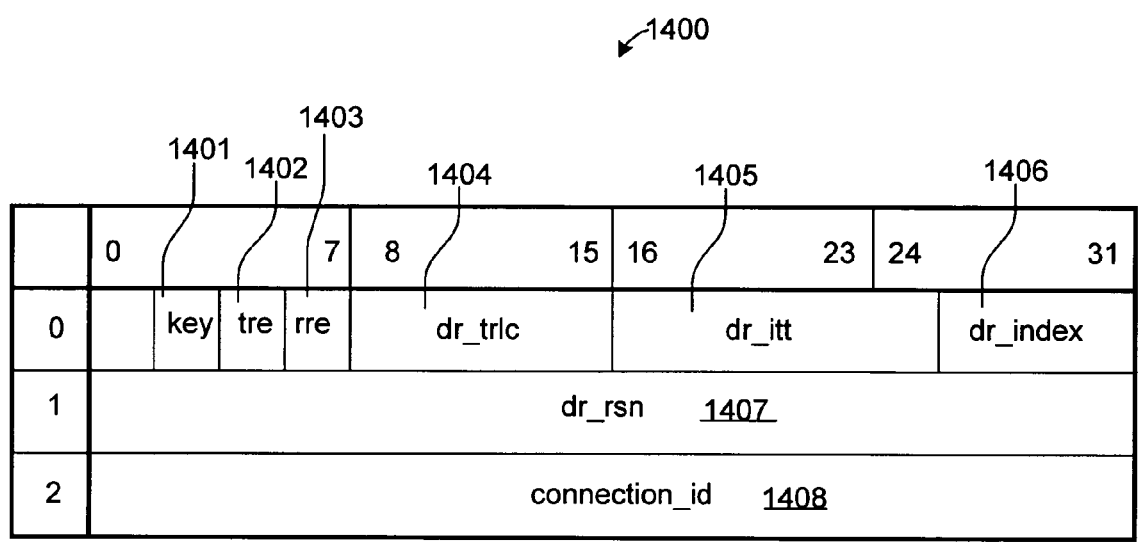
FIG. 14 is a diagram showing an exemplary routing header.

In an exemplary embodiment, the routing header 1400 contains the following fields, which are transmitted in the order listed. All fields except the connection ID describe a route in the route set known as the described route or DR. These fields are organized within an exemplary routing header as shown in FIG. 14, and described below.

dr_index_key This 2-bit field ('key' 1401 in FIG. 14) is a key that is used to validate the dr_index field at the receiver. Its value is determined by the receiver and is communicated to the transmitter during full route registration. When a transmission is received in which this value does not match the expected value then the described route information in the transmission is ignored.

dr_tre This 2-bit field ('tre' 1402 in FIG. 14) specifies the transmitter's route epoch for the outbound half DR. The receiver compares this value to the last dr_tre value received for the inbound half DR. If it differs, the receiver resets the inbound half DR's transmit rate limit to one transmission per E_D_TOV (defined in FC-FLA V2.7).

dr_rre This 2-bit field ('rre' 1403 in FIG. 14) is a copy of the last dr_tre received by the transmitter for its inbound half DR. When this field equals the receiver's outbound half DR route epoch, then the local end-point knows that the remote end-point has received its last route epoch update for the DR.

dr_tric This 8-bit field 1404 is a compressed form of the transmit rate Limit (TRL) computed by the transmitter for its inbound half DR. This value is used by the receiver to limit the transmit rate of its outbound half DR.

dr_itt This field 1405 contains an 11-bit unsigned integer representing the number of milliseconds that have elapsed since the last transmission on the transmitter's outbound half DR. If the elapsed time exceeds 2047 milliseconds, then this field contains a value of 2047.

dr_index This field 1406 contains a 5-bit unsigned integer representing the index of the inbound half DR at the receiver. This index is supplied to the transmitter during full route registration. The receiver uses this value to determine which inbound half route is being described.

dr_rsn This field 1407 contains a 32-bit unsigned integer representing the routing sequence number of the transmitters outbound half DR. This value is the number of transmissions sent on the route since it was established, modulo $2^{32}$.

connection_id This field 1408 contains the 32-bit outbound connection ID of the connection on which the message is being sent. The receiver uses this value as an inbound connection ID to find the destination connection.

End-points 102(*) monitor the quality of each inbound half route 500 using data supplied by the remote end-point 102(R) via the routing header 1400. The receiving end-point combines all said data into a single metric called the transmission rate limit (TRL). The TRL is indicative of whether a half route is delivering transmissions promptly, has lost recent transmissions, or is experiencing delay. Each TRL computed by the receiving end-point is fed back to the transmitting end-point via a field in the routing header 1400, which, in one embodiment, is sent in compressed form as the dr_trlc field 1404. At the transmitter, the TRL is used to place an upper bound on the rate of transmissions issued on the outbound half route 500 and by a route selection algorithm (e.g., the algorithm of FIGS. 12A/B) to choose the best route 300 of a route set 600 for sending future transmissions. In this capacity, the ratio TR/TRL is used to determine whether a route is acceptable and as a measure of route utilization. These processes are described below in detail with respect to FIGS. 12 and 17.

Send Processing

Figure 15A:
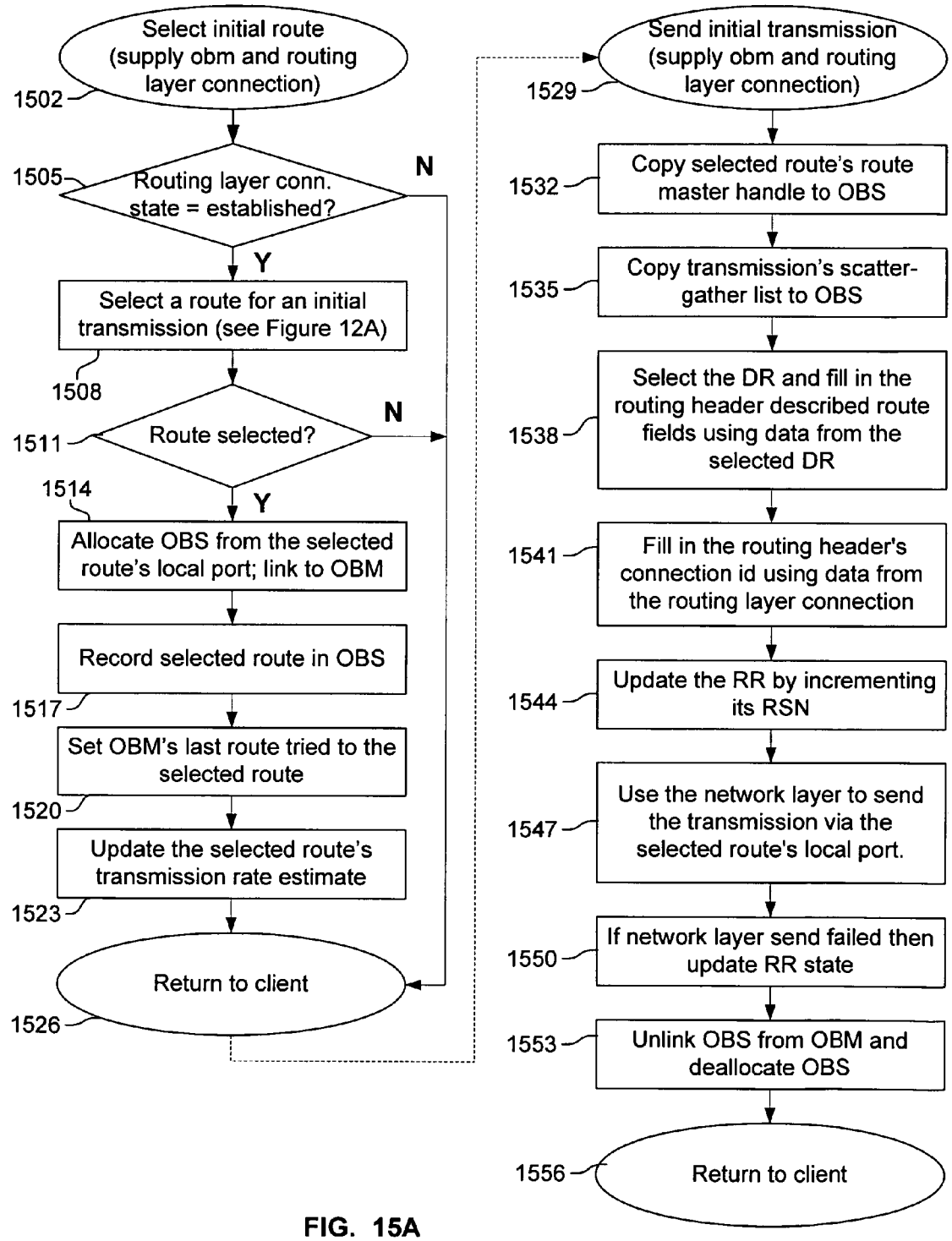
FIG. 15 is a diagram illustrating exemplary routing layer processing performed in sending transmissions.
Figure 15B:
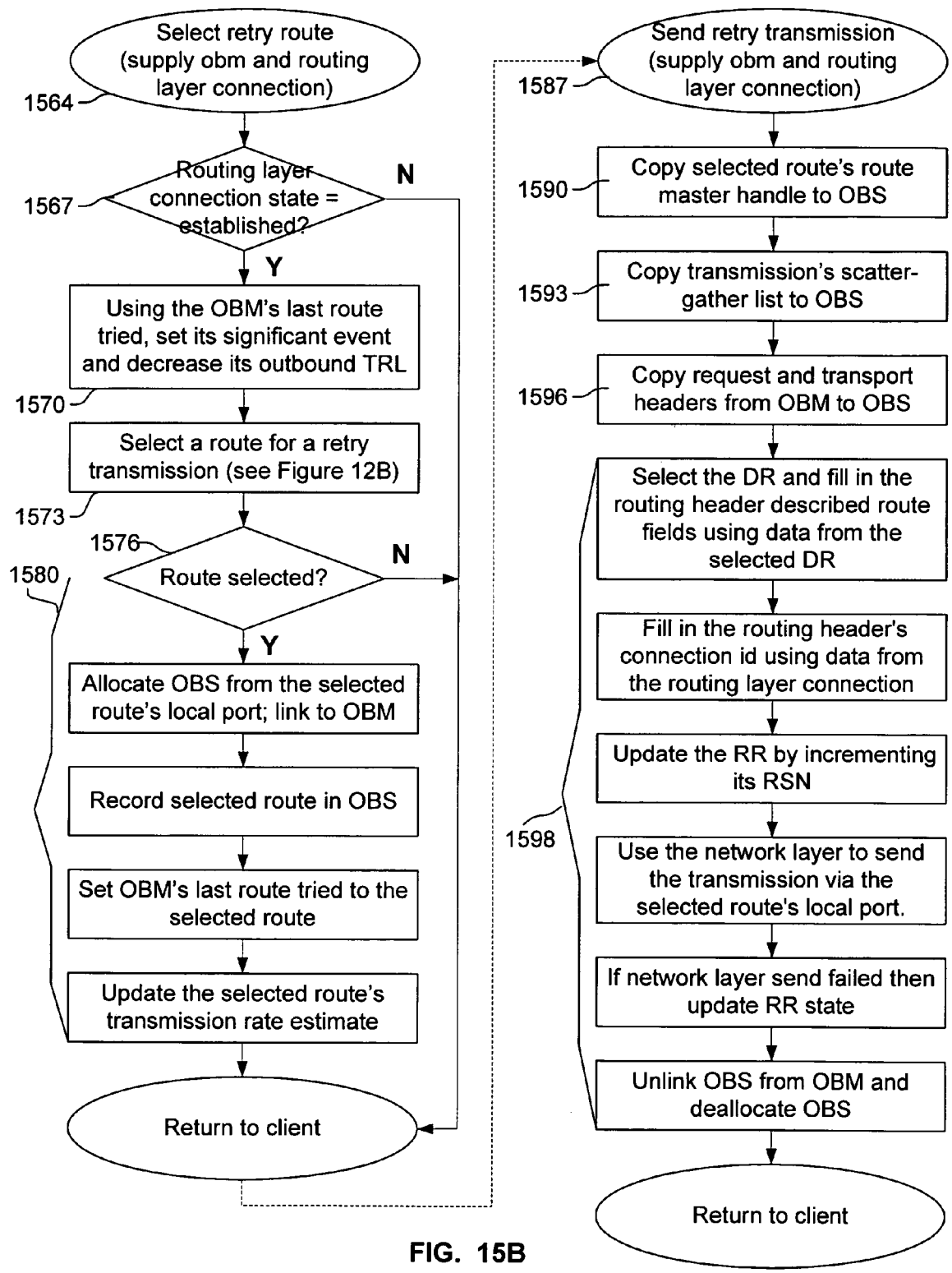

FIGS. 15A and 15B are diagrams illustrating exemplary routing layer processing performed in sending transmissions. The routing layer client sends a transmission via a routing layer connection in two phases. First, the routing layer client selects a route 300, and then the routing layer client sends the transmission on that route. The routing layer provides separate procedures for selecting and sending the initial transmission of a message, shown in FIG. 15A, and for selecting and sending retry transmissions of a message, shown in FIG. 15B.

As shown in FIG. 15A, the route selection phase for an initial transmission begins at step 1502, in which the routing layer client supplies a reference to the routing layer connection and a outbound message (OBM) structure that describes the message to be transmitted. At step 1505, the routing layer connection state is validated as suitable for sending transmissions, i.e., the connection state must be established. At step 1508, a route is selected for an initial transmission as described in FIG. 12A, queuing for an acceptable route if necessary as described in FIG. 13. Once route selection completes, the routing layer must check to see that a route was indeed selected at step 1511, because it is possible, for example, that the route set failed while the OBM was queued for an acceptable route. In the case where a route was selected, an outbound sequence (OBS) structure must be allocated from the route's local port for describing the transmission at step 1514, and linked to the OBM. The selected route is recorded in that OBS at step 1517, and the selected route is recorded in the OBM as the last route tried for transmissions of the message described therein at step 1520. Finally, at step 1523, the routing layers estimate of the selected route's outbound half route transmission rate is updated and control is returned to the routing layer client at step 1526.

Before the routing layer client requests that the routing layer send the initial transmission at step 1529, the routing layer client may update its connection state. For example, the routing layer client might start a timer that triggers a retry transmission if the initial transmission is not acknowledged before the timer expires. When the routing layer client does request that the initial transmission be sent, the routing layer starts by initializing the OBS that was previously linked to the OBM at step 1514. At step 1532, the route's route master handle is inserted in the OBS so that when the OBS is passed into the port layer then the port layer can rapidly find the outbound route. At step 1535, a scatter-gather list (SGL) is copied to the OBS that describes the OBM buffer that holds the transmission's routing, transport, and request layer headers plus the application payload buffer. Thus, the port can transmit all of this data directly from the end-point's buffers without having to first copy it into a contiguous buffer. At step 1538, the described route (DR) is selected, and the routing header described route fields are filled in using data from the selected described route. Next, the routing header's connection ID 1408 is filled in using data from the routing layer connection, at step 1541. The receive route (RR) is then updated by incrementing its RSN at step 1544. Next, the network layer 240 is used to send the transmission via the selected route's local port 103(L), at step 1547. Once the network layer completes its attempt to send the transmission, the status is checked. In the case where the network layer was unable to successfully send the transmission, then the receive route (RR) is updated at step 1550 to indicate that it is seriously congested. Regardless of the send completion status, the OBS is unlinked from the OBM and de-allocated at step 1553 and control is returned to the routing layer client.

As shown in FIG. 15B, the route selection phase for a retry transmission begins at step 1564 in which the routing layer client supplies a reference to the routing layer connection and a outbound message (OBM) structure that describes the message to be retransmitted. At step 1567, the routing layer connection state is validated as suitable for sending transmissions, i.e., the connection state must be established. Because this is a retry transmission, it is very likely that the previous transmission of this message failed, thus at step 1570 the TRL of the half route indicated by the OBM's last route tried (set in step 1520) is decreased and the half route's significant event flag is set. At step 1573, a route is selected for a retry transmission as described in FIG. 12B, queueing for an acceptable route if necessary as described in FIG. 13. Once route selection completes the route selection phase for a retry, transmission continues, and the steps shown in bracket 1580 are performed exactly as corresponding steps 1511-1523 (described with respect to FIG. 15A) for an initial transmission.

The send transmission phase for a retry transmission begins at step 1587. The routing layer starts by initializing the last OBS that was linked to the OBM. At step 1590, the route's route master handle is inserted in the OBS so that when the OBS is passed into the port layer then the port layer can rapidly find the outbound route. At step 1593, a scatter-gather list (SGL) is copied to the OBS that describes the buffer that holds the transmission's routing, transport, and request layer headers plus the application payload buffer. In contrast to the initial transmission, the SGL for the retry transmission describes a buffer for the headers that is in the OBS instead of the OBM, and the request and transport headers are copied from the OBM to the OBS in step 1596. This allows the routing layer to modify the routing header without risking modifying said header of the initial transmission of the message which may not be complete at the time of the retransmission. Once the header copy completes the send transmission phase for a retry, transmission continues, and the steps shown in bracket 1598 are performed exactly as corresponding steps 1538-1556 (described with respect to FIG. 15A) for an initial transmission.

Receive Processing

Figure 16:
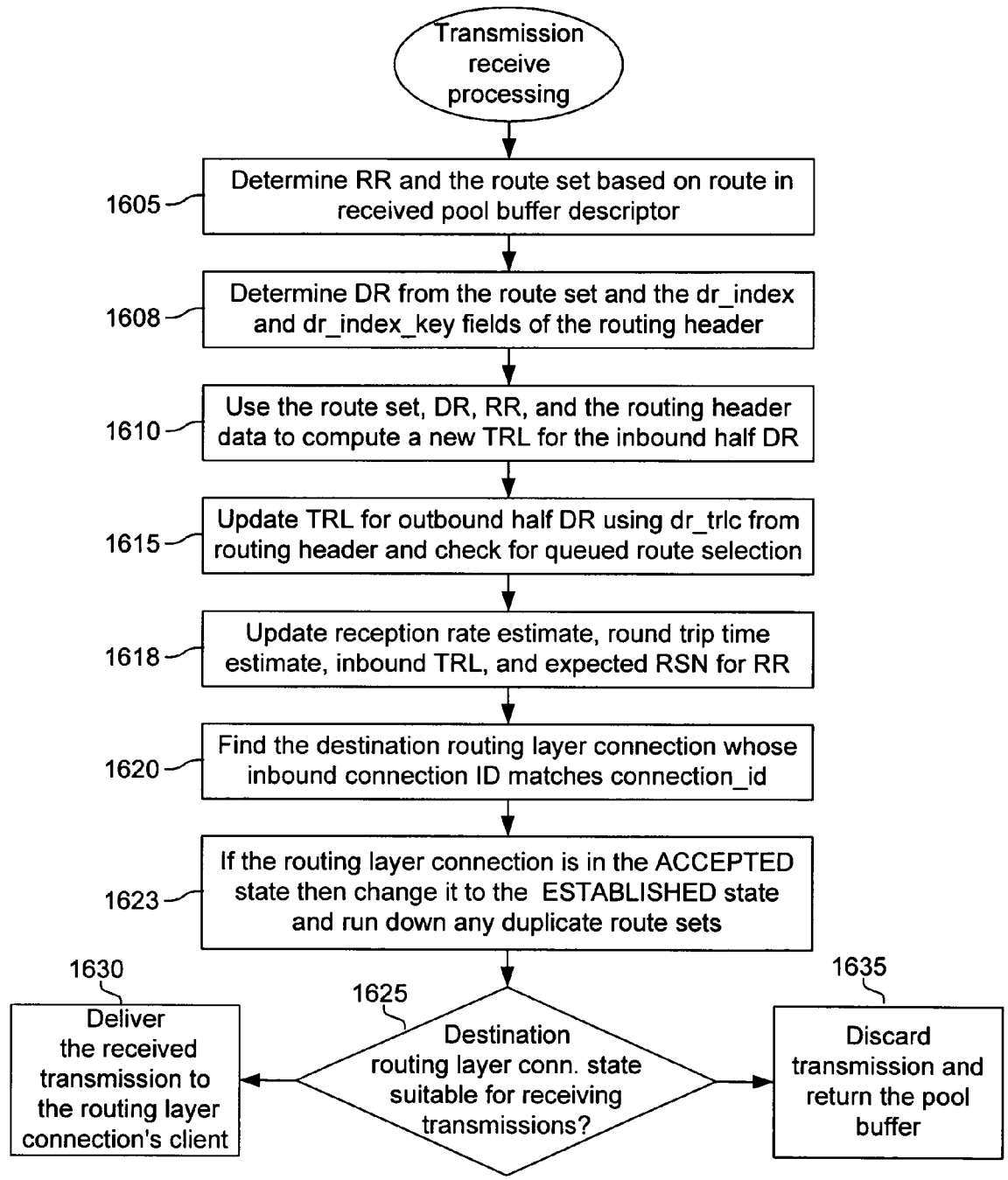
FIG. 16 is a diagram illustrating exemplary routing layer processing performed in receiving transmissions.

FIG. 16 is a diagram illustrating exemplary routing layer processing performed in receiving transmissions. As shown in FIG. 16, the routing layer performs the following exemplary steps with respect to each received transmission. Initially, at step 1605, context is established from a pool buffer descriptor, which includes indicia of the route over which the transmission was received, and information supplied by the receiving port about how the transmission was received. In an exemplary embodiment of the present system, communicating applications 101 (*) create buffer pools, containing pool buffers, to directly receive messages bound for them. When an application 101 requests or accepts a connection 601, it specifies the buffer pool into which messages received on that connection should be stored. In an exemplary embodiment, end-point memory 421 is used for the buffer pools, as applications 101 are executed in that memory space. However, when a pool buffer (i.e., a buffer within the buffer pool) is posted for receive, a description of that buffer is passed to the associated port 103 and that memory becomes shared between the end-point 102 and the port until the pool buffer is consumed. This allows the port to receive a transmission directly into the pool buffer without the need to copy the data from the port memory 420 to end-point memory 421.

Given the route over which the transmission was actually received, the routing layer is able to determine the corresponding RR and the route set 600 at step 1605. The DR is determined at step 1608 from the route set itself and dr_index 1406 and dr_index_key 1401 (in the routing header). At step 1610, the route set, DR, RR, and the routing header data are used to compute a new transmission rate limit (TRL) for the inbound half DR. Next, at step 1615, the transmission rate limit (TRL) for the outbound half DR is updated using the dr_trlc 1404 that was fed back from the other end-point via the routing header. Since updating this TRL may have caused the DR to become acceptable, a check is made for OBMs queued for route selection. Then, at step 1618, the reception rate estimate, round-trip-time estimate, inbound TRL, and expected RSN for RR are updated. The destination routing layer connection whose inbound connection ID matches connection_id 1408 (in the routing header) is then located, at step 1620. At step 1623, if the destination routing layer connection is in the accepted state then transition the routing layer connection to the established state and run down any existing route sets to other incarnations of the same remote end-point. At step 1625, if the destination routing layer connection state is suitable for receiving transmissions (e.g., established), then the transmission is delivered to the routing layer connection's client at step 1630 by passing the pool buffer descriptor to it; otherwise, the transmission is discarded, at step 1635 by returning the pool buffer descriptor to its buffer pool.

Route Monitoring

The routing layer 230 monitors transmissions on each half route 500(*) to determine the half route's quality. Routing layer 230 determines whether a half route 500 is delivering transmissions promptly, has lost recent transmissions, or is experiencing delay. This route quality information is used by a route selection algorithm (e.g., the algorithm of FIGS. 12A/B) to choose the best route 300 of a route set 600 for sending future transmissions.

More specifically, routing layer 230 monitors the quality of each inbound half route 500 using data supplied by the remote end-point's routing layer via the routing header that is included in each transmission. All half route quality information is combined into a single metric called the transmission rate limit (TRL) (See step 1610, FIG. 16). The TRL is computed by the receiving end-point's routing layer and is fed back to the transmitting end-point where it is used by the routing layer to place an upper bound on the rate of transmissions issued on the outbound half route. When not limiting, the rate of transmissions divided by TRL indicates the degree of outbound half route underutilization, a metric the routing layer uses to select a route for an initial transmission.

Figure 17:
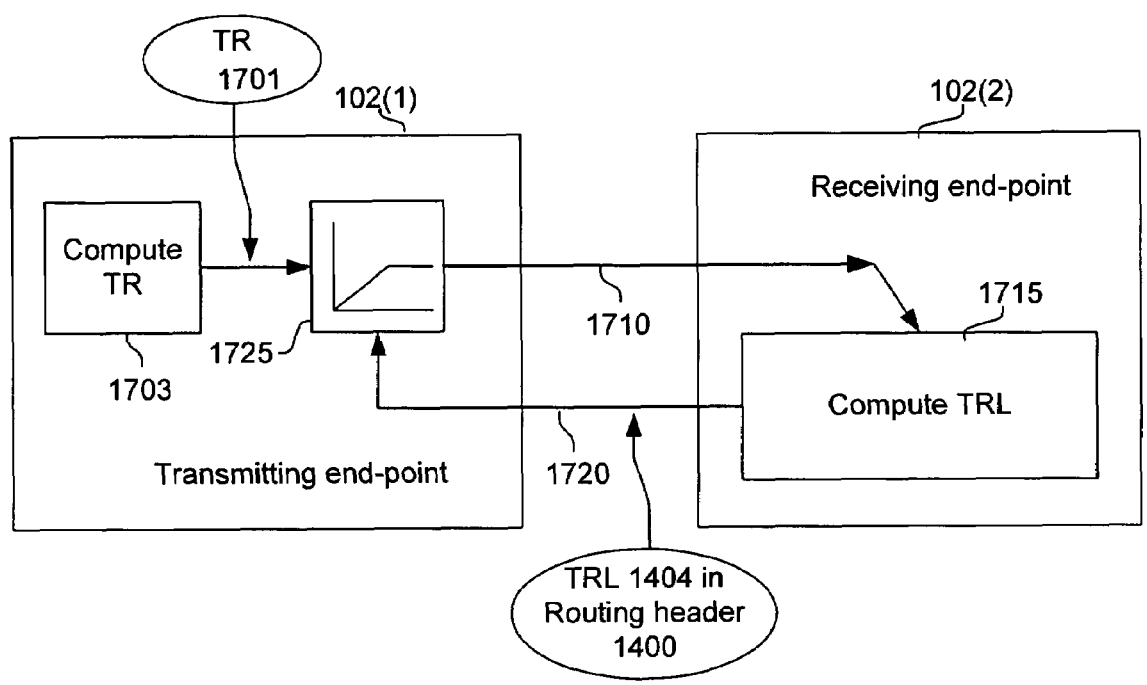
FIG. 17 is a diagram showing an exemplary routing layer feedback loop used in establishing the transmission rate limit for a particular half route.

FIG. 17 is a diagram showing an exemplary routing layer feedback loop 1710/1715/1720/1725 that is executed to control the transmission rate for each half route 500 and to supply route quality information to be used by the transmitting routing layer for route selection.

In operation, transmissions 1710 are sent from transmitting end-point 102(1) via outbound half route 500 to receiving end-point 102(2). The routing layer at end-point 102(2) monitors the quality of each inbound half route 500 using data supplied by a transmitting end-point 102(1) via the routing header 1400 of each received transmission 1710. In an exemplary embodiment, all half route quality information is combined by the receiving routing layer at block 1715 (see step 1610, FIG. 16) to establish a transmission rate limit (TRL) 1404. Transmission rate limit determination is described in detail in a related application.

After TRL 1404 is computed by the receiving end-point 102(2), it is fed back to the transmitting end-point in the dr_trlc field of the routing header 1400, via the next message 1720 that describes that half route 500, where it is used by the routing layer to place an upper bound on the rate of transmissions issued on the outbound half route 500.

In an exemplary embodiment, a routing layer program 1703 continually determines a current value for the transmission rate (TR) 1701 on each outbound half route by passing a sequence of inter-transmission times through a low-pass digital filter and inverting the result (see step 1523, FIG. 15A). Block 1725 functions as a limiter in which the transmitting end-point 102(1) compares the current value for TR 1701 with the value of TRL 1404 fed back from the remote end-point 102(2) to determine whether to send the next transmission on that outbound half route or another route within the route set, or to delay it. When the current TR 1701 is no greater than TRL 1404, the transmission is sent without imposition of a delay. In an exemplary embodiment, when the current TR 1701 exceeds TRL 1404, no transmissions will be sent on the outbound half route 500(1) because the route will not be acceptable and thus not selected (see FIG. 12). However, the next transmission may be sent on another route of the route set without delay if another route is acceptable. In the case where no route of the route set is acceptable, the OBM is queued as described in FIG. 13, at step 1315. As time passes, the intertransmission time will increase and thus the transmission rate 1701 of an unacceptable route will decrease until it reaches a value that is equal to or less than the present TRL 1404, at which time the route will become acceptable again. This mechanism effectively limits the transmission rate to be no greater than TRL.

To avoid continually computing a half route's transmission rate when its transmission rate exceeds its transmission rate limit, a timer is started whose expiration time is computed to be the time when TR will equal TRL. When the timer expires, TR is updated. Then, if the route is acceptable and OBMs are waiting, route selection is triggered, as described above with respect to FIGS. 12A/B and 13.

When not limiting, the transmission rate 1701 divided by the transmission rate limit 1404 indicates the degree of outbound half route underutilization. This metric is used by initial route selection at step 1245, in FIG. 12.

In the case where an end-point **102(*) detects a serious problem with an outbound half route, a mechanism is provided for communicating that event to a corresponding remote end-point 102(R). For example, if a transmission sent to the network layer 240 times out because the network layer detects so much congestion on the network that it cannot send the transmission within E_D_TOV (see FIG. 15A, step 1550), this mechanism allows the transmitting end-point to request that the remote end-point 102(R) set the inbound half route's TRL 1702** to one transmission per E_D_TOV.

Routing Sequence Numbers

The routing layer 230 counts transmissions sent on each outbound half route 500 from the time the full route 300 was established. These counts are called routing sequence numbers (RSNs) and they facilitate monitoring half routes 500. Each transmission on a route set 600 is uniquely identified by the route 300 on which it is sent, its direction or sending end-point 102, and its routing sequence number. The sending end-point 102 knows this information for each transmission.

In an alternative embodiment, each transmission includes its own RSN (i.e. the RSN of the outbound half route on which the transmission was sent), which allows both sending and receiving end-points 102 to share knowledge of each transmission's unique identity. In particular, upon receiving a transmission, the end-point 102 can readily determine whether any previous transmissions sent on the same route 300 are missing by comparing the RSN just received to the highest RSN previously received.

The above concept may be extended across routes 300 in a route set 600. In an alternative embodiment, each transmission describes not just its own RSN, but the RSN for every outbound half route 500 in the route set 600. These RSNs identify the most recent transmission sent on each outbound half route 500. Together the RSNs identify all transmissions that have been sent in a particular direction on the route set 600 prior to the subject transmission. For each transmission that it receives, a receiving end-point 102 determines which prior transmissions it has received (on all routes of the route set) and which are missing.

The receiving end-point 102 cannot always distinguish a missing transmission as lost or delayed; both are transmissions that the receiving end-point 102 expects to receive but has not received. However, because Fibre Channel fabrics (and communication fabrics in general) are unlikely to deliver transmissions out of order when sent via a single route 300, the receiving end-point 102 can use the manner in which it learned of a missing transmission to distinguish those that were probably lost from those that were probably delayed.

When evidence of a missing transmission is obtained on the same route 300 as the missing transmission, then the transmission is probably lost. For example, suppose an end-point 102 had received all transmissions through RSN N on route A, and then received RSN N+5 on the same route. The end-point may then conclude that the four transmissions RSN N+1 through RSN N+4 were probably lost.

When evidence of a missing transmission is obtained on a different route 300 than the missing transmission, then the transmission is first considered probably delayed, and then after a period of time equal to R_A_TOV, it is considered lost. For example, suppose an end-point 102 has received all transmissions through RSN N on route A, and then received a transmission on route B specifying that the most recent RSN sent on route A was N+10. In this case, the receiving end-point may initially conclude that the ten transmissions N+1 through N+10 are probably delayed. If the end-point next received transmission N+5 on route A, it would then conclude that the four transmissions N+1 through N+4 were probably lost, the transmission N+5 was certainly delayed, and the five transmissions N+6 through N+10 are probably still be delayed. If no further transmissions are received on route A for R_A_TOV, the end-point may then conclude that transmissions N+6 through N+10 are certainly lost.

As each transmission is received, the receiving end-point 102 compares an RSN included in the transmission with that expected for the corresponding inbound half route 500. Thus, the end-point must store an expected RSN for each inbound half route. If it were not for lost transmissions, the expected RSN would simply be the count of transmissions received on the inbound half route 500. However, because transmissions may be lost, the expected RSN is estimated using the following procedure.

When a transmission is received that includes the RSN of the half route 500 on which the transmission was sent, the inbound half route's expected RSN is updated: If the received RSN is greater than or equal to the inbound half route's expected RSN, the inbound half route's expected RSN is set to one higher than the received RSN. Otherwise, the transmission must have been received out of order and the expected RSN is left unchanged.

Because out-of-order delivery on a single route 300 is unlikely, it is not necessary to include, in every transmission, the RSN of the half route 500 on which the transmission is sent. When a transmission is received that does not include the RSN of the half route 500 on which it was sent, the receiver simply increments the inbound half route's expected RSN. Furthermore, because changes in route quality tend to occur infrequently, it is not necessary to include, in every transmission, the RSN of every other outbound half route of the receive route's (RR) route set. In an exemplary embodiment, each transmission sent on outbound route RR includes the RSN of one of the outbound routes, the described route (DR), of the receive route's route set, and the described route is rotated among the routes of the route set.

Significant Events

Most events that cause changes in half route quality metrics are known as significant events. When a significant event occurs, it becomes desirable to describe the affected route 300 to the remote end-point promptly. Normally, the routes 300 in a route set 600 are described in round-robin order, but following a significant event, the corresponding route is given a higher priority for being described. This is done with a significant_event flag (an attribute of the route proxy object 408) that is set when a significant event occurs on that route 300 and which is cleared when the route is described.

The following events are considered to be significant events:

The routing layer client indicates that an ACK response timeout occurred on a route 300. In response, the outbound half route's transmission rate limit (TRL) is reduced by half and its significant_event flag is set. Because the ACK may have been sent on any route, the routing layer 230 cannot conclude with certainty that the indicated half route 500 has lost or delayed any transmissions. By changing the outbound half route's TRL, the local end-point 102(L) is immediately discouraged from using that route further, but when the remote end-point 102(R) provides an updated TRL, this change will be dismissed, since the remote end-point has more definitive quality data about the outbound half route 500.

Any time the outbound half route 500 selected for an initial transmission differs from the route set's last_rtp. The value for last_rtp indicates the route proxy 408 of the last route 300 that was used to send a transmission on this route set 600; this value is included as a field in the route set object 417, described in detail below. In response, the significant_event flags are set for the selected route 300 and last_rtp, and last_rtp is updated to be the selected route. This is done to describe changes that motivated selecting a new route 300 and to assure that routes describe themselves frequently.

Any time the outbound half route 500 selected for a retry transmission differs from the route set's last_rtp. In response, the significant_event flag is set for last_rtp and last_rtp is updated to be the selected route 300. The significant event flag is not set for the selected route so that the route used for the previous try will be described as soon as possible.

Any time a half-route's local port changes state, the significant_event flags for all associated outbound half routes are set. In addition, when a local port changes state from link-up to link-down, the TRLs for all associated half-routes are set to zero, and when a local port changes state from link-down to link-up, the TRLs for all associated half routes are set to their default values.

Route Master/Proxy Objects

The combination of the route master object 406 and the route proxy object 408 describes the state of a route 300 from the local end-point incarnation 411 to a remote end-point incarnation 410. The route master object 406 describes the portion of the route that is important to the local port 103(L) including the associated route management connection 603 [which implies the remote port 103(R)], the full route handle, references to the local and remote end-point incarnations 411/410, state, and a reference to the corresponding route proxy 408.

The route proxy object 408 describes the portion of the route that is important to the end-point 102 including a reference to the route's route set 600, the route's index within the route set, the route's order within the route set, the routing sequence number for the outbound half route, the transmission rate limit for the outbound half route, information used to measure the quality of the inbound half route, state, and a reference to the corresponding route master object 406.

Route Master Object

Each port 103 maintains route master objects 406, each of which describes a relationship between a local end-point incarnation 411, a remote end-point incarnation 410, a remote port 103(R), and (by implication) the local port 103(L). A route master object 406 is created whenever a port 103(*) discovers a unique route 300 between a requested remote end-point 415 and one of the requested remote end-point's local end-point incarnation proxies 412. This may occur because either a new partial route is discovered to an existing requested remote end-point 415, or a local end-point incarnation 411 issues a request remote end-point message to an end-point 102 for which a partial route already exists.

A route master object 406 is also created whenever a port 103 receives a Register Full Routes (SCRFR) message. A route master object 406 is deleted whenever any of its references become invalid, which may occur in the following cases:

The associated path becomes invalid because either the remote port 103(R) is implicitly logged out (i.e., becomes not usable) or the associated route management connection 603 fails, or a SCRPR arrived on that path that omitted the route master's remote end-point incarnation 410.

The associated local end-point incarnation proxy 412 is deleted because the local end-point 102(L) either deregistered or reregistered.

The associated route proxy 408 is explicitly deleted.

A route master object 406 is also deleted whenever a route 300 is deregistered via SCDFR. Finally, incomplete route master objects 406 are deleted when SCRFR is rejected via a SCRFR_RSP and when the new route event is refused.

Exemplary attributes associated with a route master object 406 include the following:

full_route_handle The full route handle received in the SCRFR or SCRFR_RSP message used to establish this route 300. It is used to direct messages to the remote end-point 102(R) via the route.

local_end_point_incarnation_proxy Handle of the associated local end-point incarnation proxy 412 or pseudo local end-point 402 (the null handle is used to reference the pseudo local end-point).

remote_end_point_incarnation_proxy Handle of the associated remote end-point incarnation proxy 409 or pseudo remote end-point 403.

remote_port Handle of the associated remote port object 401.

route_management_connection Handle of the associated route management connection object 603.

route_proxy Handle of the associated route proxy 408.

state state of the route master object 406. Values for the route master state include:

Unknown: Implies that the route master does not exist.

NewRouteOrig: Implies that the route master has generated a new_route_originator event and is awaiting a response.

NewRouteResp: Implies that the route master has generated a new_route_responder event and is awaiting a response.

SCRFR_Sent: Implies that the route master has sent a SCRFR message and is awaiting a response.

SCRFR_RSP_Sent: Implies that the route master has sent a SCRFR_RSP message and is awaiting its ACK. Active implies the normal operational state of the route master.

RunDown: Implies that the route master is in the process of being deleted, but still exists because references to it still exist. On explicit creation, the value of this attribute is set to NewRouteOrig. On creation due to receiving a SCRFR message, the value of this attribute is set to NewRouteResp.

Route Proxy Object

The route proxy object 408 is a structure that describes a single route 300. It is a proxy of the route master object 406. The route proxy object 408 describes the state of a route 300 from the local end-point 102 to the remote end-point 102 through a specific path. Attributes of the route proxy 408 include its route_set, rtp_handle, rtm_handle, local_port_proxy, and state. These attributes are involved in route selection and monitoring. Route proxy objects 408 are created and deleted in response to events (new route originator, new route responder, route deleted) generated by route masters 406 on local ports 103(L). Route proxy objects 408 are also deleted when the local port 103(L) fails.

Exemplary attributes associated with a route proxy object 408 include the following:

rtp_handle Handle that the route master 406 uses to identify the route proxy object 408.

expected_rsn The expected value of the routing sequence number that will be received in the next transmission received on this route that describes itself.

highest_described_rsn The highest RSN received that described this route. It is used to calculate transmission delay likelihood. On creation, this value is set to zero subsequently, it is updated each time a transmission is received that describes this route in which the described RSN exceeds this value.

inbound_trlc Transmission rate limit of the inbound half 500 (I) of this route 300 in compressed form. This value is computed locally and communicated to the remote end-point 102(R) where it is used to limit the transmission rate of the corresponding outbound half route 5000.

last_receive_time The time when the last transmission was received on this route. Used to calculate reception_rate_est.

last_send_time The time when the last transmission was sent on this route. Used for calculating transmission_rate_est.

local_port_proxy The local port proxy 413 for the port 103 that contains this route proxy's route master 406.

local_route_epoch This route proxy's route epoch. The route epoch is incremented to cause the remote end-point 102(R) to reset its TRL computation for the inbound half route 500(I).

local_route_index Index of this route proxy 408 in the local route set's route_proxies array. This value is sent to the remote end-point 102(R) during full route registration. The remote end-point uses it to identify this route 300 in route headers 1400 that it transmits.

local_route_index_key Opaque key used to validate the local_ route_index. This value is sent to the remote end-point 103(R) during full route registration and a copy is received in the routing header 1400 when the transmission describes the route 300. When a received transmission's local_ route_index_key does not match this attribute, then the described route information is ignored.

next_described_route The next route 300 in the route set 600 to describe in the routing header 1400 of a transmission sent on this route.

next_route The next route in the route set's route order. It is a forward link in the circular list of all routes 300 of the route set 600.

one_shot_flag Used when transmssion_rate_est>decompressed (outbound_tric) to make the route acceptable for one transmission.

outbound_trlc Transmission rate limit of the outbound half 500(O) of this route 300 in compressed form. it is used to determine whether a route is acceptable during route selection. On creation, this value is set to SCR_TRLC_DEFAULT. Subsequently, it is updated when a received transmission describes this route. It may also be updated when the local end-point 103(L) suspects that the outbound half route's quality is low.

reception_iat_est Estimate of the mean transmission receive inter-arrival time of the outbound half 500(O) of this route 300. On creation, this value is set to scr_irr_scale. Subsequently, it is updated each time a transmission is received on this route.

remote_route_epoch The last value of transmitter_route_epoch described for the inbound half 500(I) of this route 300. This value is sent in the routing header 1400 of each transmission that describes this route. On creation, this value is set to zero. Subsequently, it is updated when a received transmission describes this route.

remote_route_index Index of the remote route proxy 408 for this route 300 in the remote route set's route_proxies array. It is copied to the routing header 1400 in each transmission that describes this route.

remote_route_index_key Opaque key used to validate the remote_route_index. This value is received from the remote end-point 102(R) during full route registration and is transmitted in the routing header 1400 with the remote_route_index.

round_trip_time_est Estimate of the round-trip-time for this route 300. Its value is a number of milliseconds*256 expressed as an unsigned 32-bit integer. On creation, this value is set to 256 (1 millisecond).

route_set The route set 600 to which the route proxy 408 belongs. On creation, its value is set to null. However, every route proxy 408 is added to a route set 600 immediately after creation and only removed from a route set immediately prior to run-down.

rsn The route proxy's routing sequence number. Its value is the count of transmissions originated at this end of the route expressed as an unsigned 32-bit integer.

rtm_handle Handle that identifies the route master object 406 that corresponds to this route proxy 408 within the scope of a local port 103(L). Its value is supplied by the route master 406 when the route proxy 408 is created and cannot be modified subsequently.

send_specific_route_queue Queue of obms waiting for this route 300 to send a transmission. Used when an allocateobs operation requires a specific route but that route is not acceptable.

significant_event A binary flag indicating that the route 300 has experienced a significant event since the route was described.

state State of the route proxy object 408.

timer A general-purpose timer for the route used for a variety of purposes.

transmission_iat_est Estimate of the mean transmission send inter-arrival time of the outbound half 500 of this route. On creation, this value is set to scr_irr_scale. Subsequently, it is updated each time a route selection algorithm selects this route for a transmission.

transmission_rate_est Estimate of the transmission rate of the outbound half 500(O) of this route. On creation, this value is set to zero. subsequently, it is updated each time the route selection algorithm selects this route for a transmission.

transmissions_received The count of transmissions received at this end of the route expressed as an unsigned 32-bit integer. This attribute is used as a performance counter, i.e., expected_rsn-1-transmissions_received gives the total transmissions lost on this route.

Route Set Object

A route set object 417 associates the routes 300 from a local end-point incarnation 411 to a remote end-point incarnation 410. Attributes of the route set object 417 include a list of routes 300, a list of clients (connections) 601, and a remote end-point UID and IID (the local end-point 102(L) is implicit).

A route set 600 groups the complete set of route proxies 408 that correspond to approved routes 300 between this local end-point incarnation 411 and a remote end-point incarnation 410. The route set object 417 is used to manage the creation and deletion of routes 300 between a pair of end-points 102(*) and groups the routes that exist between those end-points.

As indicated above, a route set 600 is created when a route proxy 408 is created to a remote end-point incarnation 410 for which no route set yet exists. A route set 600 is deleted immediately when it has neither route proxies nor client connections. Stale route sets 600 are also deleted using policies based on an empty timeout (SCR_E_TOV) and a demand timeout (SCR_D_TOV).

When a route set 600 has clients but no route proxies 408 for a continuous period (SCR_E_TOV) of time, it will enter the rundown state and issue Derequest Remote End-Point commands to each local port 103(L) to stop the creation of new routes 300. In an exemplary embodiment, the value for SCR_E_TOV is 600,000 (i.e., ten minutes). The route set object 417 then generates a route_set_failed event to each of its client connections 601. As each client connection aborts, it will remove its route set reference and thus allow the route set 600 to be deleted. SCR_E_TOV is used to control local policy that recovers resources from empty route sets. Specifically, when a route set 600 has no routes for SCR_E_TOV continuous milliseconds, it may be forced into rundown.

Exemplary attributes associated with a route set object 417 include the following:

client_list Unordered list of client connections 601 that use this route set 600.

demand_timer Timer to time SCR_D_TOV. On creation, this timer is started. It is cancelled when client_list transitions from empty to nonempty. It is restarted when client_list transitions from nonempty to empty.

establishment_time Time when the route set's RTSMC 602 entered the established state. This is used to determine the most recently established route set 600 when selecting between multiple route sets to the same remote end-point 102(R).

empty_timer Timer to time SCR_E_TOV. On route set creation, this timer is started. It is cancelled when route_proxies transitions from empty to nonempty. It is restarted when route_proxies transitions from nonempty to empty.

last_rtp Indicates the route proxy 408 of the last route 300 that was used to send a transmission on this route set 600. On creation, this value is set to NULL. When the first route is added, it becomes a reference to that route. When the last route is removed then it becomes NULL.

last_rtp_count Count of the consecutive route set transmissions sent on route last_rtp. On creation, this value is set to zero. The route selection process zeros it each time it changes last_rtp and increments it each time a transmission is sent on the route set.

lepim Specifies the local end-point incarnation master 414 to which this object belongs.

max_r_a_tov The maximum value of the member routes' local_port_proxy.r_a_tov.

remote_end_point_iid Incarnation identifier (IID) of the route set's remote end-point incarnation 410.

remote_end_point_UID UID of the route set's remote end-point incarnation 410.

route_index_keys Array of opaque keys used to verify dr_index values in received Transmissions. The route_proxy.local_route_index is used to index this array. On creation, the entries in this array are set to zero. When a route proxy 408 is added to the route set 600, the corresponding route_index_keys value is incremented and is copied into route_proxy.local_route_index_key.

route_order_is_arbitrary True implies that the routes 300 within the route set 600 have not been ordered since the route membership last changed. On creation, this value is set to false. Subsequently, it is set to true each time a route is added to or remove from the route set. It is cleared when the routes within the route set are assigned an order.

route_proxies Array of handles of the route proxies 408 that belong to this route set. The route_proxy.local_route_index is used to index this array.

rtsmc The route set's management connection object. It may be stored either as a reference to a transport layer connection or as an object embedded in the route set object 417.

send_initial_sfe_queue Queue of OBMs waiting for a route 300 to send an initial SFE on this route set 600. Used for route selection when no acceptable route exists.

send_retry_sfe_queue Queue of OBMs waiting for a route 300 to send a retry SFE on this route set 600. Used to select a route when no acceptable route exists.

send_start_mse_queue Queue of OBMs waiting for a route 300 to send a Start_MSE on this route set 600. Used to select a route when no acceptable route exists.

significant_events Array of bits indicating which routes 300 of the route set 600 have experienced a significant event since the route was described.

state State of the route set object 417.

Route Management Connection Object

The route management connection 603 is a sequenced-message connection that provides a one-way sequenced message delivery service. Each message payload sent on an established route management connection 603 is prefixed with network, routing, and transport headers, as in the case of a 'plain' connection. All route management connection message payloads are received in the header buffer portion of a pool buffer.

The route management connection object 405 tracks the number of attempts to complete process login with retries_remaining, which, in an exemplary embodiment, is initially set to a value of 8. When retries_remaining reaches zero, the route management connection Connect Request operation fails. In response, route management deletes the corresponding pseudo remote end-point object 403 and remote port object 410.

Exemplary attributes associated with a route management connection (RMC) object 405 include a system buffer pool handle, a full route handle, retries_remaining, the RMC connection ID, and the state of the connection.

System Buffers

Figure 18:
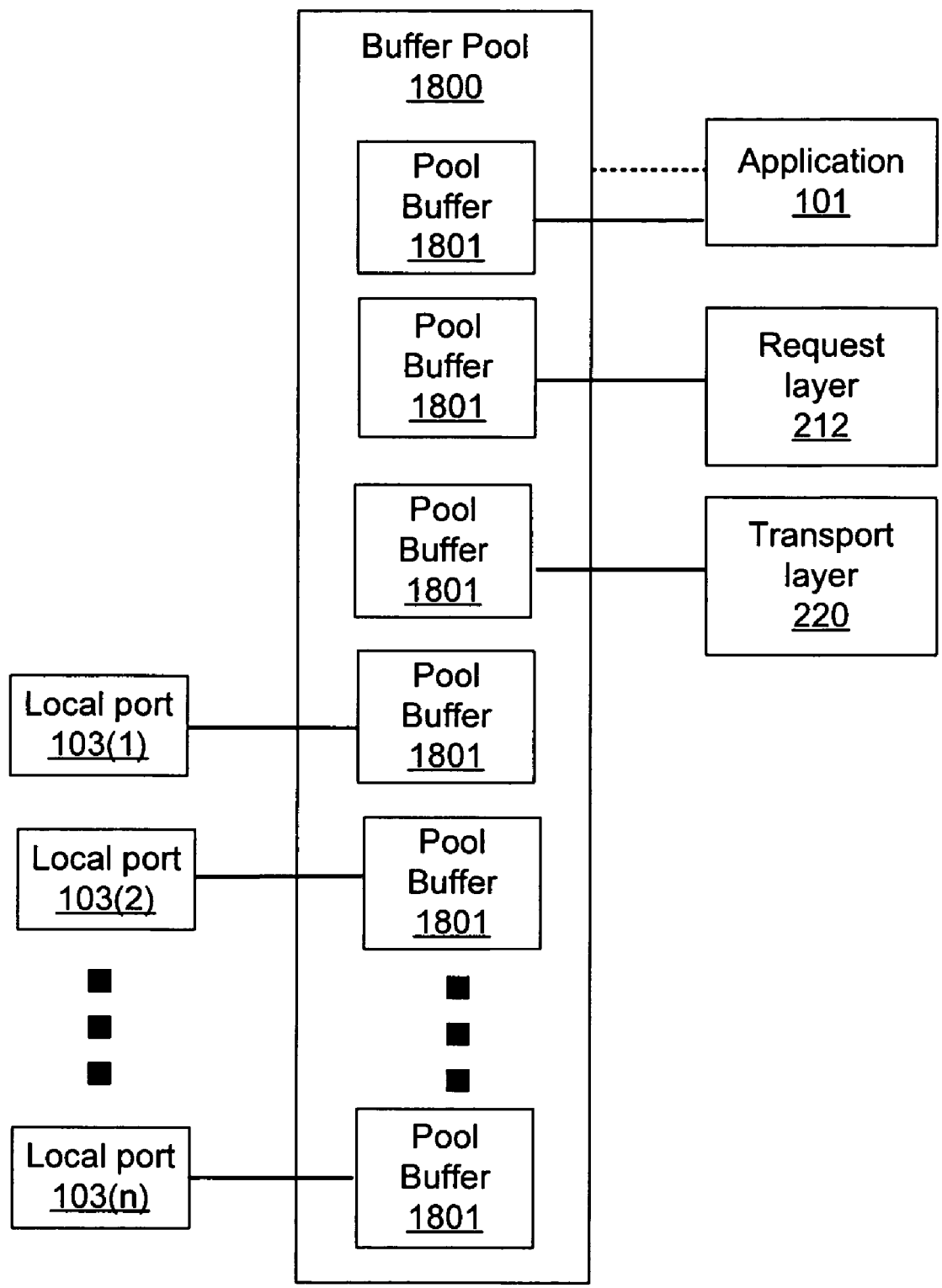
FIG. 18 is a diagram showing possible relationships between pool buffers in a buffer pool, ports, and application programs.

FIG. 18 is a diagram showing exemplary relationships between pool buffers 1801, ports 103(*), and applications 101 (*). Pool buffers 1801, stored in a buffer pool 1800, are used to minimize the number of times that data is copied. Communicating applications may create buffer pools 1800 to directly receive messages bound for them. When an application 101(*) requests or accepts a connection, it specifies the buffer pool 1800 into which messages received on that connection should be stored. Buffer pools are created by applications 101(*). Each application specifies the memory to use to receive payloads and the maximum payload size to accommodate. An application can create more than one buffer pool 1800, if needed.

Each application associates a buffer pool 1800 with one of its connections. Each connection is associated with a single buffer pool 1800 (established at connection creation time) to receive messages directed to the owning application 101(*). Each buffer pool 1800 has a handle that is unique within the scope of its end-point incarnation 411. This handle is communicated to the remote end-point incarnation 410 during connection establishment so that it can be included in the network header of transmissions sent on that connection. Thus, when a transmission is received by a port 103, it can be directly stored into a pool buffer 1801 having a matching handle.

Each pool buffer 1801 comprises a header area, payload area, and a descriptor. The header area receives that portion of a transmission that is consumed by other network functions and is not provided directly to the receiving application 101

(*). The payload area receives that portion of a transmission that is provided directly to the receiving application 101.

The pool buffer descriptor includes the following information about the pool buffer 1801:
- the location of the header and payload areas;
- the received header and payload transmission sizes;
- the route over which the transmission was received;
- information about the context in which the transmission was received; and
- the owner of the pool buffer.

Pool buffers 1801 may be unowned, or, as shown in FIG. 18, temporarily owned by entities including a local port 103 (*) (queued to receive a transmission), the transport layer 220 (during sequenced delivery), the request layer 212 (for command queuing), or the buffer pool's application 101 (during command processing). Buffer pool management 270 controls the allocation of pool buffers 1800 and enforces quotas on each owner thereof so that one owner does not starve the memory resources of another. Buffer pool management 270 includes the task of determining when additional pool buffers should be queued to each local port 103(L).

Figure 19:
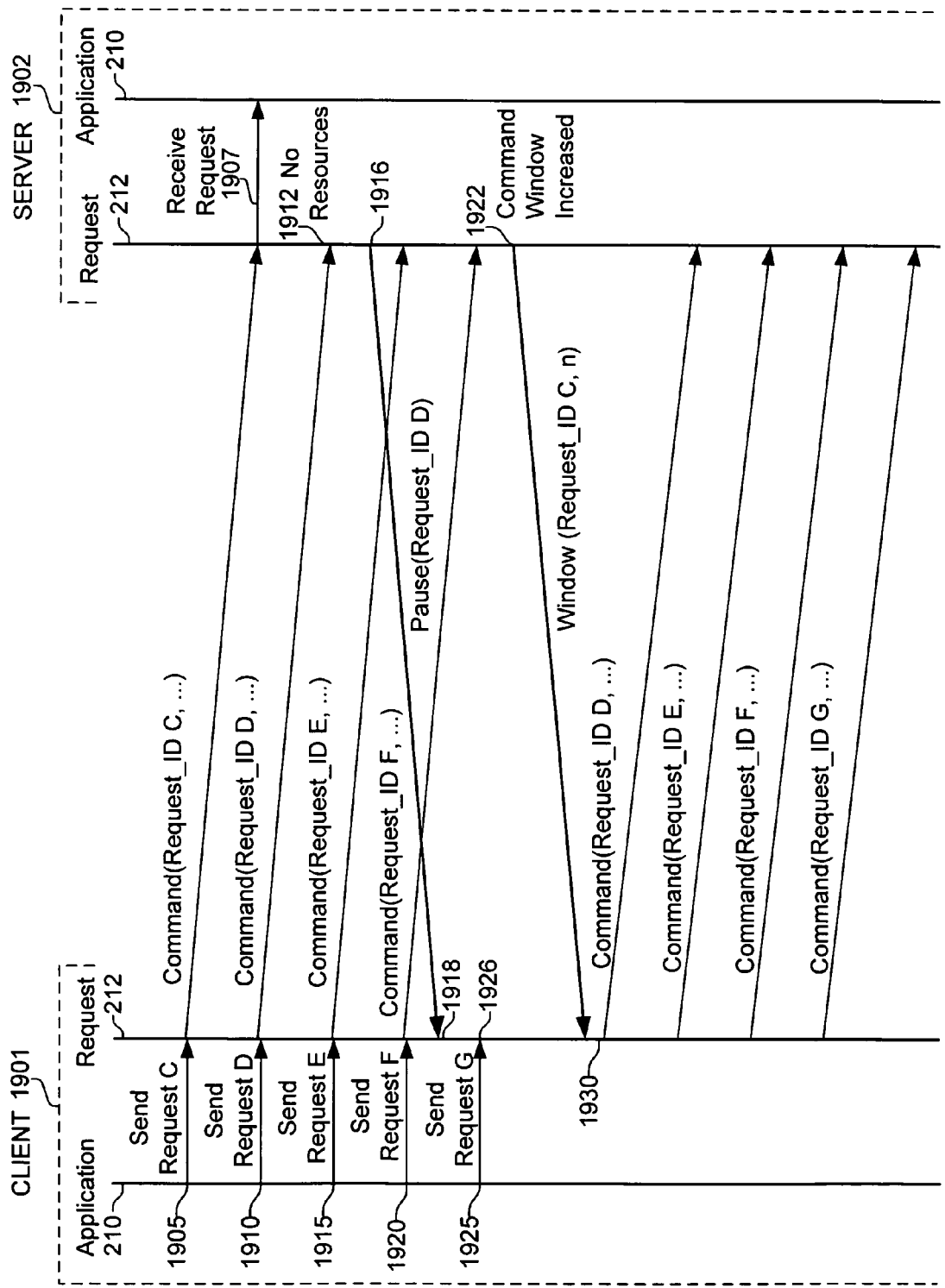
FIG. 19 is a diagram showing an exemplary sequence of transmissions involved in performing command flow control.

FIG. 19 is a diagram showing an exemplary sequence of transmissions involved in performing command flow control. In the following description, a remote procedure call (RPC) is termed a 'request'. Requests are managed by request layer 212. Each request includes a command message transmitted from the client 1901 to the server 1902 followed by a response message transmitted from the server to the client.

When a connection is established between client and server applications, a window size for command messages is established as well. This window size indicates the maximum number of requests that may be simultaneously outstanding on this connection at the server. From the point of view of the client 1901, a request is outstanding until the operation is completed. The command window size is communicated in every request header in the cmd_win field 2203. This window size may be adjusted and is communicated in the next request layer message.

As shown in FIG. 19, at steps 1905-1925, an application owned by client 1901 attempts to send a plurality of command messages (requests 'C' through 'G'), via request layer 212, to server 1902. At step 1907, the server request layer 1902/212 receives request 'C', which it proceeds to process using available server request resources. At step 1912, the server request layer receives command message 'D', which it cannot immediately process because it does not have enough server request resources.

When a command message for a request arrives at the server request layer 1902/212 and it would cause the number of requests in progress at the server to exceed the current window size, the command message is nevertheless accepted. It is assumed that this situation was caused by changing window size and the client request layer will shortly adjust to the new window size. The command window size is adjusted as described below.

When, as in the present example, there are insufficient resources available to begin processing the new request, at step 1916, the server request layer 1902/212 sends a pause message, containing a request ID for request 'D', to the client, indicating that the request could not be started. The corresponding request ID is recorded in the server request layer, and this and subsequent command messages (in the present example, requests 'D'-'F', initiated at steps 1910-1925) received at the server 1902 from that paused client 1901 are discarded.

The client request layer 1901/210 places all requests in a list (an 'active request queue') in the order in which they were started, until they have been completed. At step 1918, when the client request layer receives the pause message, it marks the indicated request in the active request queue. The client request layer 901/210 also sets the command window size from the request header of the pause message. If the window size is equal to or smaller than the number of outstanding requests, the client request layer no longer sends command messages for new RPC calls, but continues to place the new requests in the active request queue (marked as 'unsent' and 'delayed').

In the present example, the command window size in the pause message is smaller than the number of outstanding requests, therefore client request layer 1901 stops sending new command messages to the server 1902, as indicated at step 1926, where request 'G' is 'delayed'. The server request layer 1902/212 continues to send the current command window size to the client 1901.

As 'delayed' or 'retransmitted' command messages are received, the command window size is slowly increased. When the client request layer 1901/212 receives a message that sets the command window size greater than the number of outstanding requests, it locates the marked (paused) request from step 1918 in the active request queue. Beginning with that request and proceeding in order, it resends the command message for the subsequent 'unsent' requests in the list until they have all been processed or it has sent the number of commands allowed by the window size.

In the present example, at step 1922, a message is sent to client 1901 in which the command window size is greater than the number of outstanding requests, causing the client request layer 1901/212 to commence re-sending the command messages for requests 'D'-'G', beginning at step 1930.

If the server request layer 1902/212 has adjusted the command window size downward (due to lack of resources), it is adjusted upwards slowly by successfully receiving subsequent 'delayed' or 'retransmitted' command messages.

Client Command Flow Control Operation

Figure 20A:
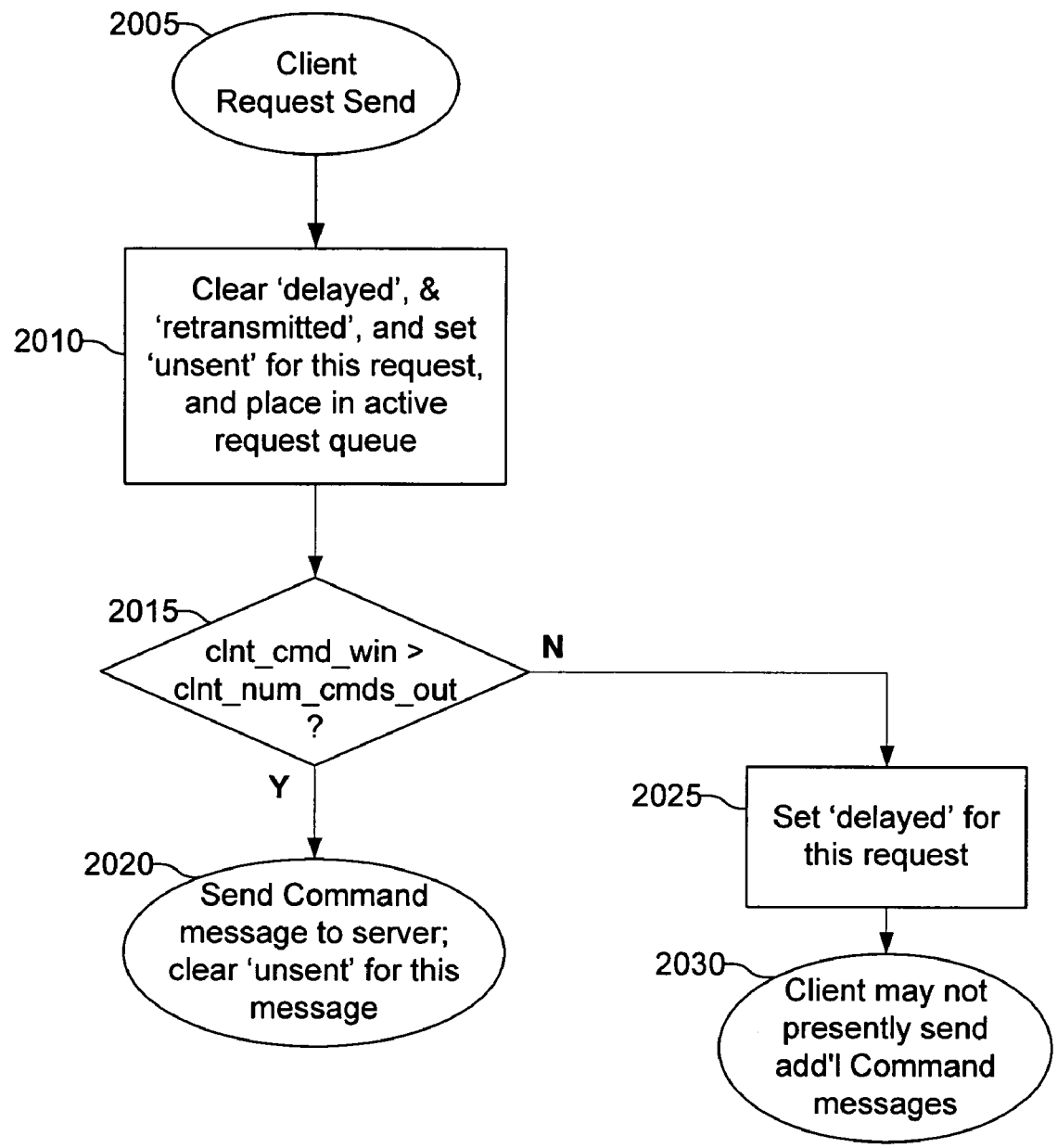
FIGS. 20A and 20B are flowcharts illustrating exemplary steps performed to implement client command flow-control.
Figure 20B:
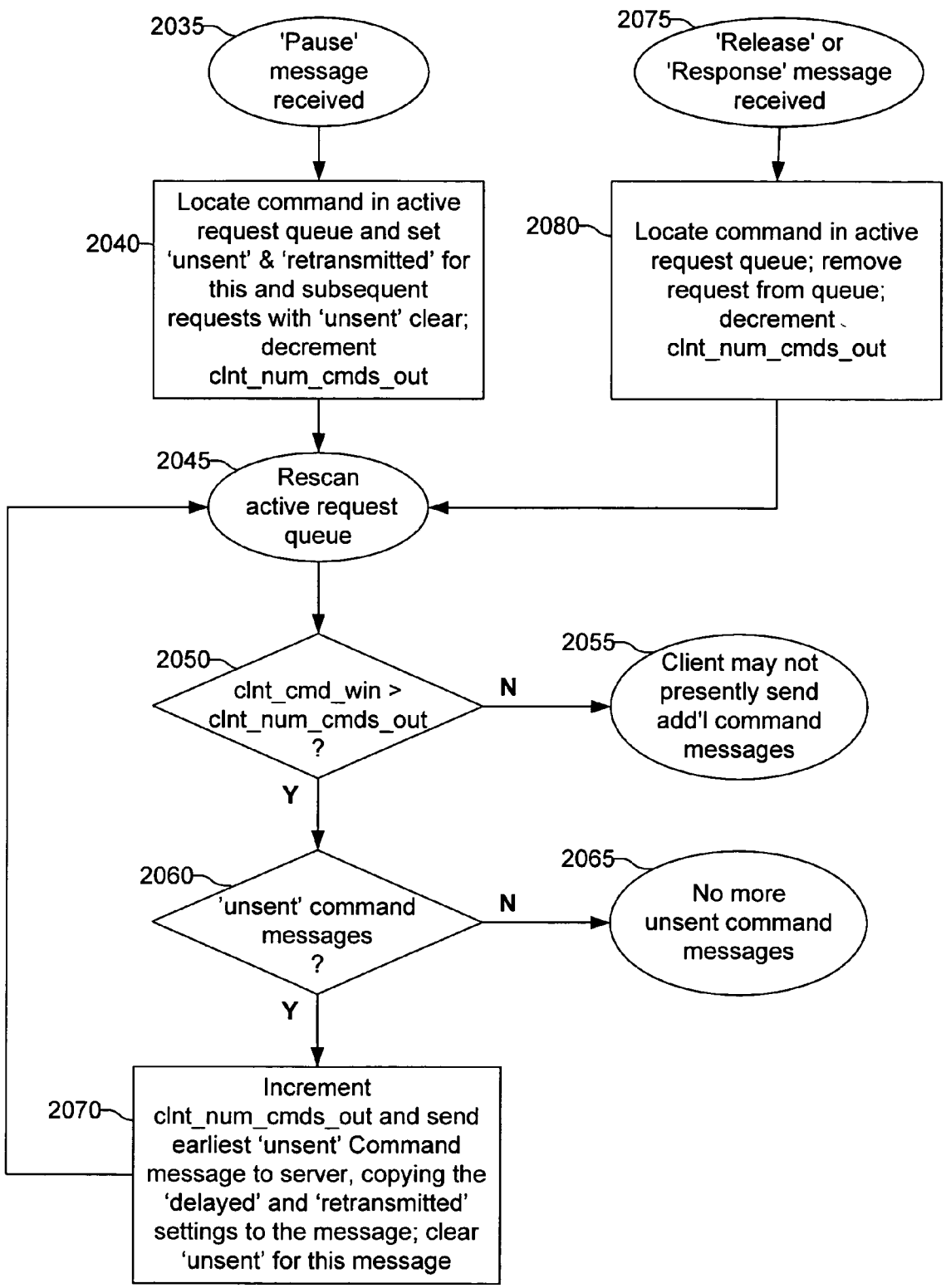

FIGS. 20A and 20B are flowcharts illustrating exemplary steps performed in implementing client command flow-control. The client request layer 1901/212 keeps track of the number of requests it may have outstanding in a clnt_cmd_win attribute stored in a Connection object. Each request layer message contains a cmd_win field (2203, shown in FIG. 22) in the request header that is set by the sending server request layer to flow-control the client. When the client request layer receives a message, the cmd_win field in the request header is stored in cint_cmd_win. The request header is shown in FIG. 22, described below. As shown in FIG. 20A, at step 2005, when a new request is initiated by the client request layer 1901/212, a request object is allocated and a Command message is constructed to be sent from the client 1901 to the server 1902, as follows. The request object is marked as 'unsent', the 'delayed' and 'retransmitted' fields are cleared in the request object, and the request is placed in the client's active request queue, at step 2010. At step 2015, if clnt_cmd_win is greater than clnt_num_cmds_out, which is the number of requests that are currently outstanding on the present connection, the Command message is sent to the server, and the 'unsent' field in the request header 2200 is cleared at step 2020. Otherwise, the request is marked as 'delayed', at step 2025, and the client may not send any more Command messages at step 2030.

Once the sequenced message transport layer 220 delivers a command message to the server 1902, the server request layer 1902/212 may or may not accept the new command. As previously indicated, if the new command is not accepted, the server will send a pause message indicating the first request whose command message could not be accepted. As shown in FIG. 20B, at step 2035, when the pause message is received by the client, the indicated request is located in the active request queue, and this request object and all subsequent request objects with 'unsent' clear are marked as 'unsent' and 'retransmitted', indicating that their corresponding command message needs to be retransmitted, at step 2040.

At step 2045, the active request queue is rescanned to determine whether additional Command messages may be sent. Command messages may only be sent when clnt_cmd_win for the connection is greater than clnt_num_cmds_out. The value for clnt_num_cmds_out begins at zero, is incremented for each command message sent, and decremented for each request completed or command paused. Rescanning continues until cint_cmd_win is no longer greater than clnt_num_cmds_out, or there are no more requests to start. At step 2050, if the value stored in cint_cmd_win is less than or equal to the value of clnt_num_cmds_out, the client may not presently send additional command messages (block 2055). If, at step 2050, the value stored in clnt_cmd_win is greater than clnt_num_cmds_out, and if, at step 2060, there are pending 'unsent' messages, clnt_num_cmds_out is incremented, and the earliest 'unsent' request object has the 'delayed' and 'retransmitted' flags copied to the request header 2200 of its Command message, which is then sent to the server, and the 'unsent' status in the request object is cleared, at step 2070.

The pause message will typically set clnt_cmd_win at or below clnt_num_cmds_out. When new requests are ready to send their command message, if clnt_cmd_win is no greater than clnt_num_cmds_out, the requests wait. When a request layer message (including a pause message) is received with a cmd_win that is greater than clnt_num_cmds_out, then a number of messages up to the allowed number of command messages may be sent, in order, starting with the first request still needing to send its command message ('unsent' set).

When a 'release' or a 'response' message is received by the client request layer 1901/212, at step 2075, the indicated request is located in the active request queue, the request is removed from the queue, clnt_num_cmds_out is decremented, and the associated pool buffer 1801 is freed, at step 2080. Client command flow-control processing then continues at step 2045, described above.

Server Command Flow Control Operation

The present command flow control system allocates server request objects and pool buffers to each connection dynamically, as command messages arrive. The initial command window size for each connection is computed from the number of free server request objects, the number of free pool buffers, and the number of other connections contending for these resources. As the number of connections contending for resources (established connections) changes, the command window size is recomputed. Computation of command window size is described below.

Figure 21A:
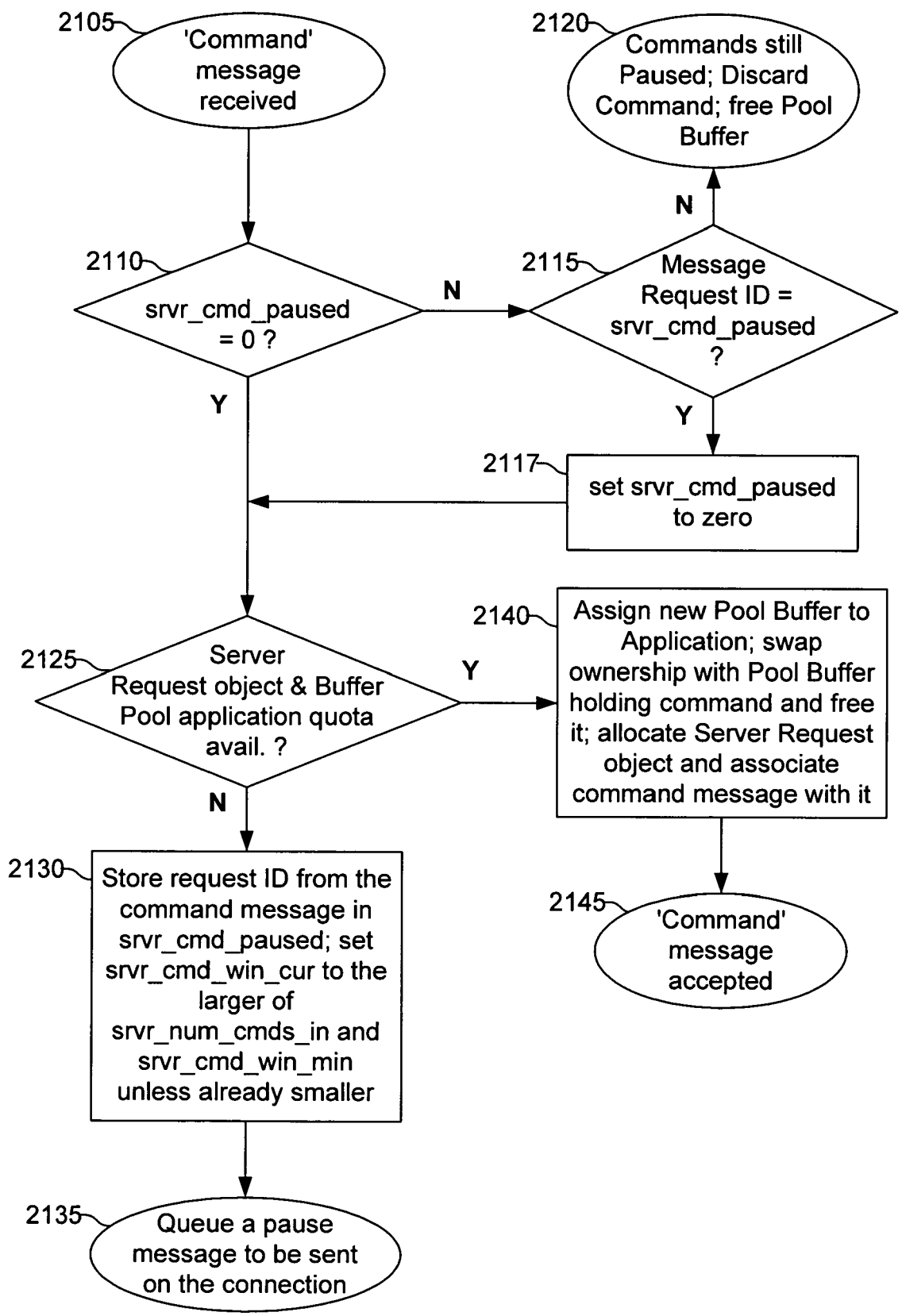
FIGS. 21A and 21B are flowcharts illustrating exemplary steps performed in implementing server command flow-control.
Figure 21B:
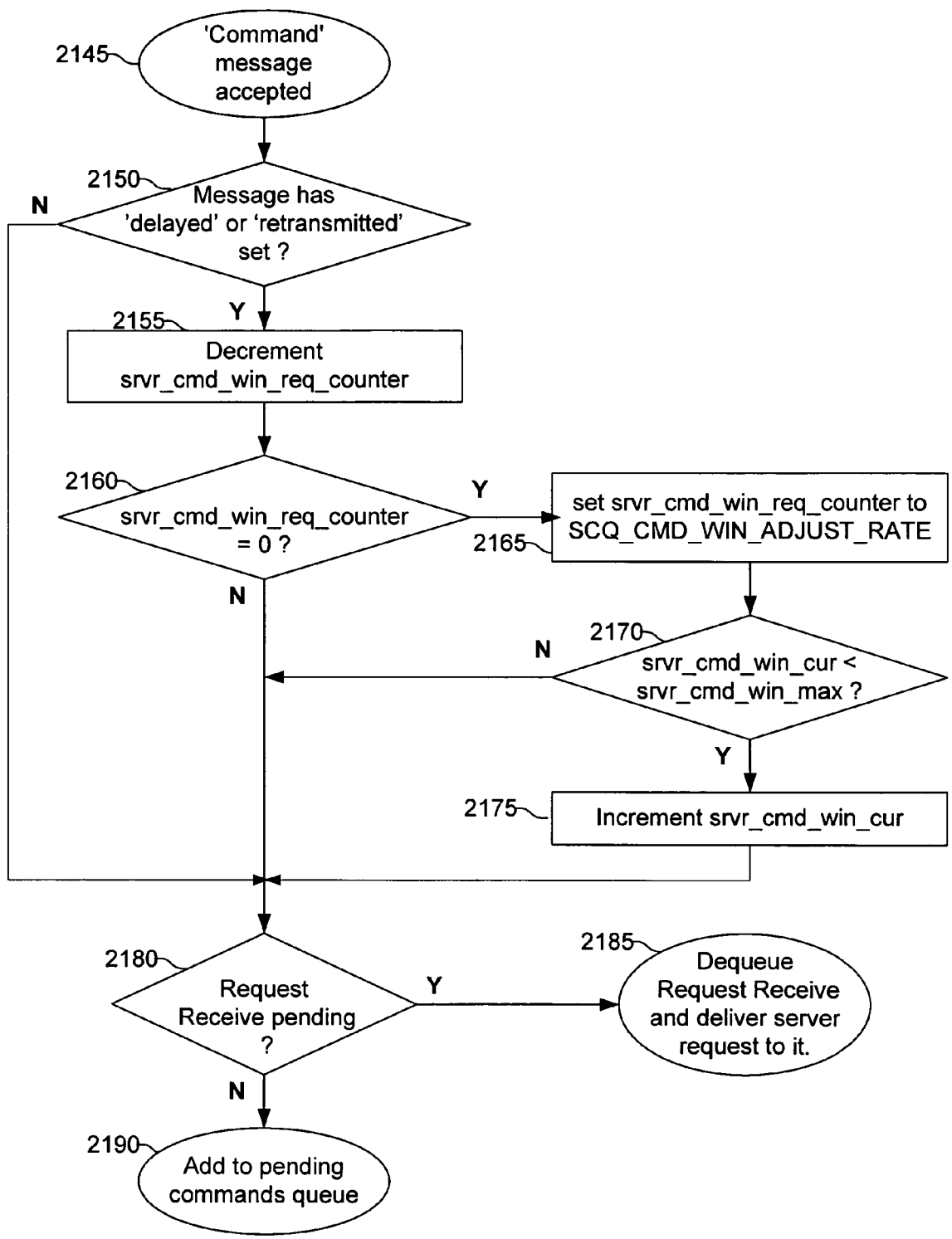

FIGS. 21A and 21B are flowcharts illustrating exemplary steps performed in implementing server command flow-control. As shown in FIG. 21A, when a command message is received by the server request layer 1902/212, at step 2105, if srvr_cmd_paused is zero (at step 2110), and either there are no server request objects or no pool buffers available to deliver the command to the application (at step 2125), then the request ID from the command message is stored in srvr_cmd_paused, making it non-zero, and the current command window size, srvr_cmd_win_cur, is set to the larger of srvr_num_cmds_in and srvr_cmd_win_min, unless it is already smaller, at step 2130. A pause message is then queued to be sent on the connection, at step 2135. Otherwise, at step 2140, a new pool buffer 1801 is allocated from the buffer pool application quota and it becomes owned by the request layer, ownership is swapped with the pool buffer holding the command and the newly allocated pool buffer is freed, a Server Request object is allocated and the Command message associated with it, and, at step 2145, the Command is accepted.

If, at step 2110, a command message is received while srvr_cmd_paused is non-zero, and, at step 2115, the requestID in the command message matches the requestID stored in srvr_cmd_paused, then srvr_cmd_paused is set to zero, at step 2117. The command message is then processed as if it had been received with srvr_cmd_paused equal to zero, starting with step 2125. If, at step 2115, the requestID in the command message does not match the requestID stored in srvr_cmd_paused, then at step 2120, commands are still paused, the received command is discarded, and the pool buffer associated with the received command is freed.

As shown in FIG. 21B, when a command message is accepted by the server request layer 1902/212 (at step 2145), then at step 2150, if neither 'delayed' nor 'retransmitted' are set in this Command message, and processing continues at step 2180, described below. Otherwise, at step 2155, srvr_cmd_win_req_counter is decremented.

At step 2160, if srvr_cmd_win_req_counter is non-zero, then processing continues at step 2180, described below. Otherwise, if srvr_cmd_win_req_counter is zero, then at step 2165, it is set to a value of SCQ_CMD_WIN_ADJUST_RATE, which in an exemplary embodiment is typically 16. At step 2170, if the value of srvr_cmd_win_cur is less than that of srvr_cmd_win_max, then srvr_cmd_win_cur is incremented; and in either case, processing continues with step 2180.

At step 2180, if a Request Receive call is pending, then the Request Receive is de-queued and the corresponding server request is delivered to, and becomes owned by, the application at step 2185, otherwise, the pending Request Receive is added to a queue of pending commands, at step 2190.

Received Request Message Processing

All request layer messages consist of a request header and optional payload. The presence of a request layer message is indicated by the opcode in the transport header set to a request layer message (opcode=SCTH_SEND_REQ). FIG. 22 is a diagram showing an exemplary request header 2200. In the FIG. 22 diagram, the fields in the header are shown as being included in six larger 'fields', each 32 bits in length. In an exemplary embodiment, the request header 2200 includes the following information, where the sizes of the fields may vary with the requirements of a particular implementation.

apid This field 2201 indicates the application protocol identifier for the connection on which the message is being sent.

opcode This field 2202 indicates what type of request layer message is being sent.

cmd_win This field 2203 contains the maximum number of requests that may be outstanding simultaneously. A cmd_win value of zero (0) indicates that no requests may be outstanding.

struct flags This field 2204 contains the next five fields described immediately below.

flags.cmd_seq (8-bits) Contains the low-order bits of the command sequence number for command messages, used as a consistency check. For other messages, this field is zero (0).

flags.param_cnt (2-bits) A count of the number of parameters (0-3) supplied in the request header's 32-bit parameter array 2208.

flags.retransmitted (1-bit) When set to one (1), this indicates that this command message was retransmitted due to receipt of a pause that affected it. For non-command messages, this is always zero (0).

flags.delayed (1-bit) When set to one (1), this indicates that this command message was delayed at the client due to insufficient command window size. For non-command messages, this is always zero (0).

flags.req_pld_siz (11-bits) This is the size of the payload (in bytes) following this header.

request_id This field 2205 identifies the associated request context, and allows request specific messages to be associated. The request ID is unique within the scope of a connection on the client. It is allocated as part of command processing and it is deallocated as part of response processing.

rel_id_a, rel_id_b These fields 2206/2207 contain the IDs of requests being released. When zero (0), no request is being released.

parameters This field 2208 is an array of three 32-bit parameters. The number of parameters that are valid is indicated by flags.param_cnt.

Figure 23:
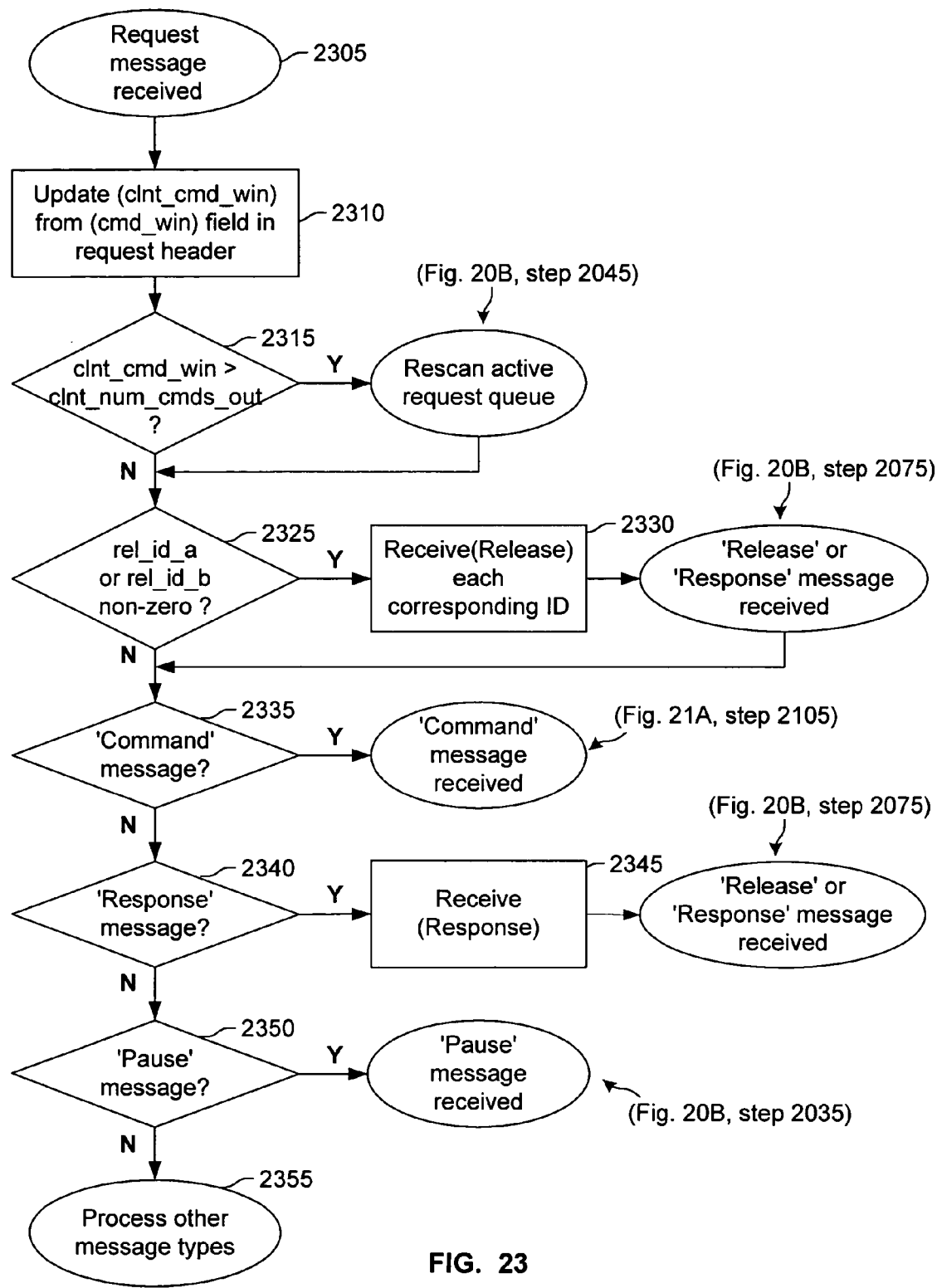
FIG. 23 is a flowchart illustrating exemplary steps performed in processing a received request message.

FIG. 23 is a flowchart illustrating exemplary steps performed in processing a received Request message. As shown in FIG. 23, at step 2305, a Request message is received by the connection transport. The message is delivered to the request layer, which examines the request header 2200 and performs the following processing:

At step 2310, the connection client command window size (clnt_cmd_win) is updated from the window field (cmd_win) in the request header. If, at step 2315, clnt_cmd_win is larger than clnt_num_cmds_out, then the active request queue is rescanned beginning at step 2045 in FIG. 20B, and returns from FIG. 20B step 2055 or 2065. In any case, processing continues in FIG. 23 at step 2325.

If any release messages are supplied in the Request message, a Receive(Release) call is made to each specified request ID. Release messages are not separate messages, but rather are piggybacked onto other request layer messages using the rel_id_a or rel_id_b field 2206/2207 of the request header 2200.

The rel_id_a and rel_id_b fields 2206/2207 in the request header 2200 contain the IDs of requests being released, if any. For a message request, a release message is sent from the server to the client when the Command message is accepted by the server (at step 2145 in FIG. 21A), and indicates that the request is now complete. For a read data request, a release message is sent from the client to the server. The message indicates that the data indicated by the response was successfully received by the client, and that the request is now complete.

In one embodiment of the present system, request state machines implement release delay timers to allow a release to be piggybacked on another request layer message. If the timer expires before the release can be piggybacked, a no-op message is sent to carry the release.

More specifically, at step 2325, if any releases are supplied (via rel_id_a 2206 or rel_id_b 2207), a Receive(Release) call is made to each specified Request ID, at step 2330. If the Request ID is not that of an existing client or server request object, this is a protocol error and the associated connection is aborted. Processing then continues at step 2075, in FIG. 20B, and returns from FIG. 20B step 2055 or 2065 to FIG. 23 step 2335.

Whether or not releases are supplied in the rel_id_a and rel_id_b header fields 2206/2207, the message type field indicated by the opcode field 2202 is then processed.

At step 2335, if the received message is a 'command' message, then message processing continues at step 2105 in FIG. 21A, as described above. At step 2340, if the received message is a 'response' message, then at step 2345, a Receive (Response) call is made to the Request identified by the request_id header field 2205, and message processing continues at step 2075 in FIG. 20B. At step 2350, if the received message is a 'pause' message, then message processing continues at step 2035 in FIG. 20B.

Other types of received messages (i.e., messages that do not fall into one of the above categories) are processed at step 2355. No-op messages are sent to carry piggybacked releases (in the rel_id_a and rel_id_b fields) and command window size updates (in the cmd_win field). After processing these fields, the message is discarded. In all cases, once a message has been completely processed, the associated pool buffer is freed. However, the pool buffer for a command message is not freed until the application completes the request of the command messages is discarded because the connections is paused. When the application completes the request, the pool buffer containing the Command message is returned to the buffer pool, thus increasing the available application quota.

Initial Command Window Size Computation

The present system implements 'optimistic' command flow control. This means that the sum of the server command window sizes (srvr_cmd_win_cur) for all connections on an end-point will exceed the resources actually available. The following variables are used to compute the maximum command window size (srvr_cmd_win_max):

the total number of server request blocks available to all connections, and the number of pool buffers available to the request layer for each group of connections sharing the same buffer pool.

In an exemplary embodiment, command window size quota is distributed across connections in roughly the same proportion as pool buffers are distributed. In addition, past usage is used as a predictor of future usage. Statistics are kept on the recent received command traffic on each connection and used as part of the command window size computation.

Figure 24:
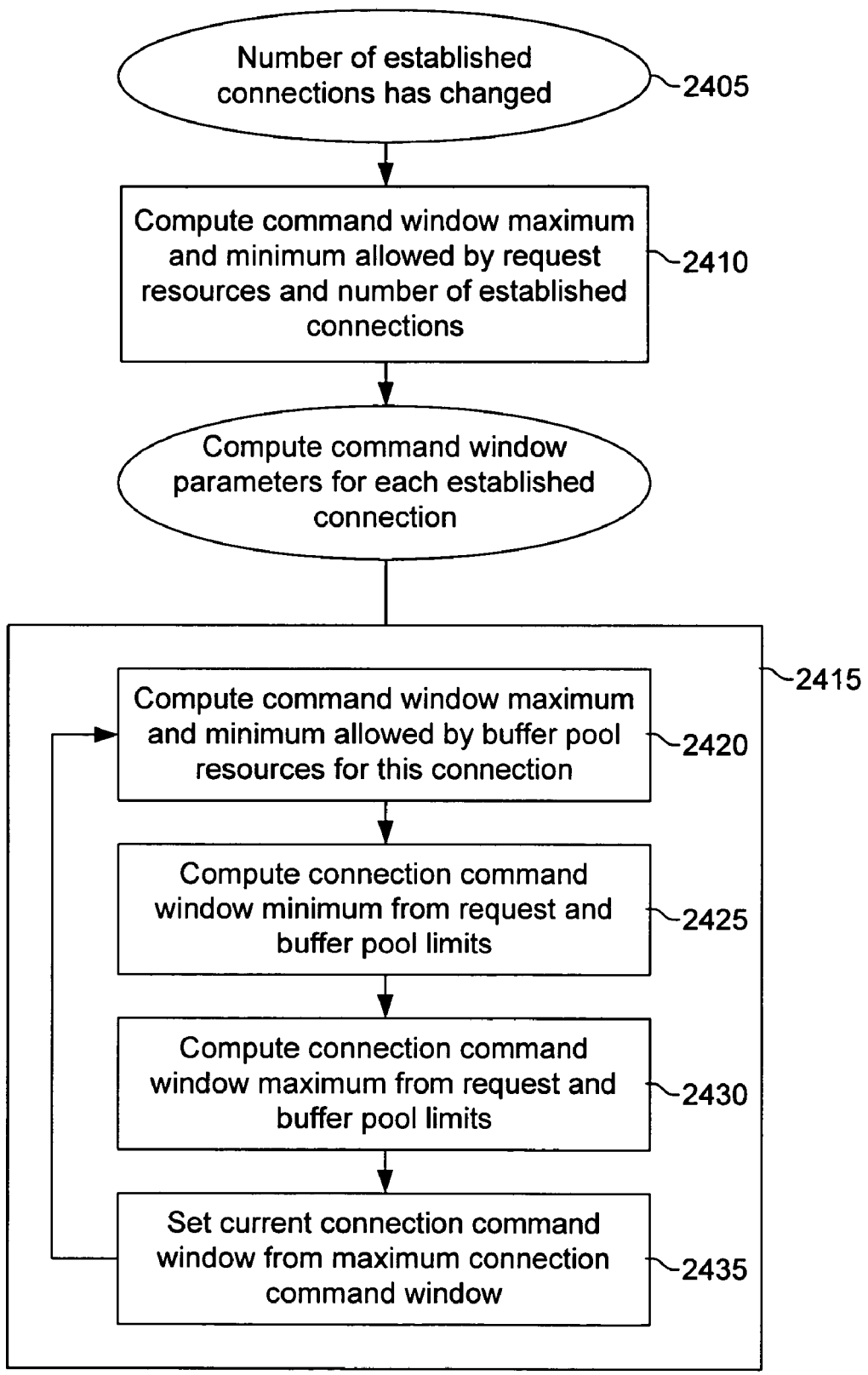
FIG. 24 is a flowchart showing exemplary steps performed in determining initial command window size.

FIG. 24 is a flowchart showing exemplary steps performed in determining initial command window size and limits. Each connection has maximum, minimum, and current command window parameters. The current command window starts at the maximum and is constrained to vary between that and the minimum. Whenever the number of established connections changes, the maximum, minimum, and current command window are computed for each remaining established connection. The following parameters are used to compute these values:

The total number of active connections on the local end-point ('req_conn_cnt');

The total number of server request objects on the local end-point ('tot_srvr_req');

The application quota for each buffer pool ('bp_aquota');

The number of active connections using each buffer pool ('bp_conn_cnt');

The overdraft fraction allowed ('OVERDRAFT', typically 10 percent);

The absolute minimum command window size allowed ('CMD_WIN_MIN', typically 1).

The maximum window value that will fit in a request header ('HDR_CMD_WIN_MAX', typically 255);

At step 2405, the number of established connections has changed, as a result of a connection becoming established or an established connection being closed or aborted. At step 2410, the minimum and maximum command window sizes allowed by the available server request objects and number of established connections are computed by the following exemplary equations:

$$req\_cmd\_win\_min = min(max(tot\_srvr\_req/req\_conn\_cnt, CMD\_WIN\_MIN), HDR\_CMD\_WIN\_MAX)$$

$$req\_cmd\_win\_max = req\_cmd\_win\_min + req\_cmd\_win\_min * OVERDRAFT * (req\_conn\_cnt-1)/100$$

In block 2415, the command window parameters for each established connection are computed. At step 2420, the minimum and maximum command window sizes allowed by the buffer pool resources available to this connection and number of connections using the buffer pool are computed by the following exemplary equations:

$$bp\_cmd\_win\_min = min(max(bp\_aquota/bp\_conn\_cnt, CMD\_WIN\_MIN), HDR\_CMD\_WIN\_MAX)$$

$$bp\_cmd\_win\_max = bp\_cmd\_win\_min + bp\_cmd\_win\_min * OVERDRAFT * (bp\_conn\_cnt-1)/100$$

At step 2425, the minimum connection command window size, srvr_cmd_win_min, is then computed by the following equation:

$$srvr\_cmd\_win\_min = min(req\_cmd\_win\_min, bp\_cmd\_win\_min)$$

At step 2430, the maximum connection command window size, srvr_cmd_win_max, is then computed by the following equation:

$$srvr\_cmd\_win\_max = min(req\_cmd\_win\_max, bp\_cmd\_win\_max, HDR\_CMD\_WIN\_MAX)$$

At step 2435, the current connection command window size, srvr_cmd_win_cur, is then set to the maximum connection command window size (srvr_cmd_win_max).

Steps 2420 through 2435 are repeated for each established connection.

Note that the overdraft computed is a percentage for each connection over one. While the maximum command window size generally remains constant when connections are relatively static, the actual window size used on a connection can be dynamically adjusted between the maximum (srvr_cmd_win_max) and minimum (srvr_cmd_win_min) values for that connection.

Proper operation of the presently-described embodiment depends on srvr_cmd_win_cur never becoming zero, since the client would then cease sending command messages and, in the absence of received 'delayed' or 'retransmitted' command messages, the server would never increase srvr_cmd_win_cur above zero. If a value of zero is used as the predetermined minimum value (CMD_WIN_MIN) the srvr_cmd_win_cur may eventually be set to zero. Thus, the server must have an additional periodic evaluation of connections in this state to eventually set srvr_cmd_win_cur above zero and send a window message (via a 'No-op') to the client so that the client may again send command messages to the server.

The present embodiment assumes a fixed number of server request objects, allocated at startup. Alternative embodiments are possible where the number of server request objects may change dynamically. In this situation, the command window size parameters should be recomputed when the number of number of server request objects is changed.

Certain changes may be made in the above methods and systems without departing from the scope of the present system. It is to be noted that all matter contained in the above description or shown in the accompanying drawings is to be interpreted as illustrative and not in a limiting sense. For example, the network shown in FIG. 1 may be constructed to include components other than those shown therein, and the components may be arranged in other configurations. The elements and steps shown in FIGS. 3-24 may also be modified in accordance with the methods described herein, without departing from the spirit of the system thus described. In addition, fabric 105(*) may be any type of switched or non-switched network, including the Internet, local area networks, and point-to-point communications links.

What is claimed is:

1. A method for controlling command message flow in a network including a server and a client comprising the steps of:
    receiving a command window field indicating a command window size that specifies a maximum number of command messages that may be outstanding at the server, in each of at least some messages received from the server at the client, wherein the command window size at the server is modified in accordance with available server resources for receiving said command messages;
    sending a plurality of said command messages from the client to the server;
    receiving a pause message at the client indicating a particular one of the command messages that cannot be processed, wherein the pause message is sent by the server when there are insufficient resources at the server to process the particular command message;
    ceasing sending said command messages from the client when the number of outstanding said command messages is at least equal to the maximum number of messages indicated by the command window size; and
    when the number of outstanding said command messages is less than the maximum number indicated by the command window size, then resuming sending said command messages from the client to the server, starting with the particular command message indicated by the pause message.

2. The method of claim 1, wherein, after ceasing sending said command messages from the client when the number of outstanding said command messages is at least equal to the maximum number of messages indicated by the command window size, the sending of command messages from the client is resumed if the number of outstanding said command messages decreases below the maximum number.

3. The method of claim 1, wherein the command window size indicates the maximum number of commands that may be outstanding at the server, for each connection between the client and the server, based upon the availability of resources needed to receive said command messages on a presently established connection, the method including the step of allowing the sum of a plurality of the command window sizes for corresponding connections between the client and the server to exceed the totality of the resources available at the server.

4. The method of claim 1, wherein, when the server sends said pause message, if the command window size is larger than a predefined minimum and larger than the number of commands currently outstanding, then the command window size is set to the larger of the minimum or the number of commands currently outstanding.

5. The method of claim 1, including the steps of:
    maintaining for each connection, at the server, a command window request counter, initially set to a predefined initial value;
    marking as delayed, each said command message that cannot be transmitted by the client because the maximum number of said command messages, as indicated by the command window size, are presently outstanding;

marking as retransmitted, each said command message that must be retransmitted due to receipt of said pause message;

including, in each said command message transmitted, an indication of whether the command message was marked as either delayed or retransmitted;

when one of the command messages is received at the server with the indication that it was marked as either delayed or retransmitted, then decrementing the command window request counter by one; and when the command window request counter at the server reaches a value of zero, then resetting the request counter to the initial value; and incrementing the command window size by one, if the command window size is less than a predefined upper limit for the maximum number of said command messages.

6. A method for controlling command message flow in a network including a server and a client comprising the steps of:

including a command window field indicating a command window size that specifies a maximum number of command messages that may be outstanding at the server, in each of at least some messages sent from the server to the client;

modifying the command window size at the server in accordance with available server resources for receiving said command messages;

when there are insufficient resources at the server to process a particular one of the command messages delivered to the server, then:

sending a pause message to the client indicating the particular command message cannot be received, wherein indicating the particular command message in the pause message allows the client to later resume sending by starting with the particular command message;

storing indicia indicating the particular command message that is initially discarded; and discarding subsequent said command messages delivered to the server until the initially discarded particular command message is again delivered to the server.

7. The method of claim 6, including:

sending a plurality of said command messages from the client to the server;

ceasing sending said command messages from the client when the number of outstanding said command messages is at least equal to the maximum number of messages indicated by the command window field; and when the number of outstanding command messages is less than the maximum number indicated by the command window field, then resuming sending said command messages from the client to the server, starting with the particular command message indicated by the pause message.

8. The method of claim 6, including the steps of:

maintaining for each connection, at the server, a command window request counter, initially set to a predefined initial value;

marking as delayed, each said command message that cannot be transmitted by the client because the maximum number of command messages, as indicated by the command window field, are presently outstanding;

marking as retransmitted, each said command message that must be retransmitted due to receipt of said pause message;

including, in each said command message transmitted, an indication of whether the command message was marked as either delayed or retransmitted;

when a specific said command message is received at the server with the indication that it was marked as either delayed or retransmitted, then decrementing the command window request counter by one; and when the command window request counter at the server reaches a value of zero, then resetting the request counter to the initial value; and incrementing the command window size by one, if the command window size is less than a predefined upper limit for the maximum number of said command messages.

9. The method of claim 6, wherein the command window size indicates the maximum number of commands that may be outstanding at the server, for each connection between the client and the server, based upon the availability of resources needed to receive said command messages on a presently established connection, the method including the step of allowing the sum of a plurality of the command window sizes for corresponding connections between the client and the server to exceed the totality of the resources available at the server.

10. The method of claim 6, wherein, after ceasing sending said command messages from the client when the number of outstanding said command messages is at least equal to the maximum number of messages indicated by the command window size, the sending of command messages from the client is resumed if the number of outstanding said command messages decreases below the maximum number.

11. The method of claim 6, wherein, when the server sends said pause message, if the command window size is larger than a predefined minimum and larger than the number of commands currently outstanding, then the command window size is set to the larger of the minimum or the number of commands currently outstanding.

12. A method for controlling command message flow in a network including a server and a client comprising the steps of:

sending a plurality of command messages from the client to the server;

receiving, from the server, a message containing a command window size that specifies a maximum number of said command messages that may be outstanding at the server;

receiving a pause message at the client indicating a particular one of the command messages that cannot be processed, wherein the pause message is sent by the server when there are insufficient resources at the server to process the particular command message;

ceasing sending said command messages from the client when a number of outstanding command messages is at least equal to the maximum number of messages indicated by the command window size; and when the number of outstanding said command messages is less than the maximum number indicated by the command window size, then resuming sending said command messages from the client to the server, starting with the articular command message that was indicated by the pause message.

13. The method of claim 12, wherein, after ceasing sending said command messages from the client when the number of outstanding said command messages is at least equal to the maximum number of messages indicated by the command window size, the sending of command messages from the client is resumed if the number of outstanding said command messages decreases below the maximum number.

14. The method of claim 12, comprising the steps of:
including the command window size in each of at least some messages sent from the server to the client;
modifying the value of the command window size at the server in accordance with available server resources for receiving said command messages;
when there are insufficient resources at the server to process the particular command message delivered to the server, then:
sending the pause message to the client indicating the particular command message cannot be received;
storing indicia indicating the particular command message that is initially discarded; and
discarding subsequent said command messages delivered to the server until the initially discarded particular command message is again delivered to the server.

15. The method of claim 14, including the steps of:
maintaining for each connection, at the server, a command window request counter, initially set to a predefined value;
marking as delayed, each said command message that cannot be transmitted by the client because the maximum number of command messages, as indicated by the command window size, are presently outstanding;
marking as retransmitted, each said command message that must be retransmitted due to receipt of a pause message;
including, in each said command message transmitted, an indication of whether the command message was marked as either delayed or retransmitted;
when one of the command messages is received at the server with the indication that it was marked as either delayed or retransmitted, then decrementing the command window request counter by one; and
when the command window request counter at the server reaches a value of zero, then resetting the request counter to the initial value; and
incrementing the command window size by one, if the command window size is less than a predefined upper limit for the maximum number of said command messages.

16. A method for controlling command message flow in a network including a server and a client comprising the steps of:
including a command window field indicating a command window size that specifies a maximum number of command messages that may be outstanding at the server, in each of at least some messages sent from the server to the client;
setting an initial command window size via a message from the server to the client during connection establishment therebetween;
modifying the command window size at the server in accordance with available server resources for receiving said command messages;
sending a plurality of said command messages from the client to the server in client command message order until the number of outstanding command messages is equal to the maximum number indicated by the command window size;
establishing command order at the server based on the order in which said command messages are delivered to the server;
when there are insufficient resources at the server to process a particular one of the command messages delivered to the server, then:
sending a pause message to the client indicating said particular command message that cannot be processed;
storing indicia indicating the particular command message initially discarded; and
discarding subsequent said command messages delivered to the server until the initially discarded said particular command message is again delivered to the server;
ceasing sending said command messages from the client when the number of outstanding command messages is at least equal to the maximum number of messages indicated by the command window size;
when the number of outstanding command messages is less than the maximum number indicated by the command window, then resuming sending said command messages from the client to the server, starting with the command message indicated by the pause message, and proceeding to process received command messages in the client command message order; and
when said particular command message is again delivered to the server, then resuming processing of delivered command messages if sufficient server resources are available.

17. The method of claim 16, including the steps of:
maintaining for each connection, at the server, a command window request counter, initially set to a predefined initial value;
marking as delayed, each said command message that cannot be transmitted by the client because the maximum number of said command messages, as indicated by the command window size, are presently outstanding;
marking as retransmitted, each said command message that must be retransmitted due to receipt of said pause message;
including, in each said command message transmitted, an indication of whether the command message was marked as either delayed or retransmitted;
when one of the command messages is received at the server with the indication that it was marked as either delayed or retransmitted, then decrementing the command window request counter by one; and
when the command window request counter at the server reaches a value of zero, then resetting the request counter to the initial value; and
incrementing the command window size by one, if the command window size is less than a predefined upper limit for the maximum number of said command messages.

18. The method of claim 16, wherein the command window size indicates the maximum number of commands that may be outstanding at the server, for each connection between the client and the server, based upon the availability of resources needed to receive said command messages on a presently established connection, the method including the step of allowing the sum of a plurality of the command window sizes for corresponding connections between the client and the server to exceed the totality of the resources available at the server.

19. A system for controlling command message flow in a network, comprising:
a client; and
a server to include a command window field indicating a command window size that specifies a maximum number of command messages that may be outstanding at the server, in each of at least some of the messages sent from the server to the client over the network; wherein:

an initial command window size is set via a message from the server to the client during connection establishment therebetween;

the command window size at the server is modified in accordance with available server resources for receiving said command messages;

the client to send a plurality of said command messages to the server over the network in client command message order until the number of outstanding command messages is equal to the maximum number indicated by the command window size;

wherein command order at the server is established based on the order in which said command messages are delivered to the server;

when there are insufficient resources at the server to process a particular one of the command messages delivered to the server, the server to:
- send a pause message to the client indicating whish said particular command message that cannot be processed;
- store indicia indicating the particular command message initially discarded; and
- discard subsequent said command messages delivered to the server until the initially discarded said particular command message is again delivered to the server;

the client to cease sending said command messages to the server when the number of outstanding command messages is at least equal to the maximum number of messages indicated by the command window size;

when the number of outstanding command messages is less than the maximum number indicated by the command window size, the client to resume sending said command messages from the client to the server, starting with the particular command message indicated by the pause message; and when the initially discarded said command message is again delivered to the server, then the server to resume processing of delivered command messages if sufficient server resources are available.

20. The system of claim 19, including:

a command window request counter in the server, for each connection, and initially set to a predefined value; wherein:

each said command message that cannot be transmitted by the client because the maximum number of command messages, as indicated by the command window size, are presently outstanding, is marked as delayed;

each said command message that must be retransmitted due to receipt of the pause message is marked as retransmitted;

an indication of whether the command message was marked as either delayed or retransmitted is included in each said command message transmitted;

when one of the command messages is received at the server with the indication that it was marked as either delayed or retransmitted, then the command window request counter is decremented by one; and when the command window request counter at the server reaches a value of zero, then the request counter is reset to the initial value; and the command window size is incremented by one, if the command window size is less than the maximum number of command messages.

* * * * *

UNITED STATES PATENT AND TRADEMARK OFFICE
CERTIFICATE OF CORRECTION

PATENT NO. : 7,627,627 B2  Page 1 of 1
APPLICATION NO. : 10/837115
DATED : December 1, 2009
INVENTOR(S) : Richard Perham Helliwell et al.

It is certified that error appears in the above-identified patent and that said Letters Patent is hereby corrected as shown below:

In column 22, line 59, in Detailed Description, delete "dr_tric" and insert
-- dr_trlc --, therefor.

In column 31, line 43, in Detailed Description, delete "(outbound_tric)" and insert
-- (outbound_trlc) --, therefor.

In column 36, line 48, in Detailed Description, delete "cint_cmd_win" and insert
-- clnt_cmd_win --, therefor.

In column 37, line 16, in Detailed Description, delete "cint_cmd_win" and insert
-- clnt_cmd_win --, therefor.

In column 37, line 18, in Detailed Description, delete "cint_cmd_win" and insert
-- clnt_cmd_win --, therefor.

In column 44, line 63, in Claim 12, delete "articular" and insert -- particular --, therefor.

In column 47, line 21, in Claim 19, before "said" delete "whish".

Signed and Sealed this

Twentieth Day of April, 2010

David J. Kappos
*Director of the United States Patent and Trademark Office*